(12) United States Patent
Shree et al.

(10) Patent No.: US 12,456,209 B2
(45) Date of Patent: Oct. 28, 2025

(54) SYSTEMS AND METHODS FOR ESTIMATING FEATURE LOCATIONS BASED ON IMAGE ANALYSIS AND HOMOGRAPHY

(71) Applicant: Hover Inc., San Francisco, CA (US)

(72) Inventors: Atulya Shree, San Francisco, CA (US); Kai Jia, San Francisco, CA (US); Zhiyao Xiong, San Francisco, CA (US); Siu Fai Chow, San Francisco, CA (US); Raymond Phan, San Francisco, CA (US); Panfeng Li, San Francisco, CA (US); Domenico Curro, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 322 days.

(21) Appl. No.: 17/638,773

(22) PCT Filed: Aug. 27, 2020

(86) PCT No.: PCT/US2020/048263
§ 371 (c)(1),
(2) Date: Feb. 25, 2022

(87) PCT Pub. No.: WO2021/041719
PCT Pub. Date: Mar. 4, 2021

(65) Prior Publication Data
US 2022/0284609 A1    Sep. 8, 2022

Related U.S. Application Data

(60) Provisional application No. 63/070,165, filed on Aug. 25, 2020, provisional application No. 62/983,324, (Continued)

(51) Int. Cl.
 G06T 7/543 (2017.01)
 G06T 7/33 (2017.01)
 G06T 7/73 (2017.01)

(52) U.S. Cl.
 CPC ............... *G06T 7/543* (2017.01); *G06T 7/33* (2017.01); *G06T 7/73* (2017.01)

(58) Field of Classification Search
 CPC ..... G06T 7/73; G06T 7/543; G06T 7/55–593; G06T 7/33–344
 See application file for complete search history.

(56) References Cited

U.S. PATENT DOCUMENTS 6,137,491 A *  10/2000  Szeliski .............. G06T 7/70
                                                 345/419
8,189,925 B2 *  5/2012  Kroepfl ............... G06V 10/757
                                                 382/113

(Continued)

FOREIGN PATENT DOCUMENTS

KR    101742115 B1 *   5/2017
WO    WO 2021/041719    3/2021

OTHER PUBLICATIONS

A. Tanacs, A. Majdik, J. Molnar, A. Rai and Z. Kato, "Establishing Correspondences between Planar Image Patches," 2014 International Conference on Digital Image Computing: Techniques and Applications (DICTA), Wollongong, NSW, Australia, 2014, pp. 1-7 (Year: 2014).*

(Continued)

*Primary Examiner* — Utpal D Shah
*Assistant Examiner* — Jack Peter Kraynak
(74) *Attorney, Agent, or Firm* — Knobbe, Martens, Olson & Bear, LLP

(57) ABSTRACT

Techniques are described for identifying correspondences between images to generate a fundamental matrix for the camera positions related to the images. The resultant fun- (Continued)

damental matrix enables epipolar geometry to correlate common features among the images. Correspondences are identified by confirming feature matches across images by applying a homography to data representing features across images. Further techniques are described herein for generating a representation of a boundary of a feature of a structure based on a digital image. In one or more embodiments, generating a representation of a boundary of a particular feature in a digital image comprises determining a portion of the image that corresponds to the structure, and determining a portion of the image that corresponds to the particular feature. One more vanishing points are associated with the portion of the image corresponding to the particular feature. The one or more vanishing points are used to generate a set of bounding lines for the particular feature, based on which the boundary indicator for the feature is generated.

26 Claims, 45 Drawing Sheets

Related U.S. Application Data filed on Feb. 28, 2020, provisional application No. 62/940,135, filed on Nov. 25, 2019, provisional application No. 62/893,100, filed on Aug. 28, 2019.

(56) References Cited

U.S. PATENT DOCUMENTS

| | | | |
|---|---|---|---|
| 8,401,276 B1* | 3/2013 | Choe | G01C 11/06 |
| | | | 382/285 |
| 9,020,187 B2* | 4/2015 | Pirchheim | G06T 7/246 |
| | | | 382/103 |
| 9,280,821 B1* | 3/2016 | Choe | G06T 7/73 |
| 9,305,361 B2* | 4/2016 | Jiang | G06T 7/20 |
| 9,824,486 B2* | 11/2017 | Hu | H04N 5/2628 |
| 10,600,192 B1* | 3/2020 | McKennoch | G06T 7/292 |
| 2010/0310182 A1 | 12/2010 | Kroepfl et al. | |
| 2014/0211989 A1* | 7/2014 | Ding | G06V 10/757 |
| | | | 382/103 |
| 2015/0125091 A1* | 5/2015 | Gallo | G06T 3/14 |
| | | | 382/275 |
| 2017/0178372 A1* | 6/2017 | Gormish | G06T 11/60 |
| 2018/0144458 A1* | 5/2018 | Xu | H04N 13/271 |
| 2018/0158199 A1* | 6/2018 | Wang | G06T 3/18 |
| 2019/0020817 A1* | 1/2019 | Shan | H04N 23/698 |
| 2019/0197709 A1* | 6/2019 | Windmark | G06T 7/248 |
| 2019/0213437 A1* | 7/2019 | Baumela Molina | |
| | | | G06V 10/462 |

OTHER PUBLICATIONS

M. Kushnir and I. Shimshoni, "Epipolar Geometry Estimation for Urban Scenes with Repetitive Structures," (2014) in IEEE Transactions on Pattern Analysis and Machine Intelligence, vol. 36, No. 12, pp. 2381-2395, Dec. 1, 2014 (Year: 2014).*
J. A. Lee, K. -C. Yow and A. Y. -S. Chia, "Robust matching of building facades under large viewpoint changes," 2009 IEEE 12th International Conference on Computer Vision, Kyoto, Japan, 2009, pp. 1258-1264, doi: 10.1109/ICCV.2009.5459324. (Year: 2009).*
A. Tanacs, A. Majdik, J. Molnar, A. Rai and Z. Kato, "Establishing Correspondences between Planar Image Patches," 2014 International Conference on Digital Image Computing: Techniques and Applications (DICTA), Wollongong, NSW, Australia, 2014, pp. 1-7, doi: 10.1109/DICTA.2014.7008107. (Year: 2014).*
Kushnir, M., & Shimshoni, I. (2014). Epipolar Geometry Estimation for Urban Scenes with Repetitive Structures. IEEE transactions on pattern analysis and machine intelligence, 36(12), 2381-2395. https://doi.org/10.1109/TPAMI.2014.2339862 (Year: 2014).*
International Search Report in PCT/US2020/048263 issued Jan. 12, 2021.
International Preliminary Report on Patentability received for PCT Patent Application No. PCT/US2020/048263, mailed on Jan. 12, 2021.
Lee et al., Robust Matching of Building Facades Under Large Viewpoint Changes, IEEE 12th International Conference on Computer Vision, Sep. 29, 2009, pp. 1258-1264.
Pritchett, et al., Wide Baseline Stereo Matching, IEEE 6th International Conference on Computer Vision, Jan. 4-7, 1998, pp. 754-760.
Extended European Search Report received for EP Patent Application No. 20859444.0, mailed on Sep. 15, 2023.
Lin, et al., "A systematic approach for 2D-image to 3D-range registration in urban environments" Computer Vision and Image Understanding, vol. 116, Issue 1, Jan. 2012, pp. 25-37.

* cited by examiner

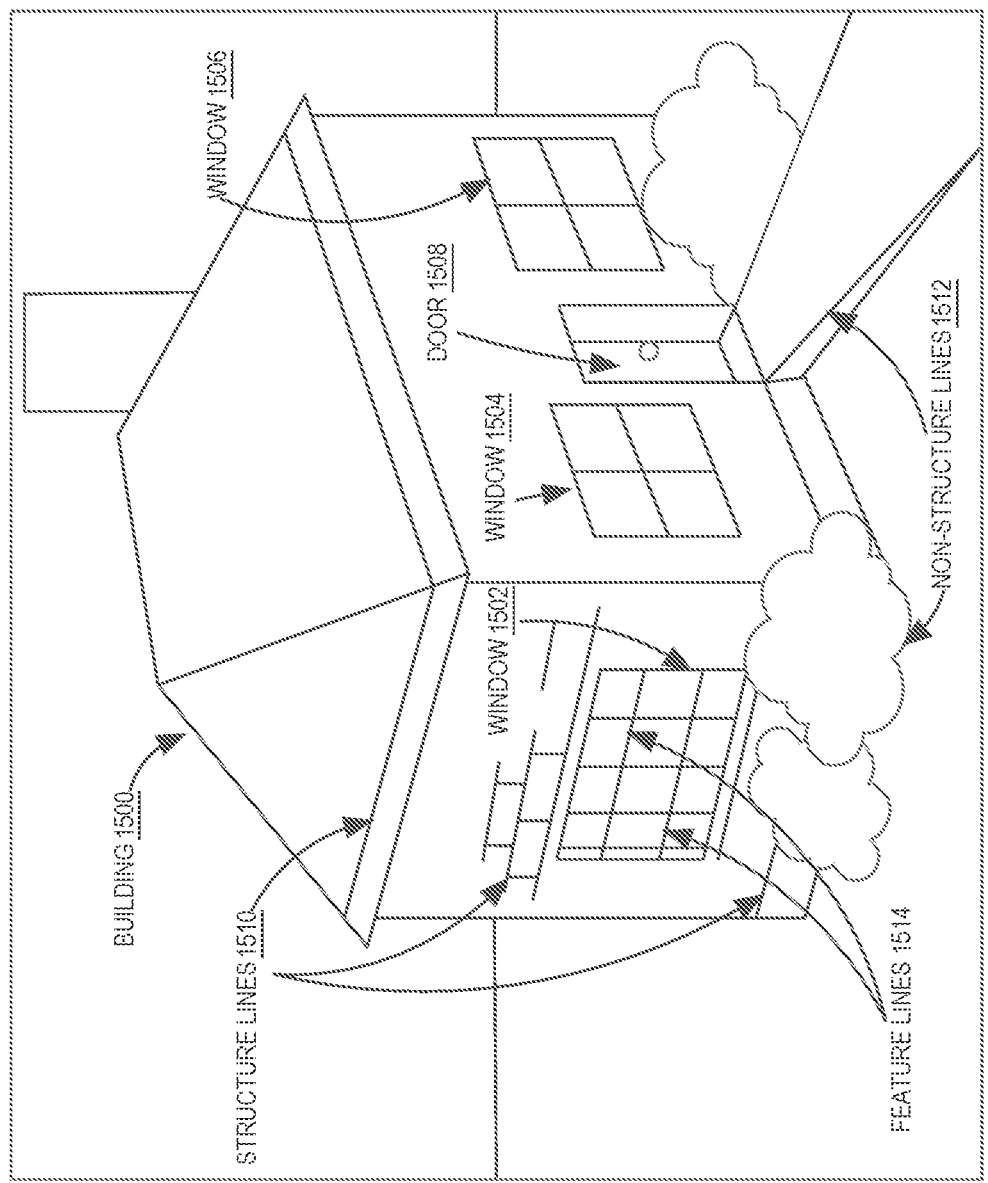

FIG. 16
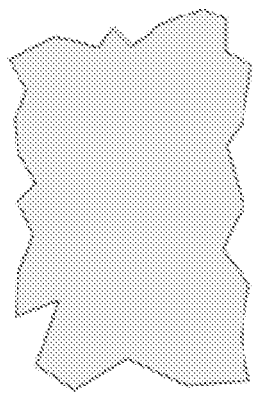
FEATURE PORTION 1600
FIG. 17
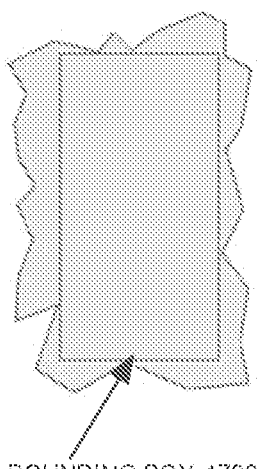 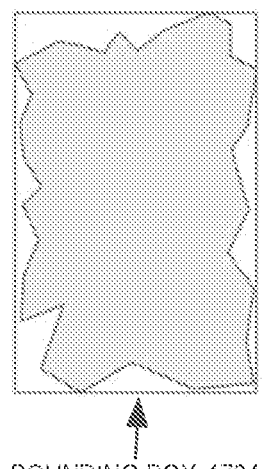
BOUNDING BOX 1702    BOUNDING BOX 1704

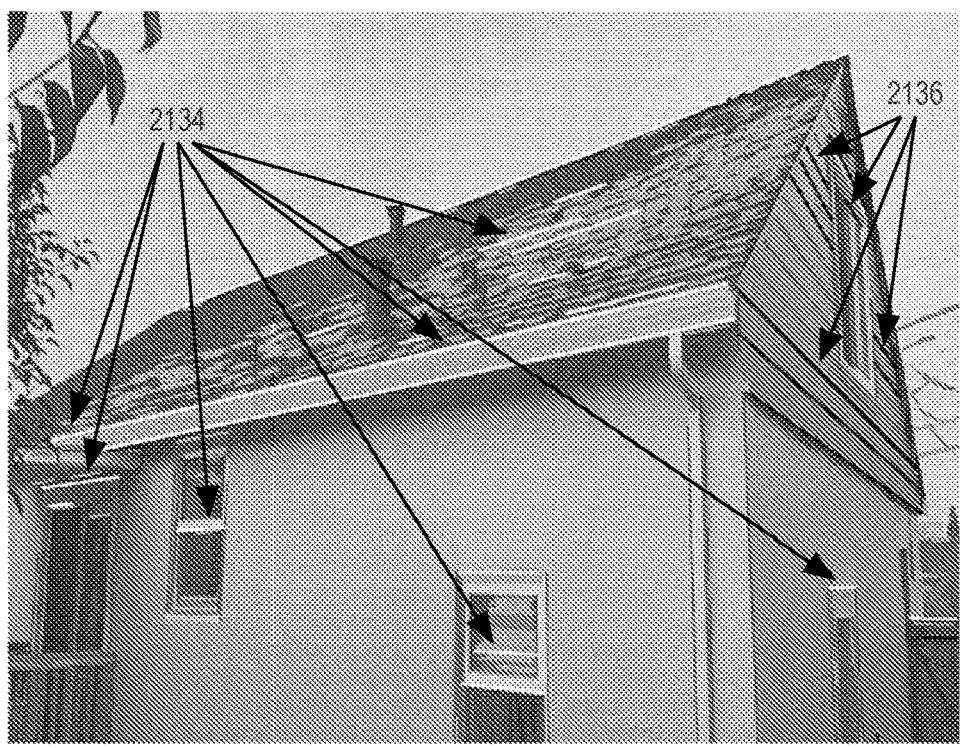
FIG. 21A

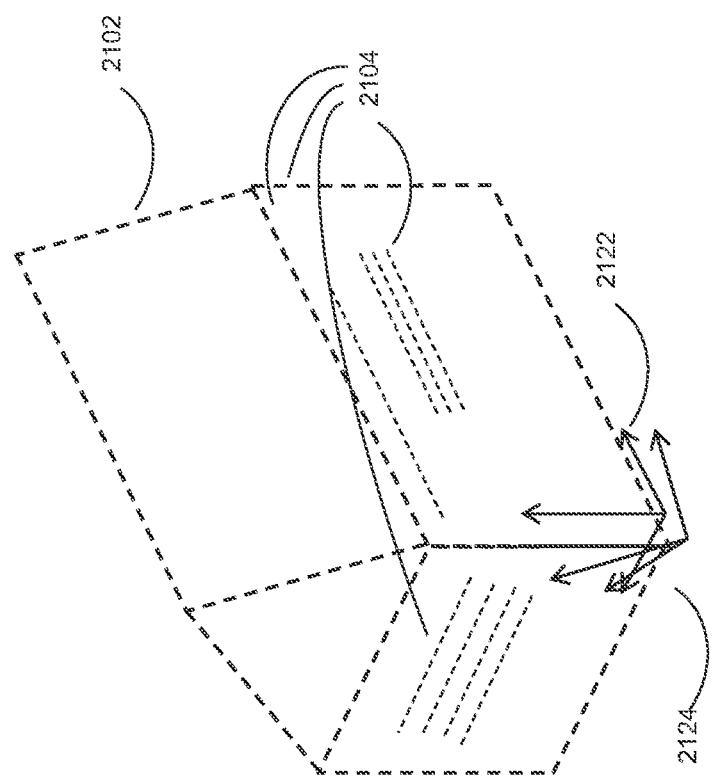

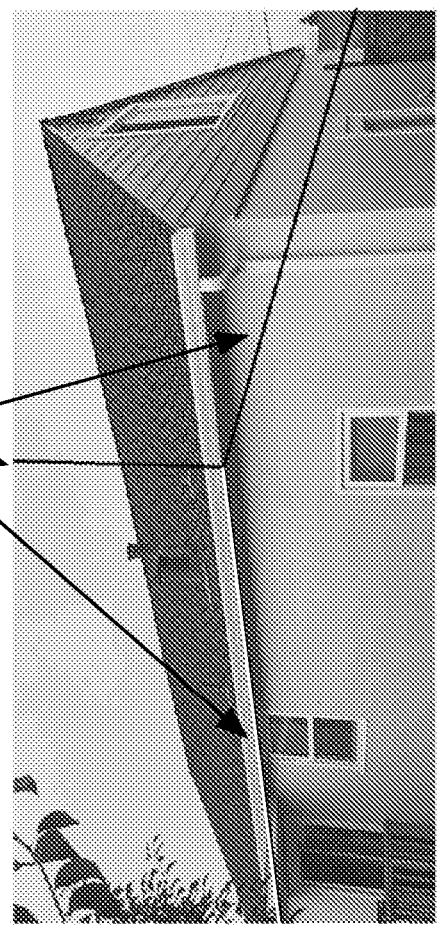
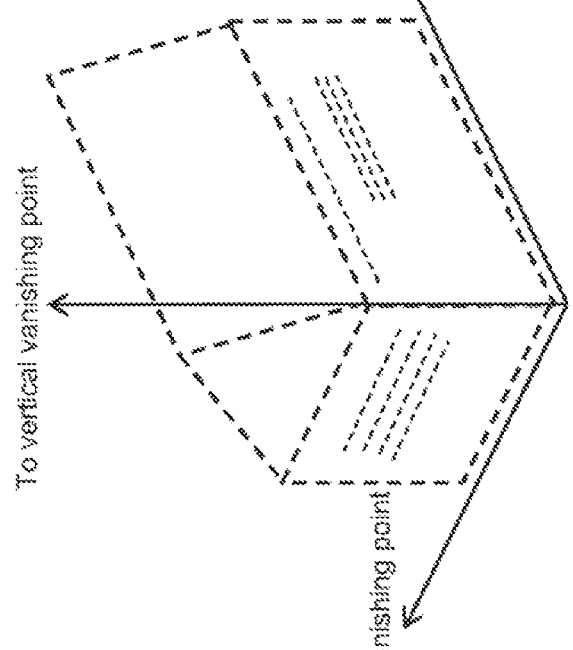
FIG. 21C

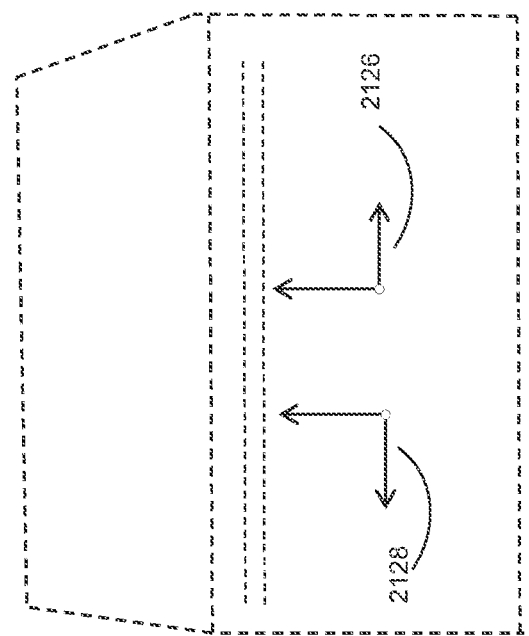

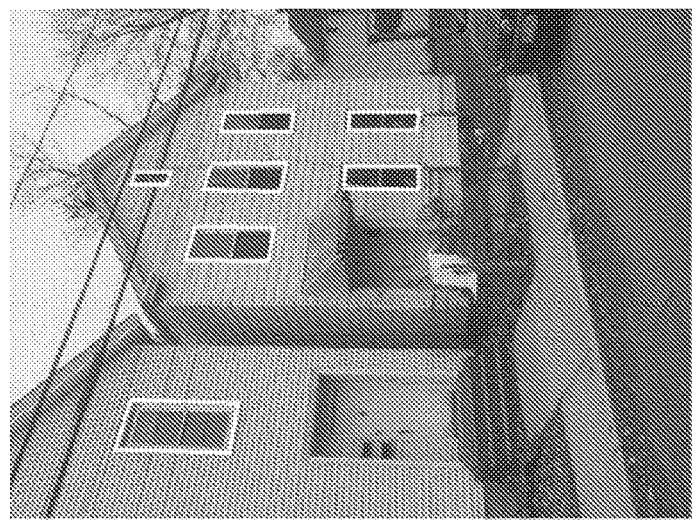
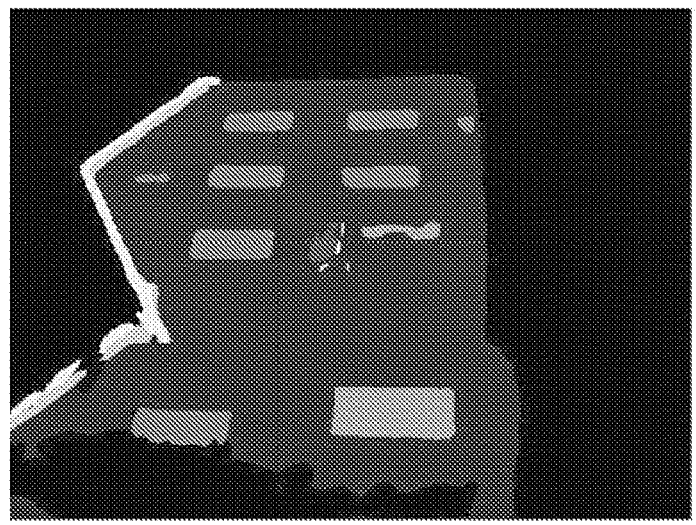
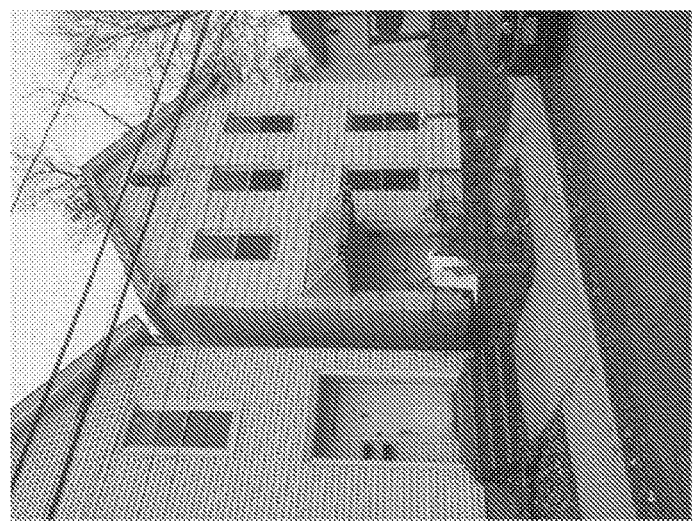
FIG. 23B

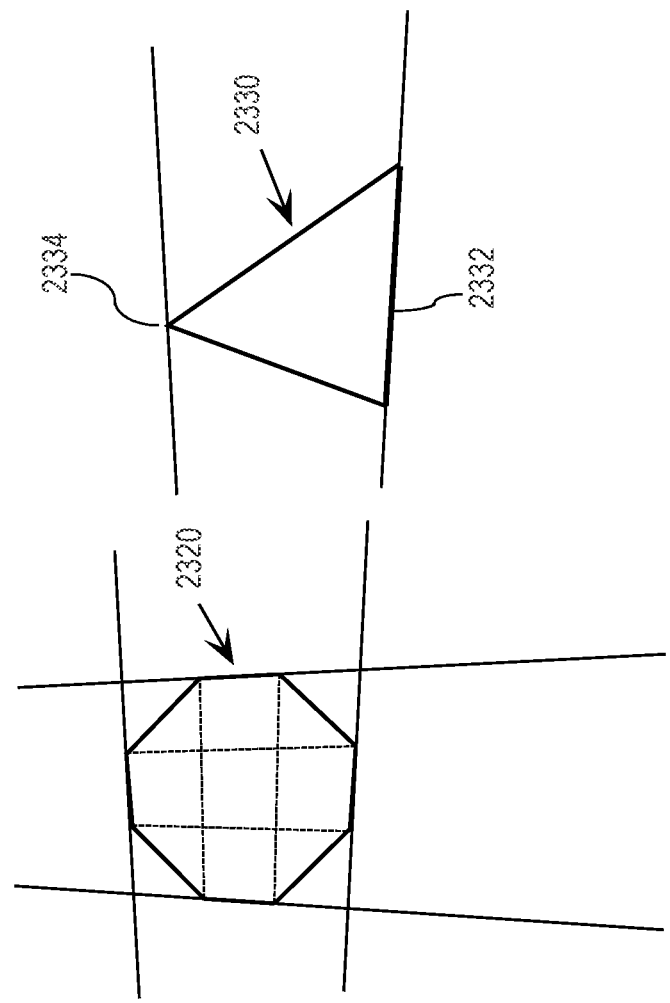
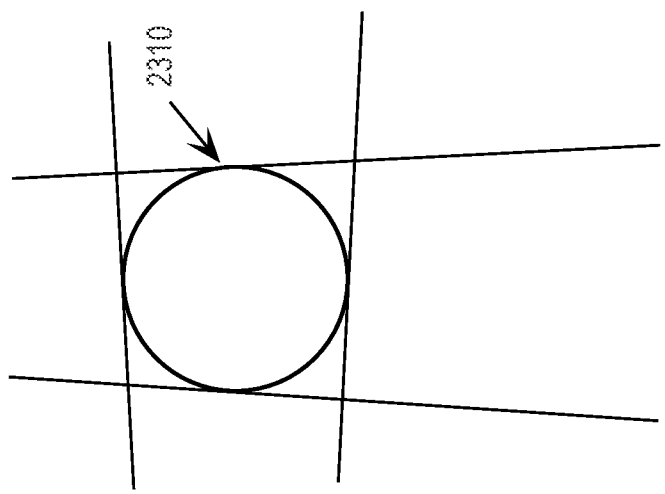
FIG. 23C

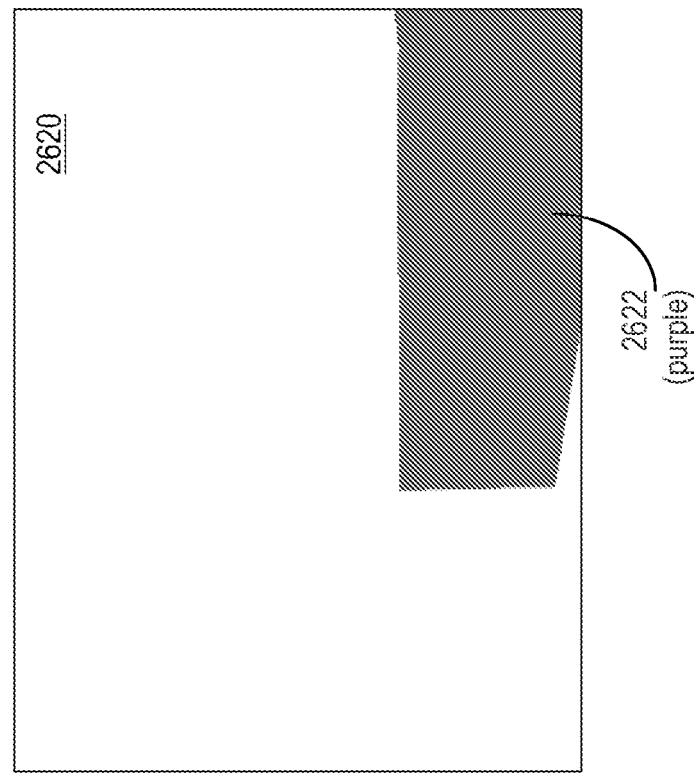
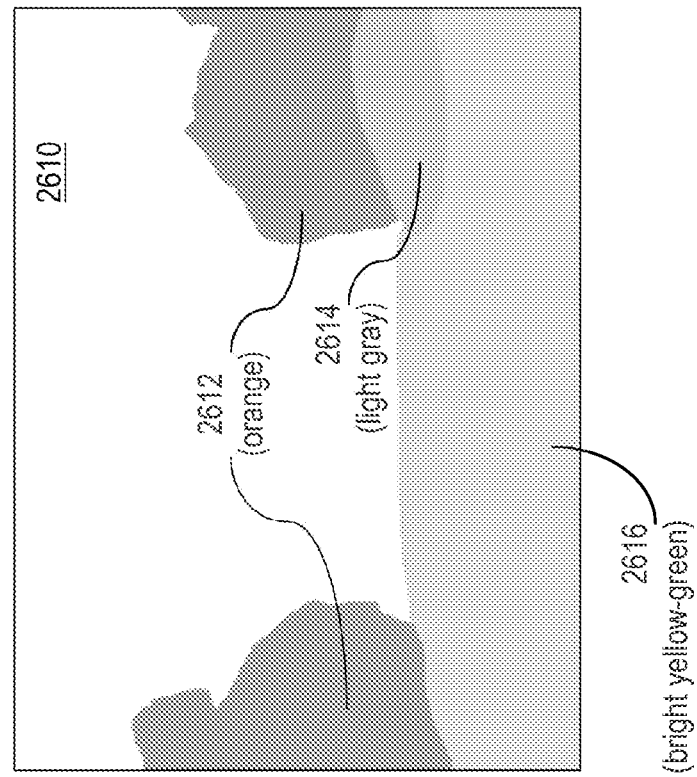
FIG. 26

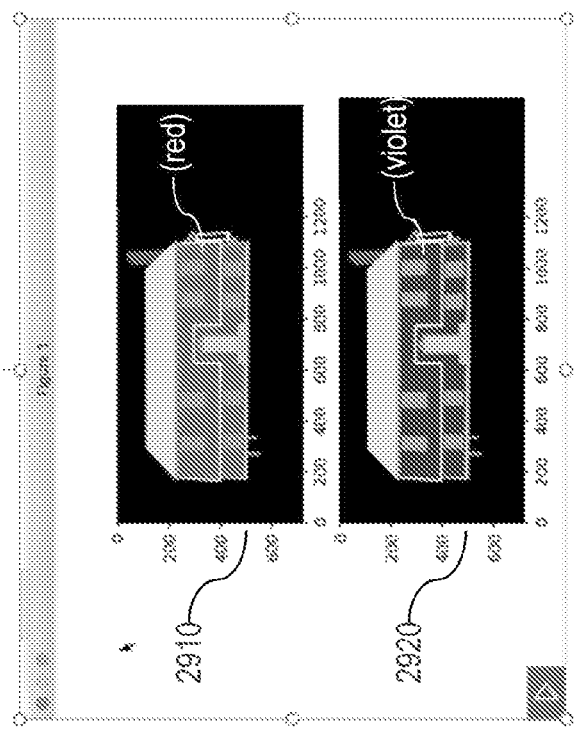
FIG. 29

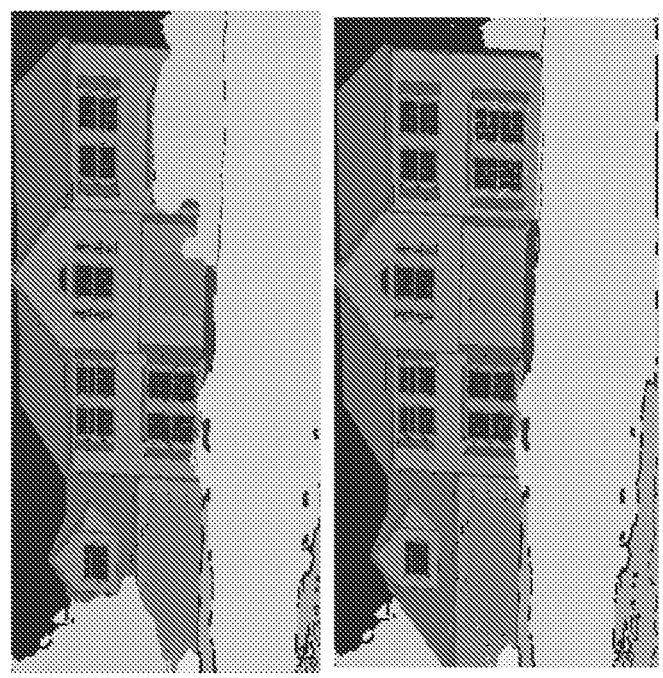
FIG. 32

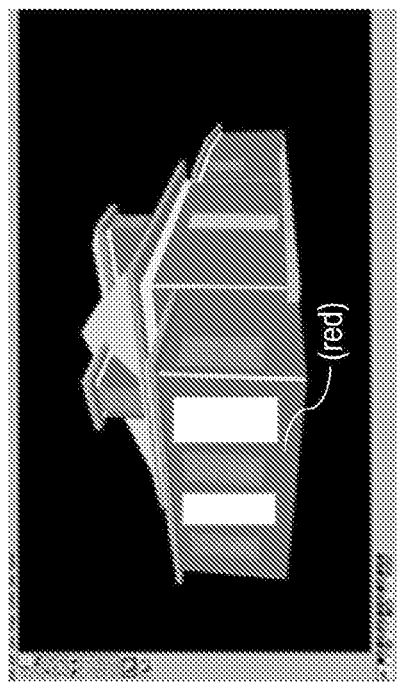
FIG. 33

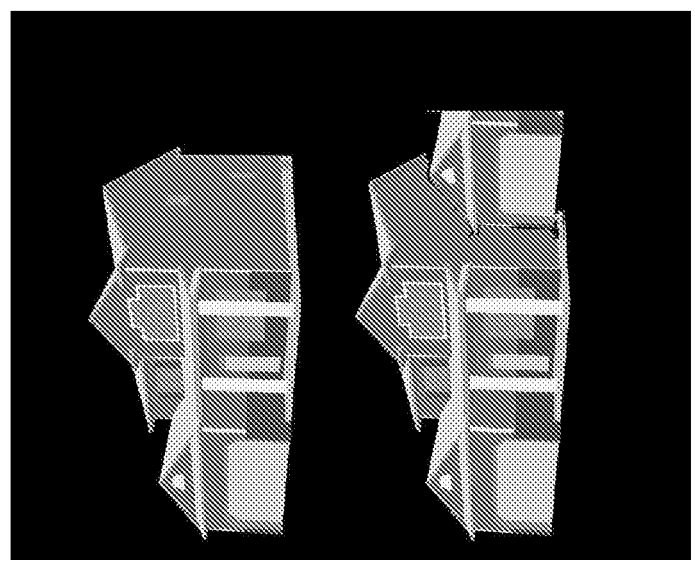
FIG. 34

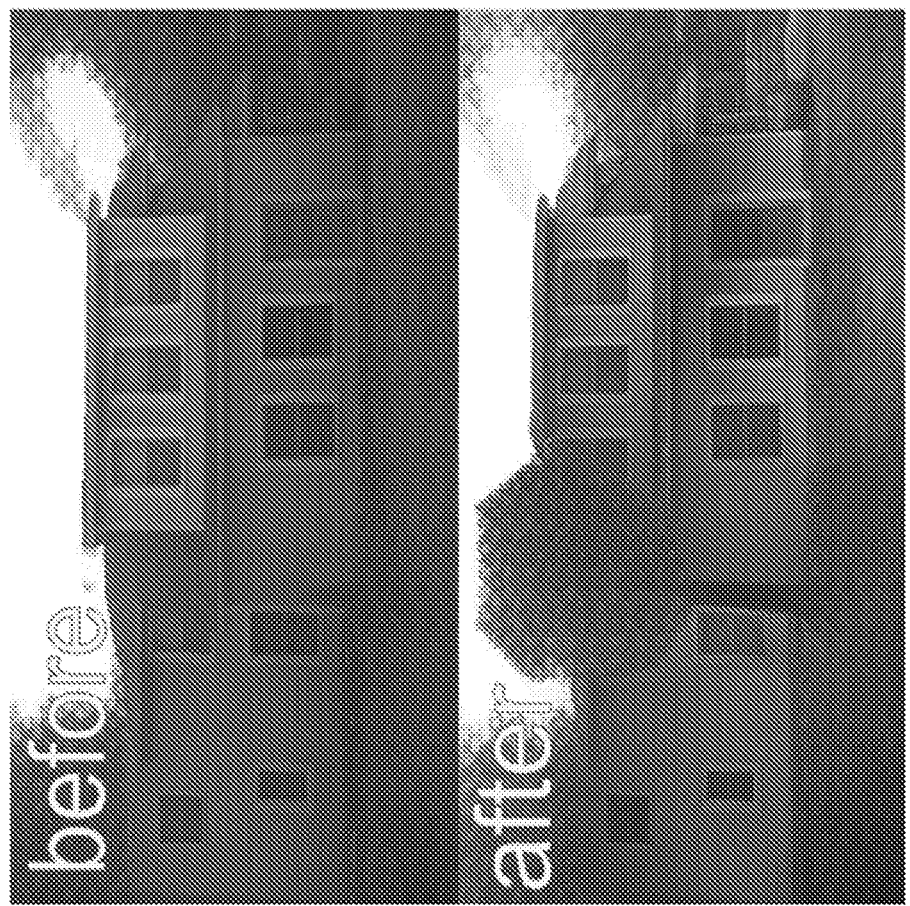
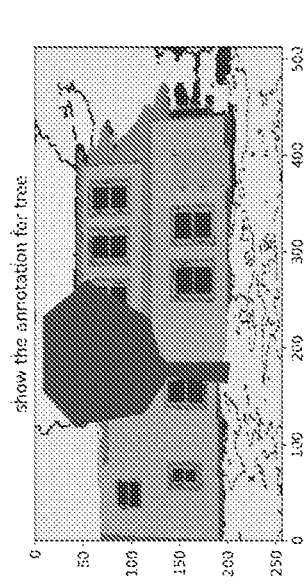
FIG. 35

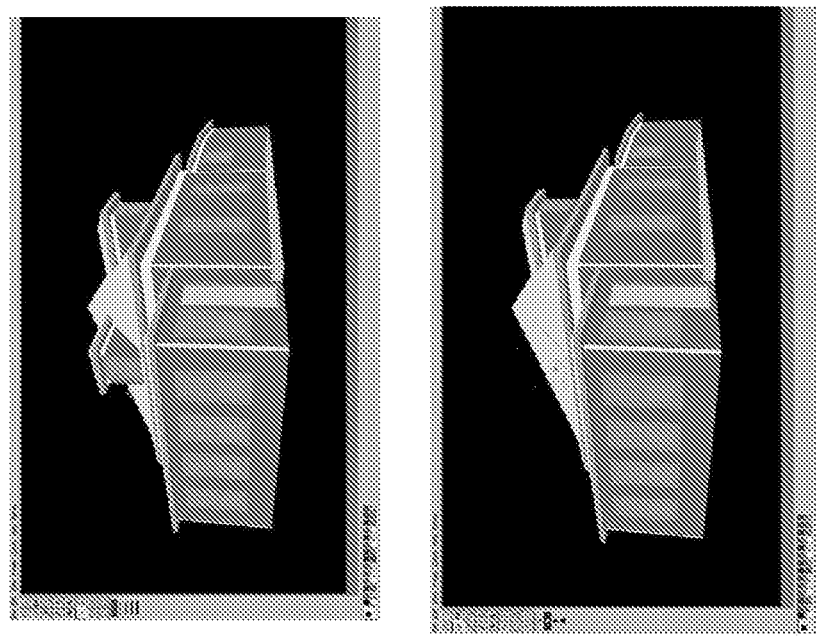
FIG. 36

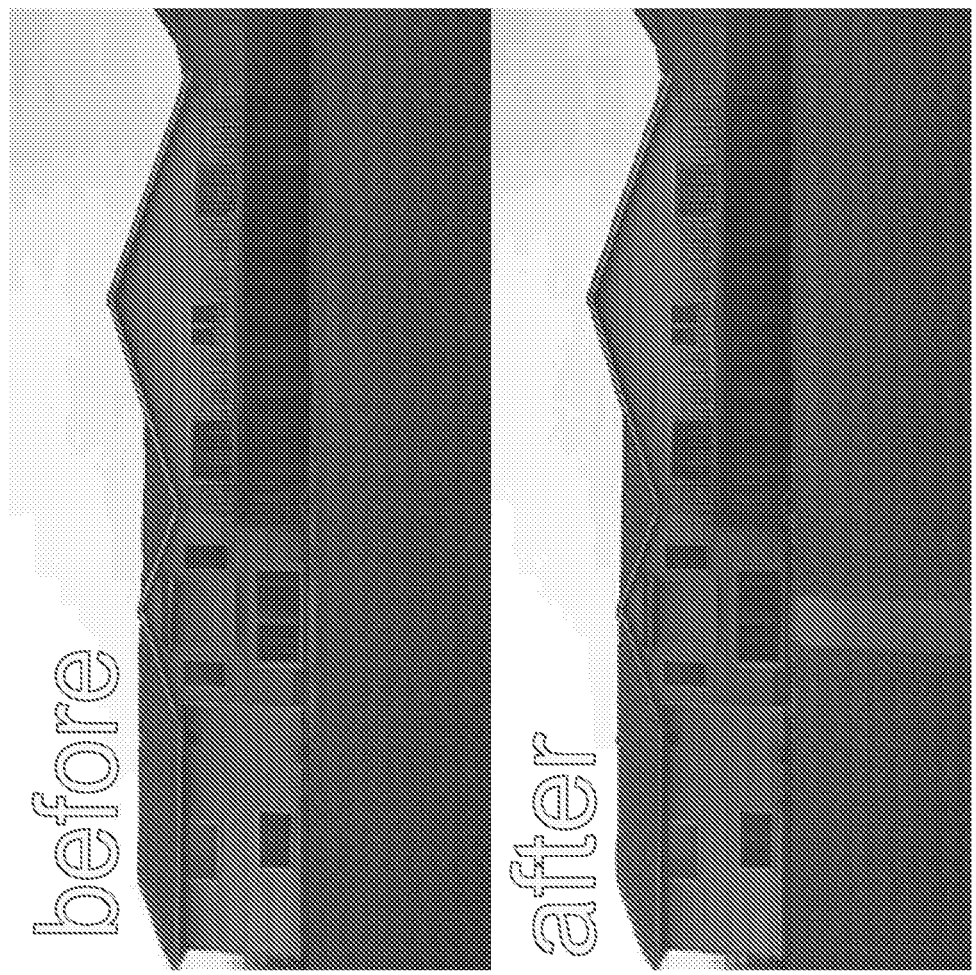
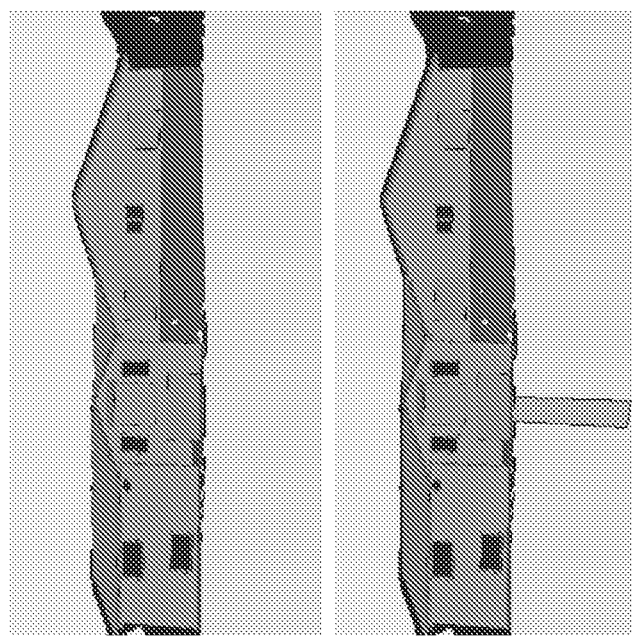
FIG. 37
Example: Add a road

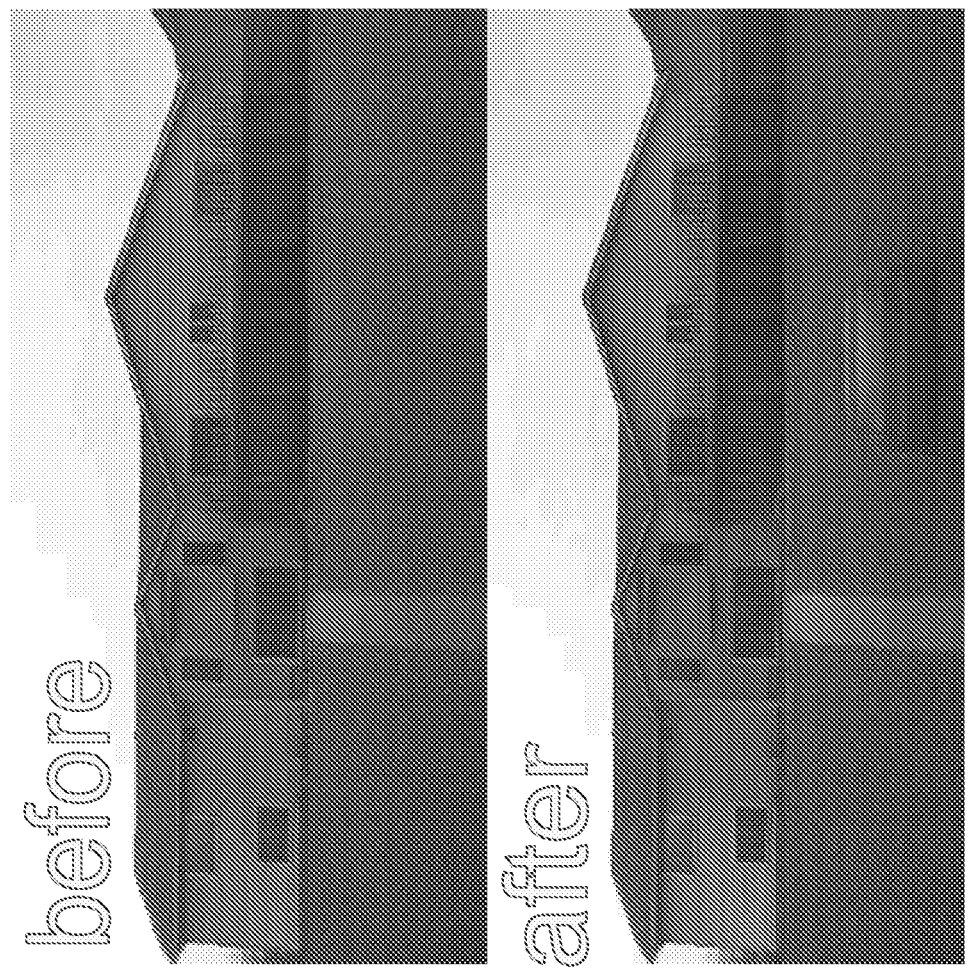
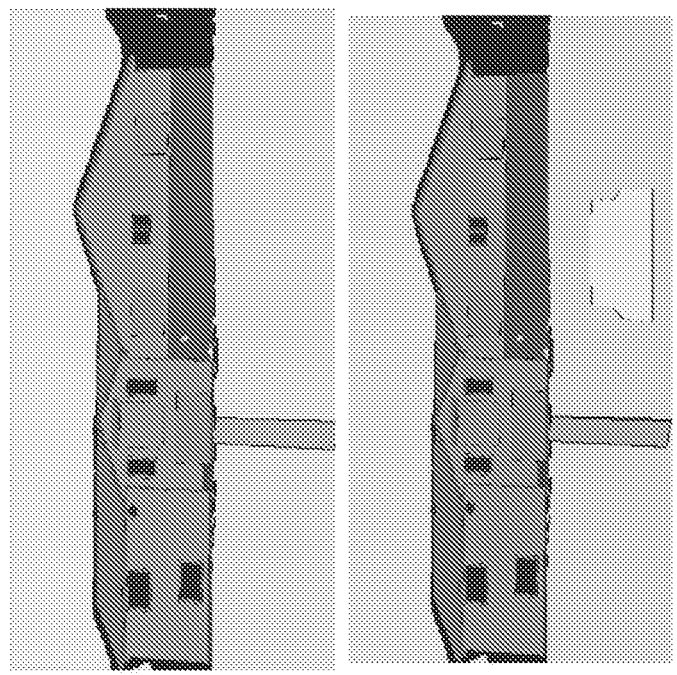
FIG. 38

SYSTEMS AND METHODS FOR ESTIMATING FEATURE LOCATIONS BASED ON IMAGE ANALYSIS AND HOMOGRAPHY

CROSS-REFERENCE TO RELATED APPLICATIONS

This application is a national phase of PCT Patent Application No. PCT/US2020/048263, filed Aug. 27, 2020, which claims priority benefit to U.S. Provisional Patent Application No. 63/070,165, filed Aug. 25, 2020, U.S. Provisional Patent Application No. 62/983,324, filed Feb. 28, 2020, U.S. Provisional Patent Application No. 62/940,135, filed Nov. 25, 2019, and U.S. Provisional Patent Application No. 62/893,100, filed Aug. 28, 2019, the subject matter of which is hereby incorporated by reference.

FIELD OF THE INVENTION

The present invention relates to image analysis, and more specifically, to identifying correspondences and correlating features of a structure that are depicted in multiple digital images, and to generating a geometric representation of boundaries of a feature of a structure that is depicted in a digital image, and to using machine learning to generate a photorealistic rendering from a segmentation mask.

BACKGROUND

Three-dimensional (3D) reconstruction of a subject may be generated based on two-dimensional (2D) digital images taken of the subject (such as a physical object, person, or structure depicted in the digital images). The digital images may be taken by any kind of imaging device, for example, via an aerial imagery device (such as a drone with an optical sensor), specialized-camera equipped vehicles, users with a camera (stand-alone or built-into a mobile device such as a phone or tablet), etc. Imaging devices that are referred to herein as "cameras" may be any kind of imaging device. The 3D reconstruction, or 3D model, is a digital representation of a physical, real-world subject. Accurate 3D models may be used to derive various parameters of the subject. For example, a 3D model of a building may be generated based on 2D images taken of the building. An accurate 3D building model allows for more accurate derivation of building measurements, which are not easily derivable from 2D images of the building.

Multiple 2D images of a subject may be processed by feature correlation techniques, where a feature is a particular aspect of a subject depicted in an image, such as a particular point, line, and/or shape on the image subject. Feature correlation techniques generally include: identifying key features of the subject across the images; extracting and interpreting geometries of the subject, including geometries of the key features of the subject; and correlating those features across the multiple images to determine how those geometries fit together in three dimensions. Feature correlation techniques, such as simultaneous localization and mapping (SLAM), involve recognizing elements viewable by an imaging device and determining the imaging device's position relative to those elements given known changes in the position(s) of the imaging device. However, given only a collection of images and limited or no information about positional changes of the imaging device between the images, it is difficult to determine the correspondences of features to derive any actionable localization and/or reconstruction information from the images.

Also, in order to accurately reconstruct a subject in three dimensions using feature correlation techniques, images from all perspectives of the subject are desired. However, due to system constraints such as data storage, image transmission, and image processing times, it is often desirable to capture, store, and process only a minimal number of images required to successfully recreate the subject. However, the images that are part of a minimal set of images of a subject, with as many different perspectives as possible, are generally taken from very different camera positions from around the subject.

Substantial changes to a rotation matrix between camera positions and/or image planes for a common subject is referred to as "wide baseline change". An example of wide baseline change would be taking a first image of a subject from its front and then taking a second image of that subject from its side. The camera position and orientation, at least as a function of the camera's optical axis, between those two images are substantially different relative to the subject. A minimal set of images of a subject, which represent different perspectives of the subject having wide baseline change, are prone to wide baseline changes, making correlation among images difficult. For example, features of the subject of a set of images having wide baseline changes, can have substantial differences in perceived location among the images, which makes it difficult to correlate the features. Further, images with wide baseline changes may not even have features in common.

Wide baseline changes between images representing a target subject generally increases the likelihood of error in 3D representations based on the image set. For example, feature correlation techniques applied to a set of images with wide baseline changes generally suffer from errors caused by mismatching features among the images, where the "matched" features in two or more images do not relate to the target subject in the image or do not represent the same physical feature of the target subject.

Wide baseline changes can be mitigated with intervening camera position information, metadata (such as describing the geometry of an image subject and/or the locations of features of the subject), or filters such as a Kalman filter. However, the information required for such solutions is not always accurate or available. As an example, GPS data indicating the position of a camera across a series of images may not reflect the true position of the camera, for example, due to atmospheric interference or multipath errors from signals reflected off surfaces proximate to the sensor, such as from nearby buildings. Additionally, geolocation data may be protected information in certain cases, and restricted from certain collection means or from sharing across systems and parties. Therefore, camera position data from supplementary sensors may not be reliable and/or available to aid in processing a set of images with wide baseline changes.

Thus, in some cases, the only relevant information available for a target subject is the image data in the set of captured images for the subject, without any metadata indicating camera locations, subject geometry, or locations of subject features. In such cases, construction of an accurate 3D representation of the image subject using feature correlation techniques is difficult or impossible. It is possible to derive estimated camera positions based on geometries and/or features across images of a set of images, but this is prone to error.

Accordingly, it would be beneficial to provide techniques that more accurately identify relationships between features of an image subject as depicted between different images that capture different views of the subject.

Furthermore, 3D representations of a structure (such as a building) may be generated based on 2D images taken of the structure by an imaging device. A 3D representation of a structure (referred to herein as a "3D model") is a digital representation of the physical, real-world structure, including features of the structure and dimensions of the structure. A 3D model may further include texture information, such as surface material or appearance. An accurate 3D model may be used to derive various structure measurements or to estimate design and renovation costs.

However, generating an accurate 3D model of a structure generally requires significant time and resources. Features of a structure may be used to assist in generating 3D models of the structure from a set of images, such as using feature correlation techniques, using structure features with known measurements to estimate measurements of other structure features, scaling a generated 3D model or outline of the structure, or validating the generated 3D model.

Features of a structure in a set of images of the structure may be identified manually, such as by a user adding markup, labels, and other data to images to indicate feature locations and/or details regarding the features, e.g., dimensions, outlines, corners, center points, types of features, etc. However, manually identifying and marking features is time consuming, and the results are not always accurate. Specifically, a user may incorrectly label a feature, incorrectly mark the location, shape, or boundaries of a feature, or fail to label or markup one or more features in one or more of the set of images.

Some automated techniques may identify pixels within an image that correspond to a feature. For example, machine learning techniques may be used to classify sets of pixels within an image as a window, door, building, etc. However, these automated techniques generally do not produce accurate results, or shapes with clean lines, but rather, indicate noisy or visually fuzzy areas that are predicted to correspond to respective architectural features. Additionally, pixels representing the same feature across multiple images may have different values due to a variety of factors, such as illumination differences and/or partial or complete obscuration of the feature in some images.

In order to associate common features across images or to validate a 3D model based on structure features, accurate and consistent coordinates and/or boundaries of the features are required. Thus, it would be beneficial to provide techniques for generating accurate and clean representations of architectural features depicted in digital images.

It can be beneficial to adjust photographic images, i.e., images taken from a photographic device such as a camera. For example, a photographic image of a house may be adjusted to change the current finishes (e.g., roofing, siding, landscape, etc.), or to include an image of a new garage, window, or kitchen extension being contemplated by a homeowner.

An image that has been edited, or is not created by a photographic device, and that remains realistic (i.e., with consistent shadowing, contrast, light, and texture that would be present in a photographic image) is referred to herein as a "photorealistic" image. There are many ways to adjust a photographic image to create a photorealistic image. For example, a photograph editor, such as Adobe Photoshop, Pixlr, GIMP, or Canva, can be used to directly edit an image. However, editing an image using such tools requires both knowledge of the application itself (which can be non-trivial) and artistic skill to adjust the photographic image realistically, i.e., using realistic shadowing, contrast, light, and texture so that the change does not appear "drawn" or "fake". Generally, it is beyond the ability of the average person to directly edit a photographic image such that the result remains photo-realistic.

As another example, a three-dimensional (3D) model may be created based on a set of photographs of a real-world structure. Once the model is created, 3D design software may be used to edit the 3D model. A rendering of the edited 3D model can produce a photorealistic image that reflects the changes made during the editing process. However, it can be very expensive to generate a 3D model of a target image subject. More specifically, creation of a 3D model requires a significant amount of computing resources, and use of 3D design software requires specialized knowledge and expertise. Furthermore, even with access to computing resources and an expert in 3D design software, it can still be very challenging to generate an accurate 3D model of a target subject if limited information on the subject is available. For example, an accurate 3D model may be based on specifications of the target subject, or on a high-quality series of photographic images that capture the target subject from multiple overlapping view-points.

There has been some work done with providing photo-realistic images using machine learning. For example, Nvidia AI Playground provides a GauGAN tool that generates photo-realistic images from segmentation masks. FIG. 25 depicts an example segmentation mask 2500, which represents a structure using a structure set of pixels (a "structure portion" of the mask) and multiple feature sets of pixels ("feature portions" of the mask) that represent features of the structure. In example segmentation mask 2500, the different sets of pixels are distinguished using different values of the color attribute.

For the GauGAN tool, different pixel colors are assigned to different textures/finishes, and the tool uses machine learning to replace the various sets of pixels in the segmentation mask with the associated textures/finishes. However, the GauGAN tool provides synthesized output based on a fixed trained input. Thus, the tool is not configured to edit the GauGAN input segmentation mask from a pre-existing image and preserve network values for intended inferences from its user-guided generation of new masks to output a photorealistic image. As such, there is no way to adjust the subject of a photographic image using the GauGAN tool.

As such, it would be beneficial to provide a way to edit a photographic or photo-realistic image such that the adjusted image is also photo-realistic and the image adjusting process does not require artistic skill, specialized or computing resource-intensive software, or extensive expertise in the software.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 15A-E depict example digital images and semantic segmentation.

FIG. 16 depicts an example feature portion.

FIG. 17 depicts example minimum bounding boxes.

FIG. 21A-D depict example structure vanishing points.

FIGS. 23A-C depict example boundary representations.

FIG. 26 depicts example foreground and background segmentation masks.

FIGS. 29-30 depict example adjustments to segmentation masks, and associated photorealistic images.

FIGS. 32-38 depict further example adjustments to segmentation masks, and associated photorealistic images.

DETAILED DESCRIPTION

Figure 1:
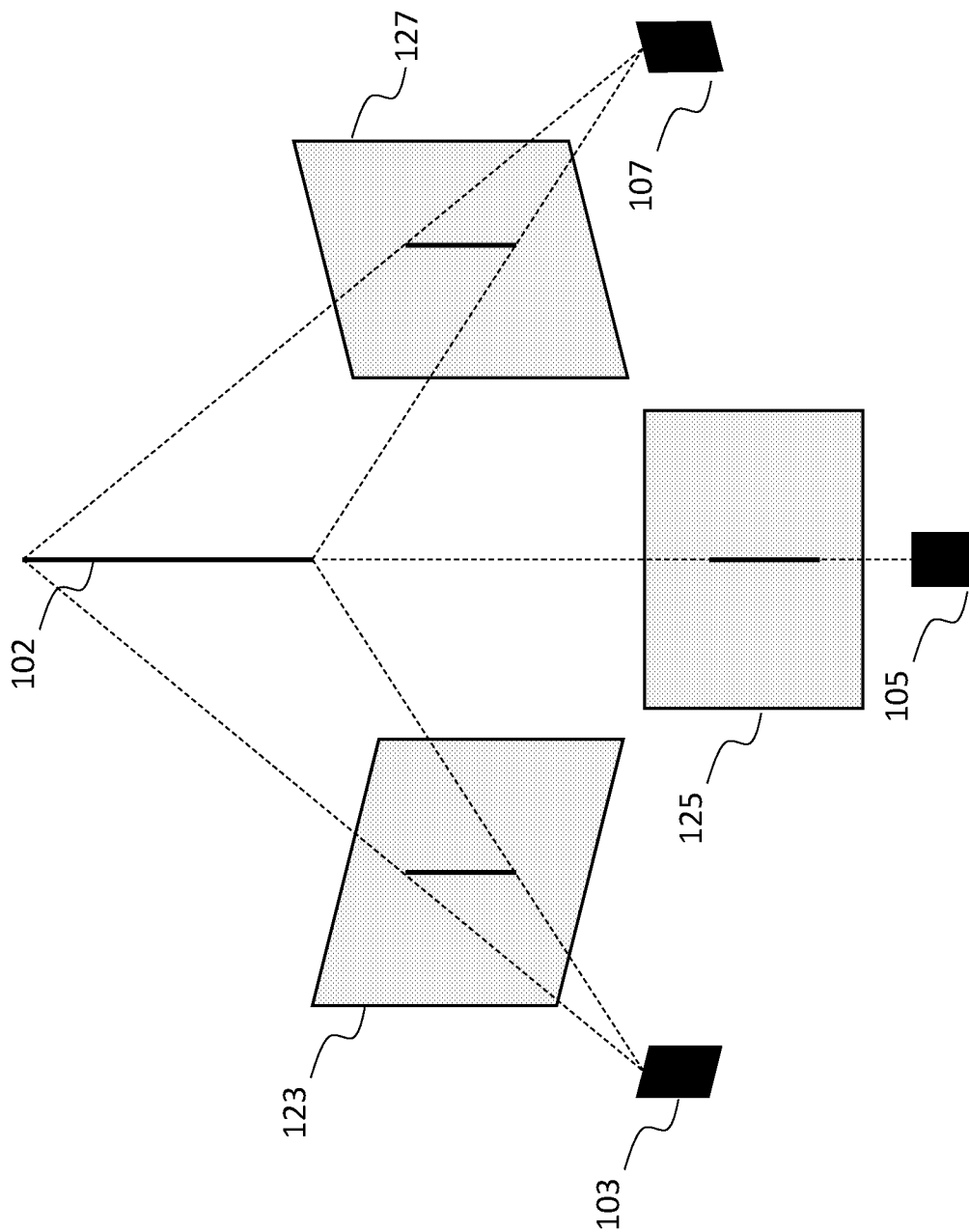
FIG. 1 depicts camera degree of freedom about certain geometries.

In the following description, for the purposes of explanation, numerous specific details are set forth in order to provide a thorough understanding of the described techniques. It will be apparent, however, that the described techniques may be practiced without these specific details. In other instances, well-known structures and devices are shown in block diagram form in order to avoid unnecessarily obscuring the described techniques.

Structure Association Using Structure Features

As used herein, the term "structure" refers to any 3-dimensional object. Structures generally have one or more features whose boundary representations may be generated based on an image depicting the structure. A structure may be a man-made or natural. Structures may include buildings (such as houses, offices, warehouses, factories, arenas, stadiums, storage tanks, silos, and other types of buildings), non-building constructs (such as monuments, walls, fences, and other non-building constructs), infrastructure (such as bridges, roads, walkways, and other infrastructure), and/or natural objects (such as trees, shrubbery, topiary, mountains, plateaus, beaches, and other natural objects), etc.

A "feature" is any element, portion, or attribute of a structure that is detectable in an image of the structure. A feature may be an exterior feature or an interior feature. In one or more embodiments, a feature may be any shape, such as a polygon shape that is co-planar with (i.e., disposed on) a surface of the structure, or a simple geometric construct-type shape, such as a line or point (for example, ridge lines on roofs, posts defining gables, corners where roof lines meet, crown molding lines). Exterior features of a structure may include, for example, doors, windows, houses, fascia, roof, gables, etc. A surface that is co-planar with a feature may be a façade or roof of the associated structure on which the feature is disposed. Interior features of a structure may include, for example, paintings, fireplaces, televisions, mirrors, whiteboards, desks, etc. The co-planar surface may be a wall of the associated room.

As an example, for a building-type structure, exterior features may include doors, windows, apartment delineations, fascia, roofs, roof lines, gables, dormers, etc. Exterior building features are considered to be co-planar with one or more exterior surfaces of the building, such as a façade, a wall, or a roof segment of the building. Interior features of the building may include, for example, paintings, fireplaces, televisions, mirrors, whiteboards, desks, etc. An interior surface that co-planar features may be disposed upon may be, for example, a wall of a room.

General Overview

Techniques are described herein for inter-image correlation of features of a structure depicted in different digital images. Specifically, correspondences between features of a structure that is depicted in the different digital images are identified. Based on the identified correspondences, transformations are generated that describe one or more changes in camera position used to capture the different digital images.

For example, a first digital image depicts a particular surface from a first camera position, where the particular surface has a first orientation with respect to the camera. Also, a second digital image depicts the same surface from a second camera position, in which the particular surface appears to have a different orientation relative to the image plane of the first position. In this example, one or more features that are co-planar with the particular surface are visible in both the first digital image and the second digital image. Thus, correspondences may be identified between the one or more features depicted in both of the first digital image and the second digital image.

In one or more embodiments, digital images being analyzed for feature correspondence are associated with metadata that represents one or more features that are co-planar with one or more surfaces of a depicted structure, which is referred to herein as "feature representation metadata" that identifies one or more "feature representations" for the associated digital images. Feature representation metadata comprises digital data indicating one or more particular feature representations, where a feature representation comprises a geometry of a boundary of the feature, such as coordinates for a point, vertices for a line, or vertices and/or edges of polygon shape. The feature representation metadata included in or associated with each digital image identifies one or more features that are visible in that digital image.

To facilitate feature matching and correspondence generation in image analysis between digital images without having previously-known transformation (e.g., rotation and/or translation) data relating the digital images, in one or more embodiments, a homography is generated based on the feature representation metadata for both a first digital image and a second digital image. As explained in further detail below, a homography is a matrix relating two images that depict the same planar surface, e.g., the wall of a building. A homography is generated to align (a) a representation of a particular feature that is disposed on (or is co-planar with) a surface depicted in a first image to (b) a representation of the particular feature that is disposed on the same surface depicted in the second image.

For the purpose of explanation, examples are described herein where the co-planar features (i.e., features in two images that are disposed upon the same surface) being correlated between digital images are windows of buildings. However, the techniques described herein are not limited to any particular type of structure or any particular type of feature of a structure. Any set of images that target the same image subject, and that include corresponding feature representations may be analyzed for feature correspondence. Similarly, although examples of feature correspondence analysis herein refer to images that include window representations, any other type of feature representation within an image, e.g., doors, paintings, furniture, and other interior or exterior building features, may be analyzed for feature correspondence.

Feature Correspondence and Association Overview

To successfully reconstruct a subject in three dimensions ("3D reconstruction") with accuracy, images from all perspectives are desired. However, system constraints such as storage, transmission, and image processing times motivate taking only the minimal number of images required to successfully recreate the subject. Minimal image capture frequently presents the problem of wide baseline image analysis, where multiple images are taken of a common subject but from different positions, with substantial changes to a rotation matrix between the images' camera position and/or image plane, for example.

An example of wide baseline changes would be taking a first image of a subject from its front and then taking a second image of that subject from its side. The camera position and orientation between those two images is substantially different relative to the subject. As a result, features used for correspondence between images can have substantial changes in perceived location, or not be present across images at all.

Some techniques may mitigate wide baseline image processing by using intervening camera position information, metadata, or filters such as a Kalman filter. However, these solutions are prone to errors. For example, a GPS signal indicating the position of a smartphone across a series of images may not be perfectly accurate as to the true position of the camera, and therefore transformations between camera positions may be inaccurate. Sources of GPS error include atmospheric interference or multipath errors from signals reflected off of surfaces proximate the sensor, typically from nearby buildings. Additionally, geolocation data may be protected information in certain cases, and restricted from certain collection means or sharing across systems and parties. Camera position data from supplementary sensors, therefore, may not be reliable or available to certain wide baseline imaging processes.

As such, wide baseline imaging, without intervening camera position information, presents a large degree of error in determining camera positions based on geometries and/or features across images.

FIG. 1 depicts an example subject captured in various positions by one or more image capture devices. In FIG. 1, a linear subject 102 is positioned relative to image capture devices in positions 103, 105, and 107. Positions 103, 105, and 107 may represent the same image capture device in different positions at different times, different image capture devices in different positions at the same time, or any combination thereof. The image capture devices at positions 103, 105, and 107 have a respective image planes 123, 125, and 127 in its field of view through which the image capture device captures the subject 102.

As can be seen in FIG. 1, since subject 102 comprises a single line, subject 102 appears substantially the same in each of image planes 123, 125, and 127. Without any other components or features, there is a large degree of freedom in the camera positioning about subject 102, and very little information can be derived about subject 102 from the images, as the image captured at each position appears the same.

Similarly, localization techniques intended to derive where an image capture device was positioned, relative to subject 102, would produce a large or infinite number of solutions. Indeed, each of positions 103, 105, and 107 would be a potential 'solution' when determining image capture device position to subject 102 given any of the images captured in image planes 123, 125, or 127. That is, given an image depicting subject 102 as viewed in image plane 123, it would not be possible to determine whether the image capture device captured the image from position 103, 105, or 107.

Figure 2:
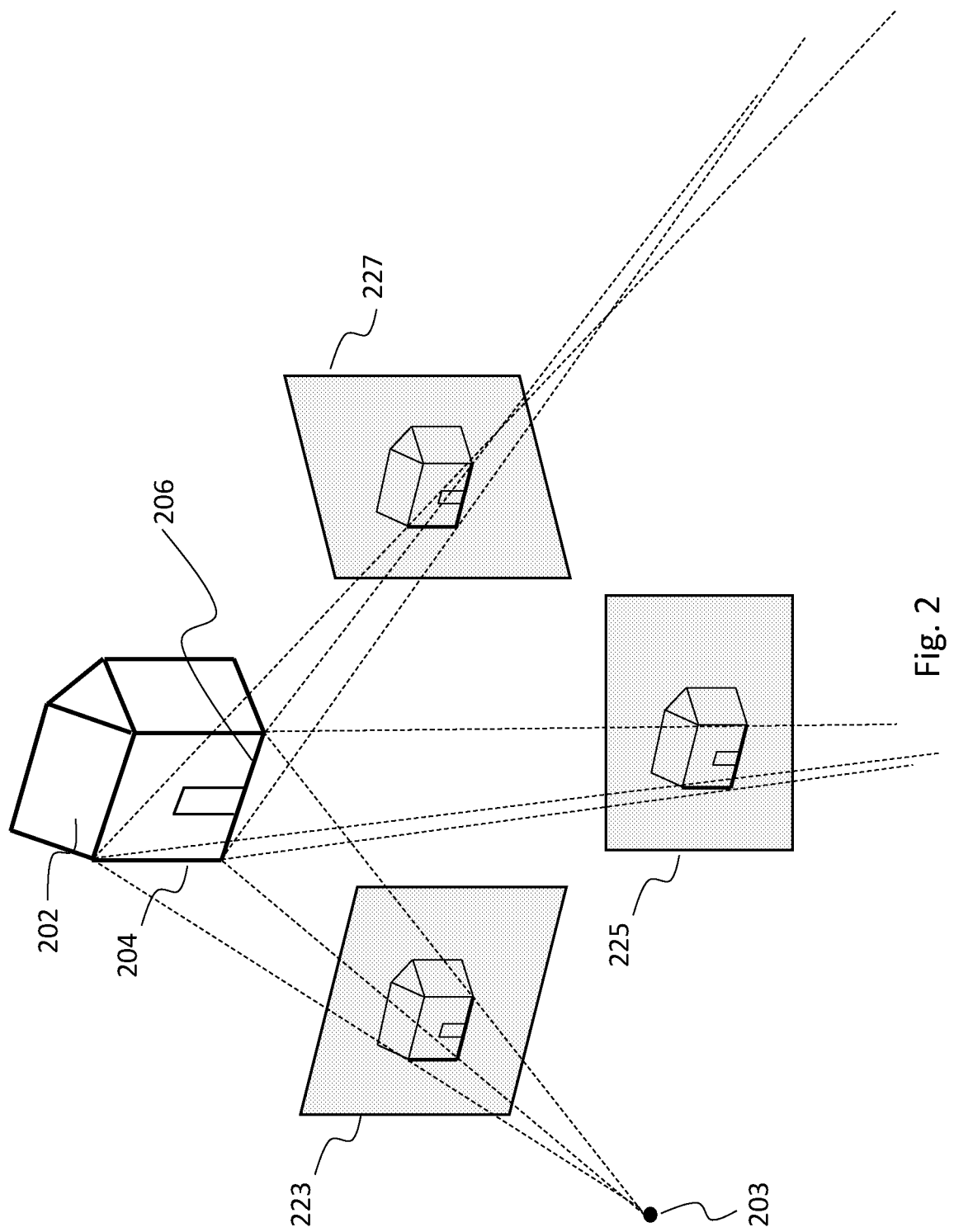
FIG. 2 depicts additional geometries constraining camera degrees of freedom and positions.

Introducing additional features to an image subject alleviates this issue with position determination. The additional features constrain the degree of freedom that an image capture device has to produce a similar-looking image. FIG. 2 depicts an example complex subject captured in multiple positions by one or more image capture devices.

In FIG. 2, a complex subject 202 (a house) is seen through three image planes 223, 225 and 227. In the depicted example, subject 202 includes a left post 204 and a ground line 206. Left post 204 and ground line 206 of subject 202 may be used to determine a camera position that captured a particular image.

For example, assume each of image planes 223, 225, and 227 correspond to a different potential camera position for an input image. When post line 204 and ground line 206 of subject 202 are traced back through image planes 223, 225, and 227, placing the same image of subject 202 in each of them only produces a solution in a single instance—at position 203, based on image plane 223. The input image only aligns with the actual subject 202 if the image capture device was at position 203.

Figure 3:
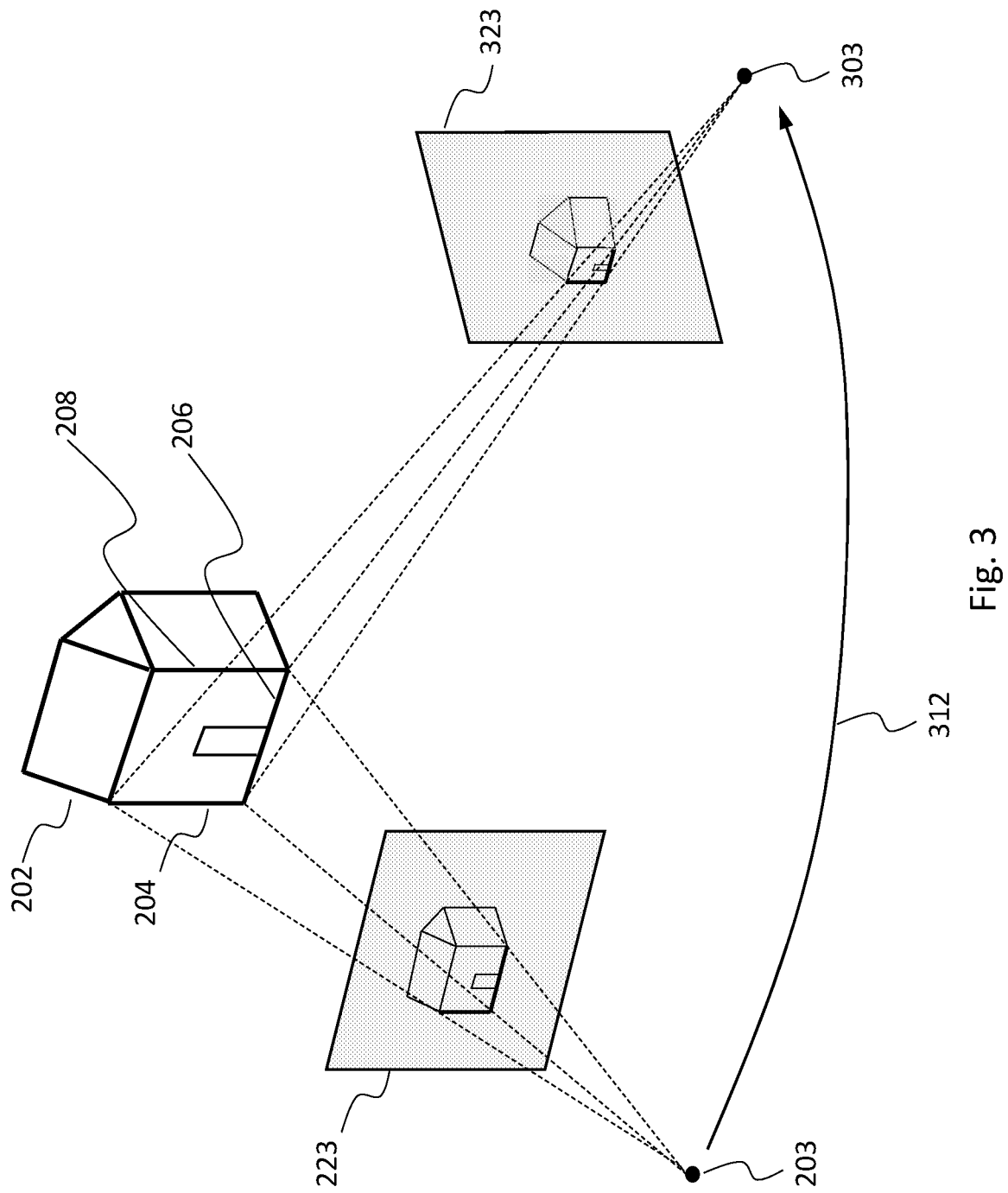
FIG. 3 depicts rotational information between camera positions and image plane information according to one or more embodiments.

Those same lines, left post 204 and ground line 206, may also be used to determine camera poses for other images in which the lines appear. FIG. 3 depicts an image plane 323 that views a different perspective of subject 202 (figures not drawn to scale). By identifying the same features as viewed by position 203 and image plane 223, position 303 may be derived from those features as seen in image plane 323. Additionally, a transformation 312 between positions 203 and 303 may be calculated. Transformation 312 may, in turn, be used to provide photogrammetry inputs, such as the lengths of lines 204 or 206 or distance to subject 202 from each camera position. Accurate transformations 312 then, in wide baseline imaging, is a critical input for downstream processing and is dependent upon accurate feature correspondence.

However, perfect knowledge of an image subject's geometry may not be available, and in some cases, the only information available about the image subject is what is in the captured images without any additional knowledge regarding where relevant features actually exist in the real world. Without prior knowledge of the subject, feature correspondence and association are complicated by potentially matching features that do not relate to the subject, matching the wrong features with one another, or having a feature be visible in one image but not another.

Although FIG. 2 and FIG. 3 depict simple instances of easily identifiable features across images, in real applications, wide baseline imaging rarely presents such simple scenarios.

Figure 4:
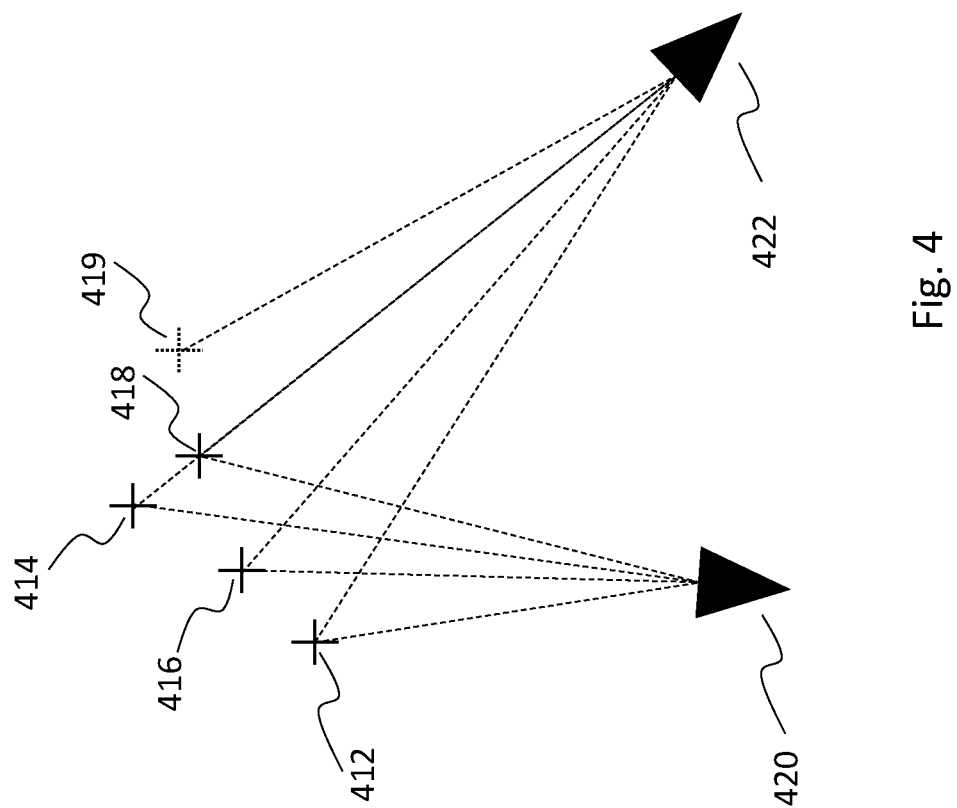
FIG. 4 depicts co-visibility and feature detection problems in wide baseline image processing.

As an example, FIG. 4 depicts a plan view of two cameras 420 and 422 viewing the same collection of features. As depicted in FIG. 4, camera 420 has a relatively clear line of sight to each of features 412-418. However, camera 422 has a substantially common line of sight for features 414 and 418. Thus, when analyzing an image captured from the position of camera 422, features 414 and 418 may be confused for one another.

In addition to feature mis-identification, additional variables such as camera intrinsics or image quality can also result in substantial errors in deducing camera positions across images that do not have strong correspondences. For example, referring to FIG. 3, if line 204 was not visible in image plane 323, or was mistaken for line 208—either by a human annotator or by a machine learning markup tool that was trained to identify and extract or annotate features—a camera position would not be solvable or would be inaccurate.

Similarly, if lines not part of subject 202 (like mailboxes, powerlines, etc.) were identified from the image, they could be confused with lines that belong to subject 202. Additional sources of error may include shadows in one image that do not appear in a second image, which may produce lines in the first that are incorrectly associated with structure lines in the second image. Referring again to FIG. 4, some features not seen by camera 420 may be visible to camera 422. For example, feature 419 may be visible to camera 422 only, and may be mistaken as the same as feature 418 given its relative position to camera 422 and the expected distribution of features as inferred from camera 420.

Figure 5A:
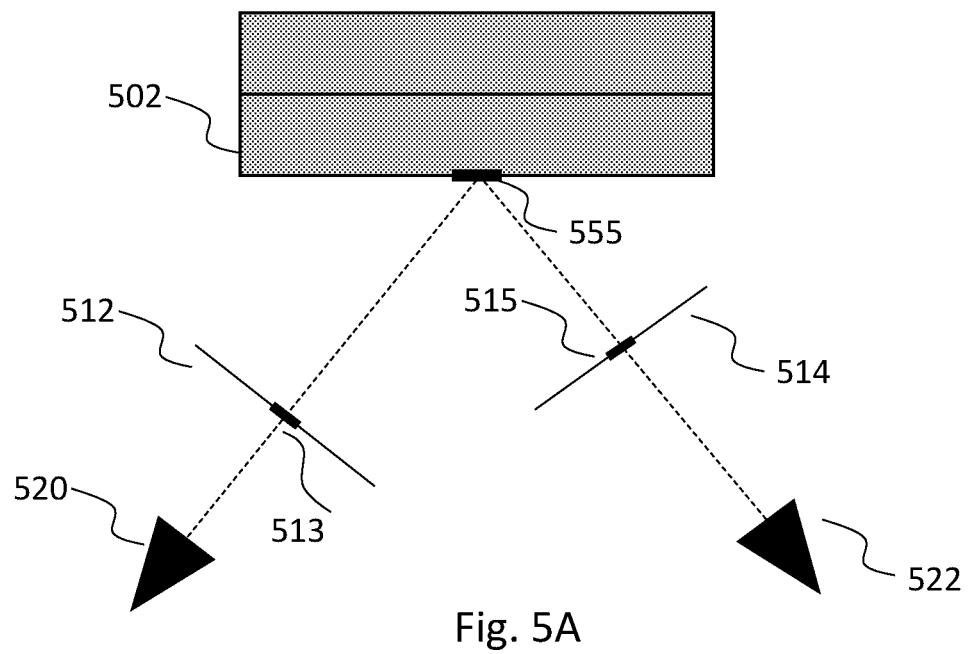
FIGS. 5A-C depict geometry reconstruction problems from incorrect feature correlation.

Regardless of specific error source, if feature correspondences across images are incorrect, then the resulting 3D reconstruction will also be inaccurate or incorrect. As an example, FIG. 5A depicts a plan view of image capture devices capturing the same structure feature. In FIG. 5A, building 502 includes a feature 555. Feature 555 may be, for example, a door on the front façade of building 502. Image capture devices at positions 520 and 522 view building 502 through respective image planes 512 and 514. In feature 555 is identified in image plane 512 as feature 513, and in image plane 514 as feature 515.

In FIG. 5A, image plane 514 correctly correlates its identified feature 515 with the same feature 513 in image plane 512. A correct correlation of the features 513 and 515 allows reconstruction of the feature 555 in 3-dimensional space with correct geometry relative to building 502. However, if an input position is incorrect or if a feature viewed in image plane 512 is incorrectly matched to a feature viewed in image plane 514, then the 3D reconstruction of building 502 would be incorrect.

Figure 5B:
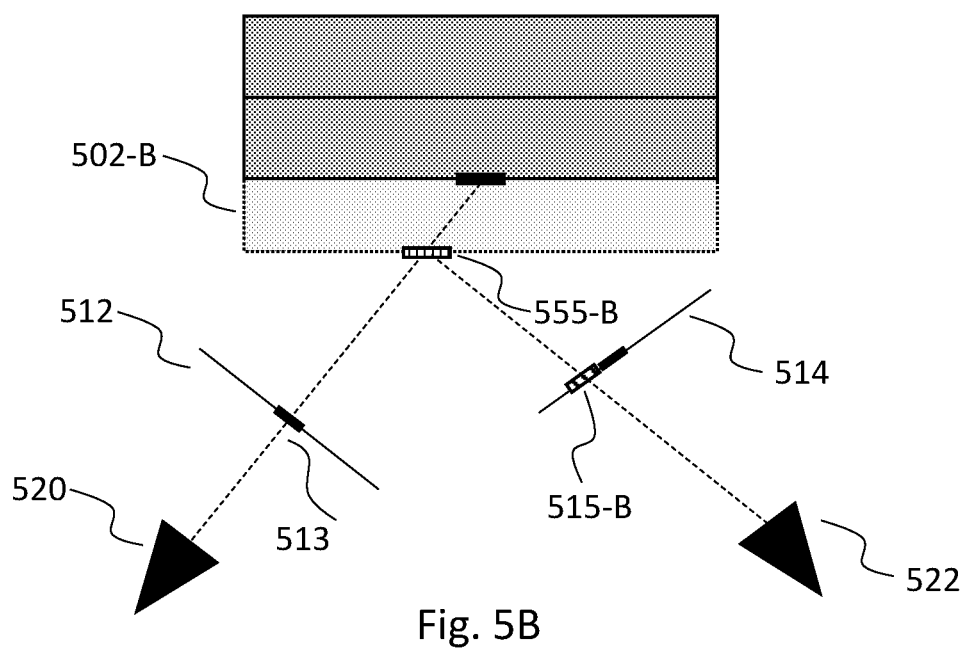

As an example, FIG. 5B depicts incorrectly matched features for building 502. In FIG. 5B, feature 555 is incorrectly matched to feature 515-B in image plane 514. 3D reconstruction based on the incorrectly identified feature 515-B places feature 555 at the location indicated by feature 555-B instead. In turn, reconstructing the geometry for building 502 using the incorrectly placed feature 555-B results in building geometry 502-B. As depicted in FIG. 5B, the geometry of building 502-B is different from the true geometry of building 502.

Figure 5C:
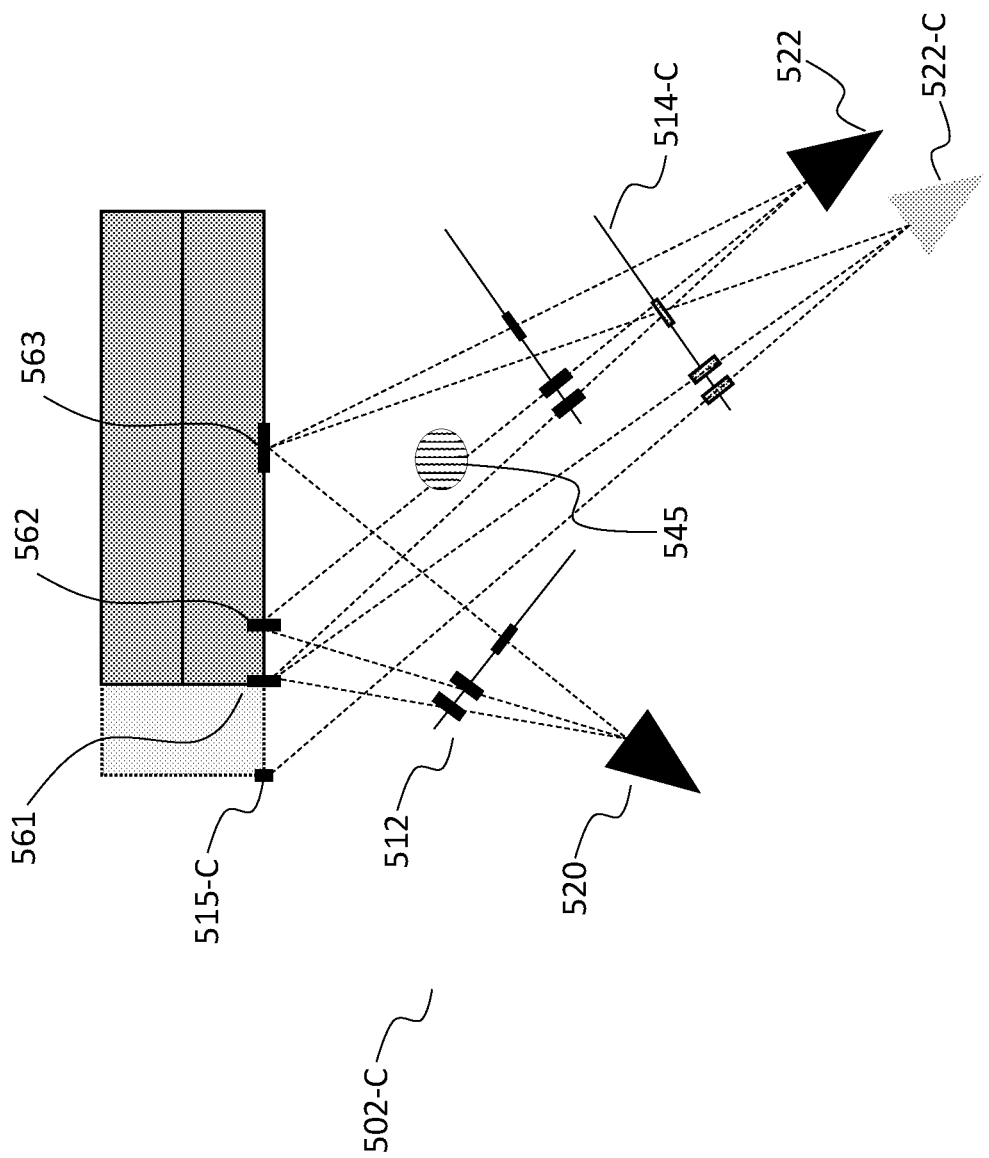

Similarly, FIG. 5C depicts incorrect feature correlation resulting in incorrect camera position determination. In FIG. 5C, an image capture device at position 520 captures three features 561, 562, and 563 on the façade of building 502. Ideally, an image capture device at position 522 would capture the same three features. For the purpose of illustrating a clear example, assume an occluding object 545 interferes with the line of sight of feature 562 from an image capture device at position 522, but feature 515-C is viewable. If feature 515-C is incorrectly correlated with feature 561, then image plane 514-C leads to calculating incorrect camera position 522-C and incorrect geometry 502-C.

Process Overview

As discussed above, accurate feature detection and matching across multiple images is central to localization and reconstruction techniques. In one or more embodiments, to facilitate feature matching and correspondence generation, a homography is generated between data representing features on a surface of a subject depicted in a first image and a second image. The homography is generated to align a representation of a first feature disposed on the surface of the first image with a representation of a second feature in the second image.

Figure 12:
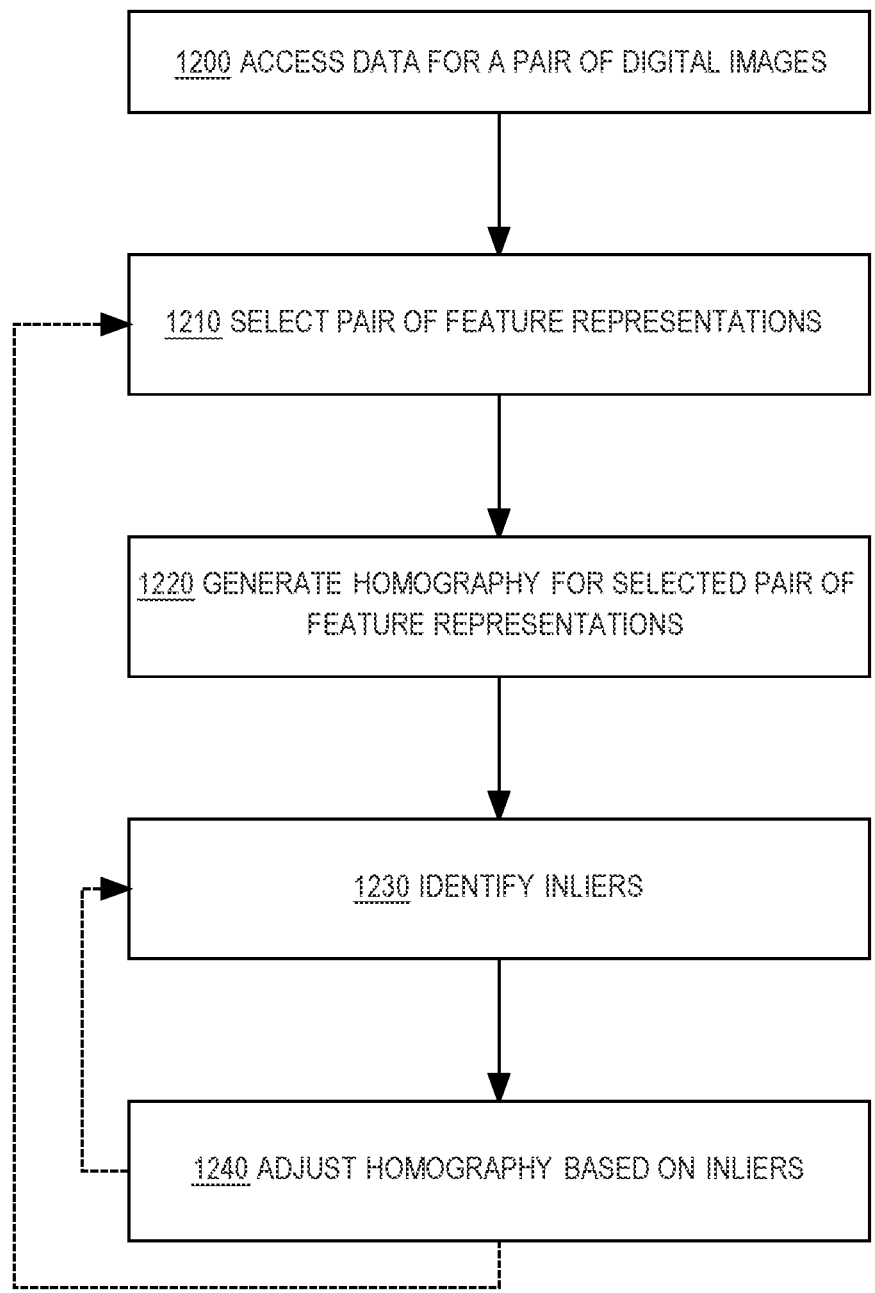
FIG. 12 depicts a flowchart for generating a homography for a pair of digital images.

FIG. 12 depicts an example flowchart for generating a homography between data representing co-planar features in a pair of digital images. While FIG. 12 depicts steps 1200-1240, these steps may be performed in a different order or may be variously omitted, according to one or more embodiments.

At step 1200, a computer system accesses data for a pair of digital images or photos depicting a structure. The digital images may be received from a source device, such as a data server, an image capture device, or a data storage device, or may be made accessible in storage that is communicatively coupled to the computer system. In one or more embodiments, the computer system identifies a set of digital images that depict a particular structure, and selects the pair of digital images from the set. According to an embodiment, each digital image of the pair of digital images depicts the same structure from different camera positions. In each digital image, one or more features of the structure are visible, and one or more of these features may be co-planar with (or disposed on) a particular depicted surface of the structure.

Figure 6A:
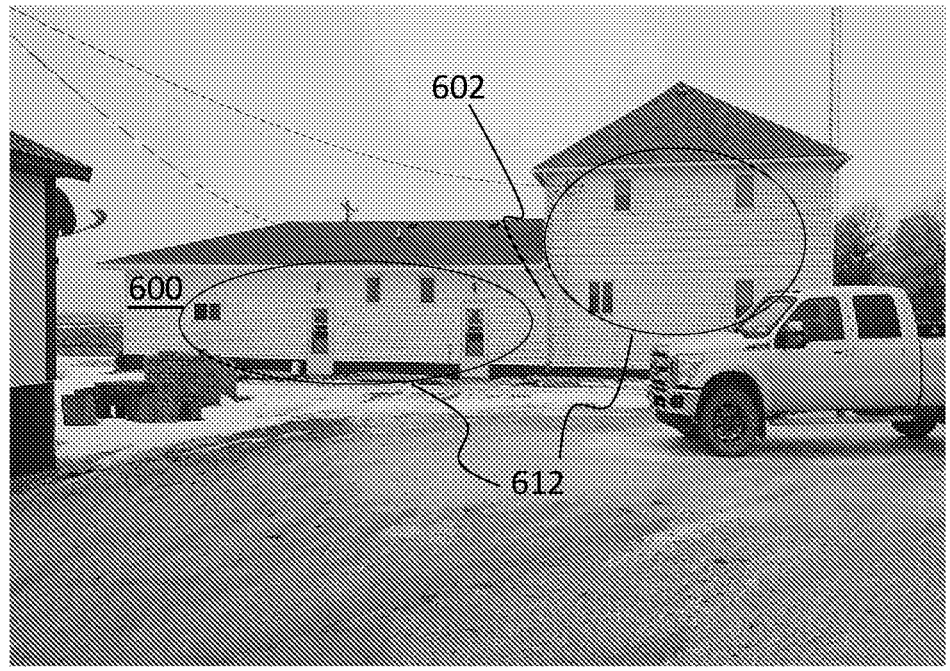
FIGS. 6A-B depict a pair of images of a subject from different camera positions.
Figure 6B:
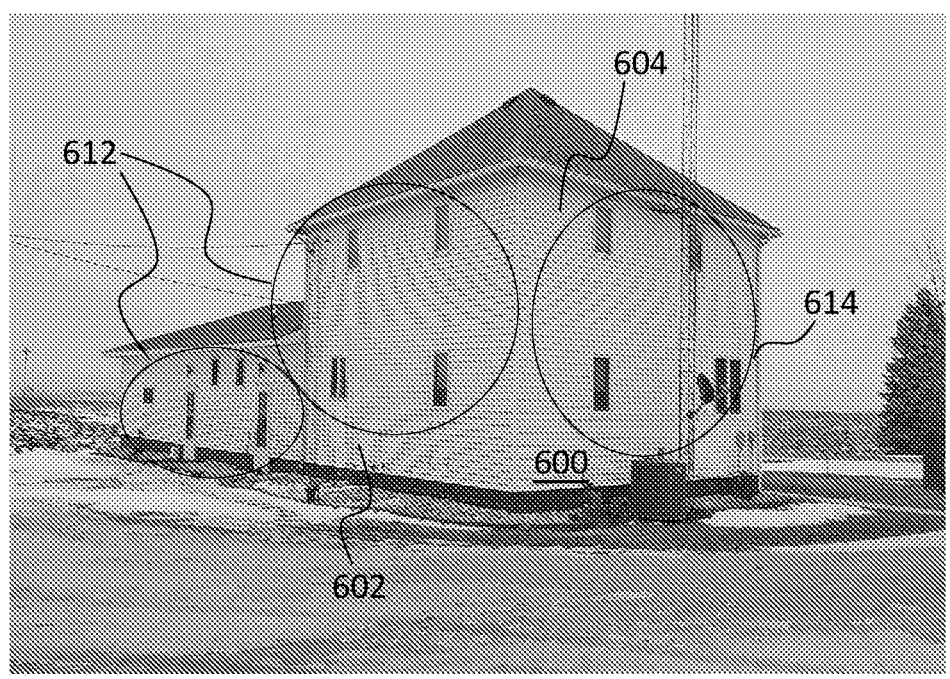

For example, a computer system receives example images depicted in FIGS. 6A and 6B. FIG. 6A depicts a first image of a building 600, captured from a first camera perspective. In FIG. 6A, building 600 includes a surface comprising a façade 602 and a set of features 612 that are co-planar with and disposed upon façade 602 (i.e., windows and doors).

FIG. 6B depicts a second image of building 600, captured from a second camera perspective, which includes a representation of façade 602. The representation of façade 602 in FIG. 6A has a different orientation, i.e., with respect to the image plane of FIG. 6A, than the orientation of the representation of façade 602 in FIG. 6B. In addition to features 612 that are also depicted in FIG. 6A, FIG. 6B includes a representation of a second surface of building 600 comprising façade 604. FIG. 6B further includes representations of features 614 that are co-planar with and disposed upon the second façade 604. As discussed above, computer vision techniques to build 3D models and/or identify and associate features between the two images and the additional lines and features depicted in FIG. 6B relative to FIG. 6A present opportunity for features to be incorrectly matched between images, leading to the reconstruction and camera position errors as described above.

The one or more respective features of the structure that are visible within a digital image may be identified manually, such as by a user adding annotations, labels, and other data to images to indicate feature locations and/or details regarding the features (such as feature type-lines, corners, center points, etc.), or by a computer, for example using machine learning or other automated techniques, such as Hough transforms, Canny edge detection, etc.

In one or more embodiments, each digital image being analyzed for feature correlation includes, or is associated with, feature representation metadata that describes representations of structure features depicted in the digital image. Feature representation metadata describes a given feature representation in a given image based on information defining a geometry of and/or location within the image of the boundary of the feature being represented. Thus, feature representation metadata includes one or more of: coordinates for a point on the boundary to identify the relative location of the point in the image, vertices for a line to define a line of the boundary, or vertices and/or edges of a polygon shape that represents the boundary. The feature representation metadata associated with each digital image identifies one or more structure features visible in that digital image.

In one or more embodiments, the feature representation metadata further identifies one or more surfaces of a depicted structure, and associates each feature defined in the metadata with a respective surface on which the feature is disposed. Additionally, feature representation metadata may include orientation information for a feature, e.g., one or more vanishing points associated with the feature, whether the feature is left or right facing, etc. Example techniques for generating data representing features are described in U.S. Provisional Patent Application No. 62/893,100, filed on Aug. 28, 2019, the contents of which are hereby incorporated by reference in their entirety.

In one or more embodiments, the representations of features utilized are subsets of a plane for the subject structure, and therefore are more likely to be viewed across multiple images of that structure. For example, a poorly framed image of a house may not capture a corner or complete roofline of a façade, in which case, the geometry of the façade in that image is incomplete. A representation of a feature (such as a window or door) disposed on that façade, however, is much more likely to be completely depicted with all its geometries due to the smaller size. Furthermore, for features where the shape is known or assumed, e.g., quadrilateral features, portions that are outside the boundaries of the image or are hidden from view may be inferred based on the geometry of the feature.

Figure 7A:
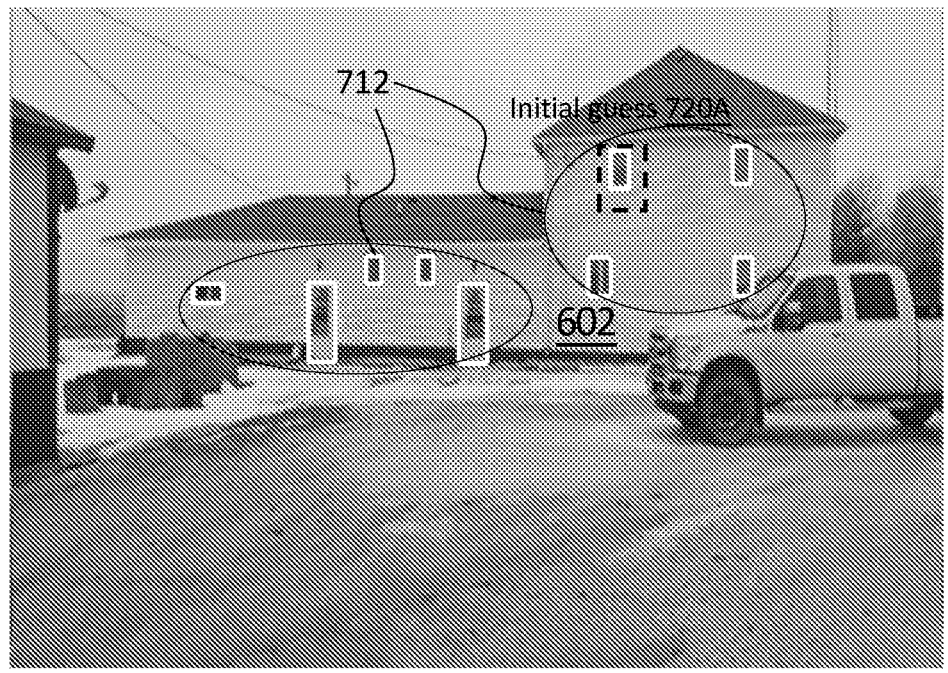
FIGS. 7A-C depict matching representations of structure features across images.
Figure 7B:
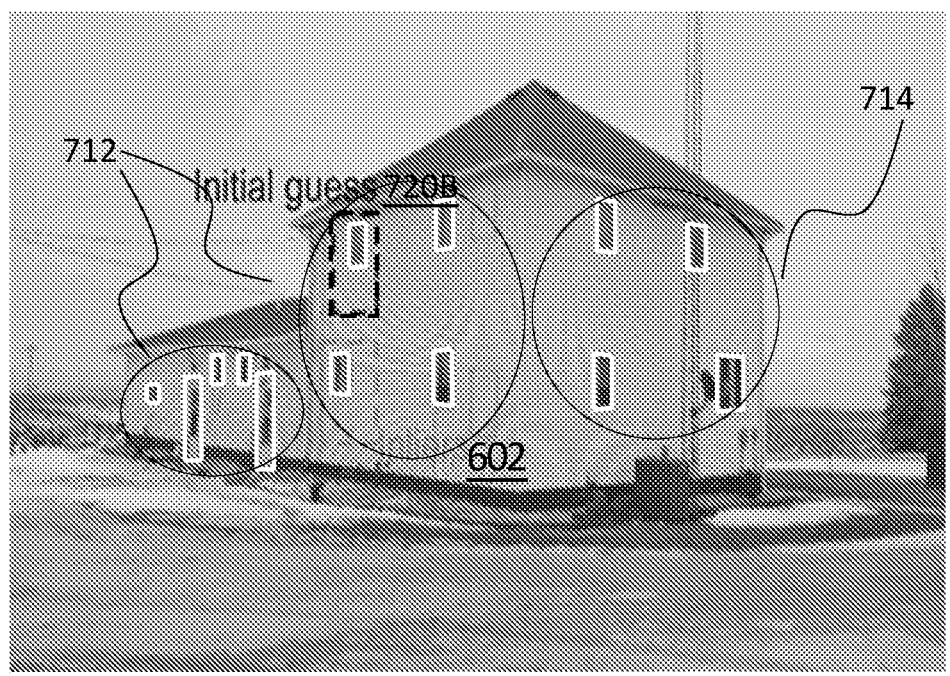

Additionally, in one or more embodiments, boundary indicators for the one or more respective features are graphically depicted or indicated in each digital image. Such boundary images may be based on feature representation metadata associated with the digital image. For example, a boundary indicator that comprises one or more points, lines, and/or shapes that depict or indicate the boundaries of a feature depicted in a digital image is drawn on a digital image. To illustrate, FIG. 7A depicts boundary indicators for feature representations 712 (shown as white outlines around the features) corresponding to features 612 on the image of building 600 depicted in FIG. 6A. FIG. 7B similarly depicts boundary indicators for representations 712, as well as boundary indicators for representations 714 corresponding to features 614 of the image of building 600 depicted in FIG. 6B. For the purpose of illustrating a clear example, boundary images for feature representations 712 and 714 are depicted in FIGS. 7A and 7B as being graphically indicated in the images. However, depending on the embodiment, feature representations 712 and 714 may not be visually highlighted using boundary indicators in any or all images that include the feature representations.

Selecting a Pair of Feature Representations

At step 1210, a pair of feature representations—a first feature from the first digital image and a second feature from the second digital image—are selected as a potential match. In one or more embodiments, selecting a feature from a digital image comprises selecting the corresponding feature representation from one or more feature representations identified in feature representation metadata included with or associated with the digital image.

For example, referring to FIG. 7A, a first feature representation 720A is selected from representations 712 of the first image (in FIG. 7A). A second feature representation 720B is selected from representations 712 or 714 of the second image (in FIG. 7B). The first feature representation 720A may be randomly selected, user selected, or selected based on an ordering of a list of feature representations in the feature representation metadata, etc. As discussed below, in one or more embodiments, multiple pairings of feature representations from a pair of images may be made and a homography generated for each pairing. For example, each feature representation in the first digital image may be paired with one or more feature representations from the second digital image and the resulting feature pairs may be analyzed in serial or in parallel. A homography may be generated for each pairing. Similarly, additional pairings may be made between additional feature representations from the first digital image and feature representations from the second digital image.

The second feature representation from the second image that is selected to be paired with the first feature representation may be randomly selected, user selected, selected based on additional metrics or metadata, or any combination thereof. In one or more embodiments, the additional metrics or metadata used to select a feature representation may include, for example, aspect ratios of the selected features, elevation of the selected features, shape, etc. As an example, to reduce the likelihood that a representation of a door is paired with a window, the aspect ratio of the two selected features may be compared to each other and, if the comparison is outside a threshold, the pairing is rejected for further analysis.

In one or more embodiments, camera information such as azimuth direction for each image may indicate which direction in the image is north, and facilitate matching windows of a single façade based on the orientations of the representations relative to that azimuth information. Façade orientation may be calculated by surface normal estimation techniques (such as computing the cross product of orthogonal lines of the façade) or vanishing point analysis. Additionally, in one or more embodiments, feature representation metadata may include data indicating an orientation of a given feature, e.g., direction and/or vanishing point. Feature representations from a second image, that are paired with a first feature representation from the first image, and that belong on different surfaces or facades from the first feature representation may be discarded as a potential match for the first feature representation.

Filtering potential pairings based on additional metrics and/or metadata reduces the likelihood that inaccurate pairings are selected as matches. For example, representations from façade 602 (representations 712) are less likely to be incorrectly paired with those on façade 604 (representations 714).

Generate Homography for Selected Pair

At step 1220, a homography is generated for the selected pair of feature representations. In one or more embodiments, the homography for the pair of representations is generated to align the first feature representation from the first image to the second feature representation from the second image.

In one or more embodiments, the alignment is performed using a least-squares analysis between a first set of points in the feature representation metadata that describes the representation of the first feature and a second set of points in the feature representation that describes the representation of the second feature. For example, for a quadrilateral feature, a computing system performs a least-squares analysis between a first plurality of points defining the four corners of the boundary of the first feature representation and a second plurality of points defining the four corners of the boundary of the second feature representation. Examples herein are described in the context of quadrilateral features. However, embodiments are not limited to quadrilateral-shaped features, and are applicable to any kind of feature that is detectable in an image and definable by one or more points. An example tool for performing a least-squares calculation and deriving a homography using the feature representations is the OpenCV FindHomography function.

The following equation 1 is an example equation relating the first feature representation from the first image with the second feature representation from the second image. For the purpose of illustrating a clear example, assume the first and second feature representations are quadrilateral. In example equation 1, w, x, y, and z correspond to four points (e.g., the four corners) of the first feature representation in the first image, and w', x', y', and z' correspond to four points (e.g., the four corners) of the second feature representation in the second image. A homography H is generated such that when H is applied to the first representation, it produces the points for the second representation.

$$\begin{bmatrix} w & x \\ y & z \end{bmatrix} H = \begin{bmatrix} w' & x' \\ y' & z' \end{bmatrix} \quad \text{Equation 1}$$

Identifying Inliers

In one or more embodiments, the homography H is applied to other feature representations from the first image, e.g., the one or more of feature representations 712 other than first feature representation 720A. Applying the homography causes the representations to be transformed to their shape, and/or location in the second image based on the relationship of the selected pair of feature representations. A location of a feature representation within an image may be represented by coordinates of one or more pixels of the feature representation within the image.

Figure 7C:
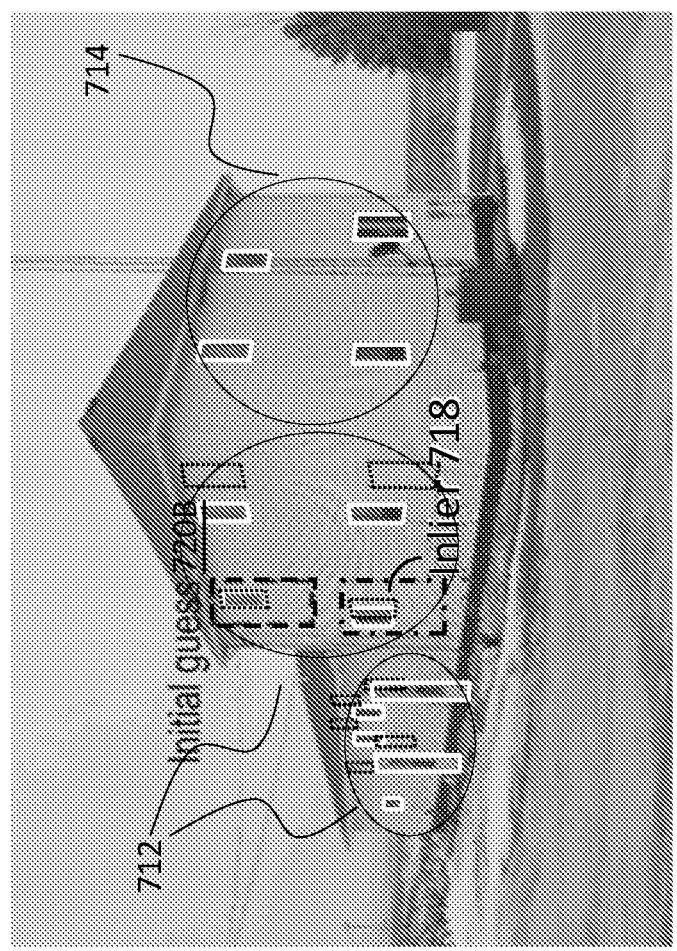

Referring to FIG. 7C, feature representations, transformed based on application of homography H, from the first image are overlaid on the second image. In FIG. 7C, the upper-left feature representation (based on first feature representation 720A) from representations 712 of the first image is matched with the feature representation 720B, that was paired with feature representation 720A, in the second image. In FIG. 7C, the feature representations from the second image are associated with white outline boundary indicators, while the estimated locations of the feature representations from the first image, that have been transformed based on applying the homography, are indicated with black dotted boundary indicators.

Using representations for the data of features, such as the outlines of windows, permits data from multiple images to be compared on a common image. If a homography were applied to image data itself, then all of the image data would be transposed. In other words, if the homography were applied to an entire image then additional processing steps such as segmentation or extraction on the features to be compared would be needed to be performed to determine how the relevant features in the images compare post-homography. The representations of features, then, may be thought of as an overlay or an additional layer of data to, or in one or more embodiments on, the original image. In one or more embodiments, the homography is selectively applied to the representation layer only.

For the purpose of illustrating a clear example, the figures described herein are depicted where the feature representations from the first image are visually overlaid on the second image. However, in one or more embodiments, a visual depiction, e.g., an image with outlines of the feature representations, is not actually generated. Rather, the homography is applied to the data for the feature representations from the first image and the resulting data is compared against the feature representation data from the second image.

In one or more embodiments, correctly matching feature representations, i.e., feature representations that correspond to the same feature, generate the perfect homography in that the other feature representations on the same surface from the first image will align with the same feature representations in the second image when the homography is applied. For example, if the selected feature representation from the first image is correctly paired with a feature representation from the second image, then when the homography is applied, all feature representations 712 from the first image would align correctly with the same representations 712 in the second image.

However, depending on various factors, even when the selected pair of feature representations correspond to the same feature, the other feature representations may not align exactly. In one or more embodiments, when the initial homography is applied to the other feature representations, one or more of the transformed feature representations may have some amount of error compared to the feature representations of that image. That is, the estimated location of an additional representation may have a certain amount of error, causing the additional representation to be offset from the exact location of that representation in the second image.

For example, in the example depicted in FIG. 7C, some of the black dotted lines, corresponding to additional feature representations 712 from FIG. 7A, are offset from the outlined white features, corresponding to the feature representations 712 from FIG. 7B.

At step 1230, inliers are identified from the additional feature representations. As referred to herein, an "inlier" refers to an additional feature representation that is considered correctly aligned (within an error tolerance as described below) when the originally generated homography is applied. Referring to FIG. 7C, an inlier 718 is labeled for feature representation corresponding to the window that is immediately below the selected pair of feature representations, and is marked with a dot-dash box. As depicted in FIG. 7C, the estimated location of the feature representation from the first image is close to the location of the feature representation from the second window.

Equation 2 is an example equation relating a first additional feature representation from the first image with a second additional feature representation from the second image. For the purpose of illustrating a clear example, assume the first and second additional feature representations correspond to a quadrilateral feature, and H refers to the homography generated in step 1220 described above. In example equation 2, a, b, c, and d correspond to four points (e.g., the four corners) of the first additional feature representation in the first image. In example equation 2, a', b', c', and d' correspond to four points (e.g., the four corners) of the second feature representation in the second image. When the homography H is applied to the first additional representation, it produces the points for the second representation, with a degree of error E.

$$\begin{bmatrix} a & b \\ c & d \end{bmatrix} H = \begin{bmatrix} a' & b' \\ c' & d' \end{bmatrix} + E \qquad \text{Equation 2}$$

Example methods for calculating the value of E may include nearest neighbor analysis or the Euclidean distance between the location of the second additional representation on the second image and the estimated location of the first additional representation on the second image.

In one or more embodiments, a tolerance amount or a threshold amount of error for E is provided, such as a threshold number of pixels that the locations can be offset. If the error E of an additional representation is below the tolerance or threshold, then that pairing—of the additional representation from the first image to the additional representation for the second image—is identified as an "inlier."

As an example, assume a pixel offset threshold of fifteen pixels is used. If the pixel offset between the location of a representation and the estimated location of its paired representation is less than fifteen pixels, then the pair of representations may be considered an inlier. If the pixel offset between a representation and its paired representation is greater than fifteen pixels, then the representation is not considered an inlier.

Referring to FIG. 7C, the estimated locations of the remaining feature representations from the first image are further away from the locations of the other feature representations from the second image, e.g., barely or not overlapping, and therefore, may not be considered to be inliers.

In one or more embodiments, if the error for all additional representations after applying H is outside the tolerance or threshold error (i.e., non-alignment of all representations), the initial pairing—between the first representation in the first image and the second representation in the second image—is assumed to be an incorrect match of feature representations and is discarded from further analysis. In one or more embodiments, if the error for a threshold number of additional representations after applying H is outside the tolerance or error threshold, then the initial pairing is assumed to be an incorrect match.

Figure 9A:
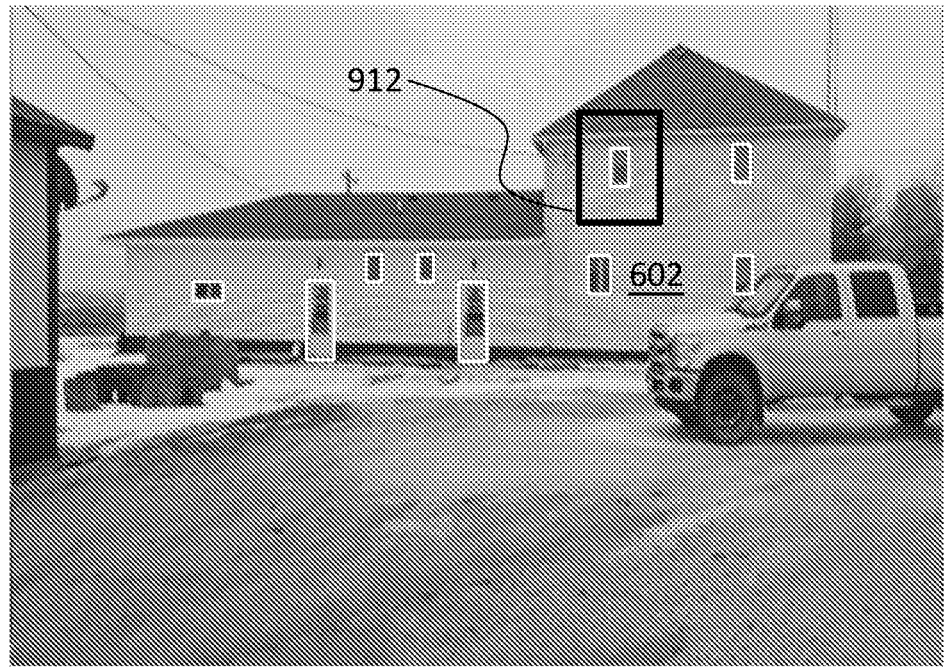
FIGS. 9A-B depict non-aligning homographies.
Figure 9B:
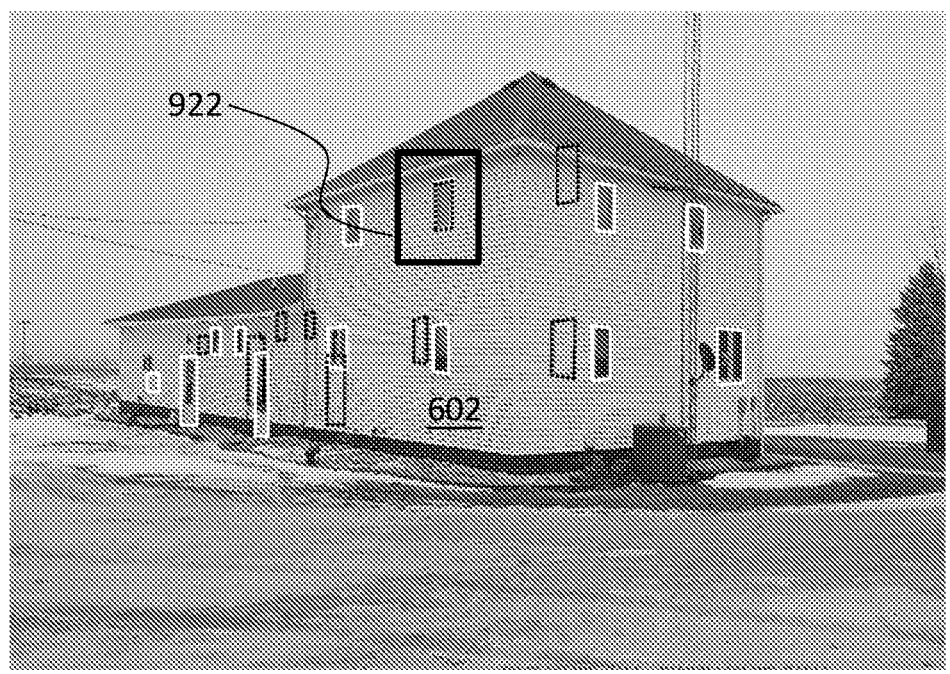

FIGS. 9A and 9B depict an incorrect matching of a feature representation between images. FIG. 9A depicts an example feature representation 912 and FIG. 9B depicts an example feature representation 922. As depicted in FIGS. 9A and 9B, feature representation 912 does not correspond to feature representation 922. For the purpose of illustrating a clear example, assume a resulting homography is generated based on pairing feature representations 912 and 922. As depicted in FIG. 9B, the homography of representations on façade 602 that align feature representation 912 in the first image with feature representation 922 in the second image results in the transformed versions of the other representations from the first image (i.e., FIG. 9A) having large offsets, i.e., outside of the tolerance or threshold error.

A mis-aligned feature representation is a transposed feature representation (that is from a first image and applied to a second image using a homography) that is over an error threshold number of pixels from any feature representation in the second image. According to an embodiment, the number of pixels is determined based on similar points of the feature representations being compared, e.g., the top right corners of the two feature representations. According to an embodiment, to determine whether a particular transposed feature representation is mis-aligned, the computing system compares the estimated location of the transposed feature representation in the second image to all features of the second image that have a similar aspect ratio to the particular transposed feature representation.

In one or more embodiments, if application of the homography fails to produce at least one inlier (i.e., none of the transformed additional features are within the error threshold of a feature representation), then the matching of the representations on which the homography was based is discarded as a valid solution. For example, in the depicted example, the pairing of representation 912 with representation 922 is considered an incorrect match based as no inliers are generated by the homography. According to an embodiment, in response to determining that the basis of the homography is an incorrect match, the computing system restarts the homography-construction process at step 1200 using the feature representation from the first image and a different feature representation from the second image, or dismisses the pairing as a potential correspondence altogether.

Adjusting the Homography

At step 1240, to generate additional inliers, the first homography is adjusted based on the one or more identified inliers and the original pairing. In one or more embodiments, using the points of the inlier feature representations, the original homography is adjusted to align those points.

Equation 3 is an example equation for generating an adjusted homography based on an original homography and an inlier. In Equation 3, a least-squares analysis, such as FindHomography, is used to determine the adjusted homography. Other techniques for calculating or generating an adjusted homography may be used depending on the implementation. For the purpose of illustrating a clear example, assume the feature representations correspond to quadrilateral features. In example equation 3, w, x, y, and z correspond to four points (e.g., the four corners) of the first feature representation in the first image. In example equation 3, w', x', y', and z' correspond to four points (e.g., the four corners) of the second feature representation in the second image. In example equation 3, a, b, c, and d correspond to four points (e.g., the four corners) of the first additional feature representation in the first image. Further, in example equation 3, a', b', c', and d' correspond to four points (e.g., the four corners) of the second feature representation in the second image. An adjusted homography H' is generated such that when H' is applied to the first feature representation and the first additional feature representation (the inlier according to the first homography), it produces the points for the second feature representation and the second additional feature representation.

$$\begin{bmatrix} w & x \\ y & z \end{bmatrix} H' + \begin{bmatrix} a & b \\ c & d \end{bmatrix} H' = \begin{bmatrix} w' & x' \\ y' & z' \end{bmatrix} + \begin{bmatrix} a' & b' \\ c' & d' \end{bmatrix} \quad \text{Equation 3}$$

Repeating the Adjustment and/or Representation Selection

In one or more embodiments, the adjusted homography is applied to one or more additional feature representations. The one or more additional feature representations may be feature representations that were not identified as inliers based on the original homography. Alternately, the adjusted homography may be re-applied to each feature representation, e.g., all feature representations 712.

Figure 8A:
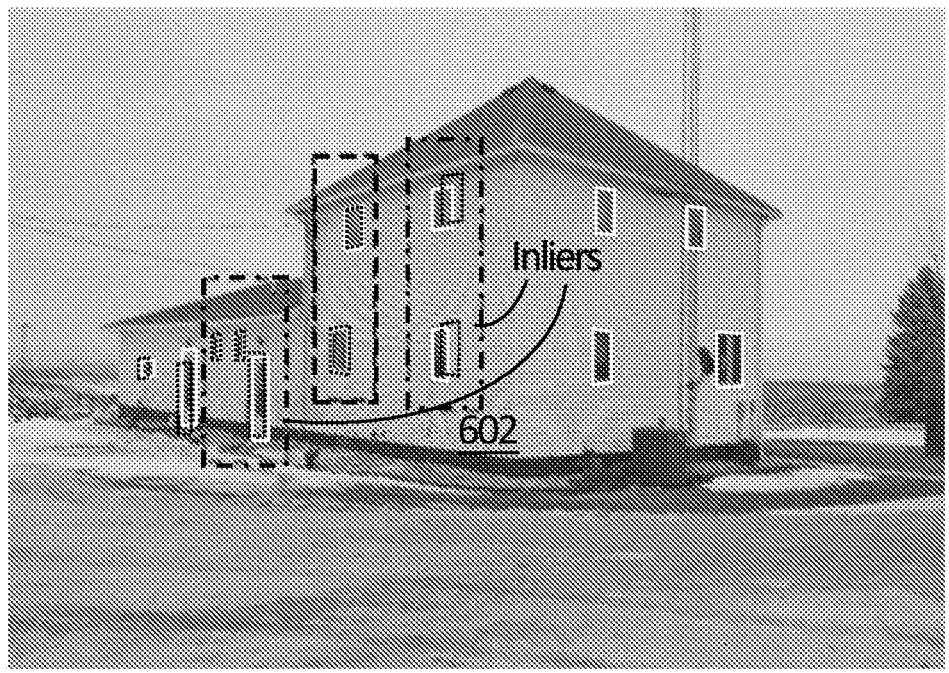
FIGS. 8A-B depict iterative homographies to generate correspondences across images.

In one or more embodiments, after applying the adjusted homography to one or more feature representations, one or more additional inliers may be identified. FIG. 8A depicts the generation of additional inliers subsequent to adjusting a homography based on the alignment of the two windows—the initial guess and the inlier—identified in FIG. 7C.

In one or more embodiments, step 1240 described above may be repeated to adjust the homography based on the additional inliers, until a target number of representation pairings have been aligned (i.e., a target number of inliers are identified) and/or no additional inliers are produced by the adjusted homography.

In one or more embodiments, the tolerance or threshold amount for determining additional inliers based on the adjusted homography is different than the tolerance or threshold amount for determining additional inliers based on the original homography or based on the adjusted homography from previous iterations. Referring to the above example, the threshold of error for a first calculated homography to identify inliers may be fifteen pixels, and the threshold of error for a second, adjusted homography to identify inliers may be ten pixels. The threshold of error for a subsequent adjusted homography may also be ten pixels, or may be further reduced, e.g., five pixels, depending on the embodiment.

In one or more embodiments, the homography adjustment is performed until no additional inliers have been found and/or a sufficient number of inliers have been found. Additionally or alternatively, homography iteration may be performed a specified number of times.

Figure 8B:
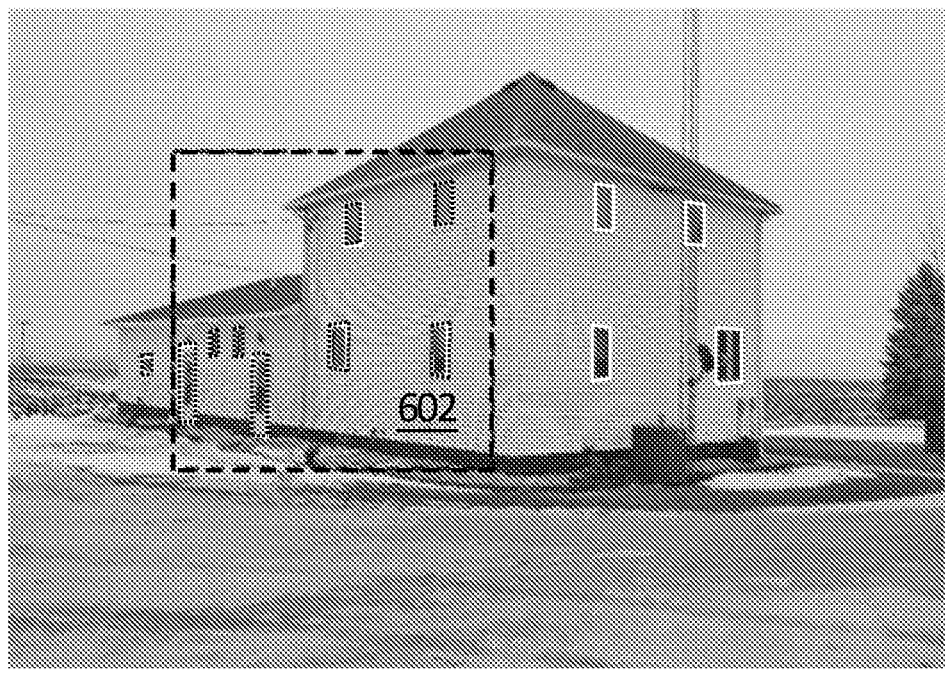

FIG. 8B depicts an example final homography that aligns all representations 712 from the first and second digital images. Although FIG. 8B depicts an alignment of all representations, homography iteration does not need be performed until all representations align.

In one or more embodiments, steps 1210 through 1240 described above are repeated for each pair of feature representations of a plurality of feature representation pairings. Additionally, one or more of the above steps may be performed in parallel. For example, a plurality of feature representation pairs may be selected, and a homography for each pair may be generated in parallel.

Referring to FIG. 7B, a pairing of the left second floor windows is depicted in the dashed box, "initial guess". Additionally, additional pairings—such as the far-left window with the right second-floor window—may be made in parallel as well.

This pairing of representations may be done iteratively in serial, or may occur in parallel. For example, the data representing a window in a first image may be matched to every window representation in a second image, and as discussed in further detail below, a homography analysis may be pursued for every possible match. As discussed above, homographies based on incorrect matches produce non-aligning representations very quickly, if not immediately in the first iteration, and may be quickly dismissed from the series of matching possibilities.

In one or more embodiments, homography iteration is performed until a homography is generated that aligns a sufficient number of representations. For example, homography iteration is performed until twenty-five percent or more of depicted representations align, though it will be appreciated that more accurate homographies and resultant transformations between cameras will be more accurate with increased alignment, such as greater than fifty percent. A feature representation pairing that results in alignment of a sufficient number of representations may be selected as the correct pairing and the final homography in that iteration cycle is selected for use.

In one or more embodiments, a sufficient number of representations is reached when the number of correspondence points needed for deriving a fundamental matrix is reached. The fundamental matrix provides the rotation and translation of the cameras between the images. As discussed in further detail below, deriving the fundamental matrix permits epipolar geometry analysis to generate improved correspondences for geometries in features of the subject other than the data representations, which in turn provides enhanced 3D reconstruction inputs by reducing error in feature matching across images.

Alignment by homography indicates that the feature representations may be used as correspondence points for deriving fundamental matrices. As depicted in FIG. 8B, with all representations aligned on façade 602, the representations of the windows alone produce at least twenty-eight correspondences-a minimum of four per window, with a total of seven windows on façade 602. Fundamental matrix calculations require various number of correspondences. For example, the five point fundamental estimation matrix may require a different number representation correspondences to determine the fundamental matrix depending on what additional camera information for the digital images is known, if any. One of skill in the art will appreciate that a fundamental matrix may be solved using known techniques with as few as two feature correspondences if focal length or depth of the images is known, or as many as eight feature correspondences if the aforementioned camera intrinsics are not known. For example, "Five-point Fundamental Matrix Estimation for Uncalibrated Cameras" by Daniel Barath of Machine Perception Research Laboratory at MTA SZTAKI, Budapest, Hungary describes equations for solving a fundamental matrix, and this document is incorporated by reference as if fully set forth herein. Also, OpenCV and/or code otherwise implemented by ROS includes a findFundamentalMatrix function.

In one or more embodiments, homography iteration is performed until all feature representation pairs have been tried. A pairing that aligns the additional representations with the fewest homography adjustment iterations may be selected as the correct pairing, and the final homography in that iteration cycle is the one used for correspondences in fundamental matrix derivation. In one or more embodiments, the pairing that produces the most inliers is selected for final homography and correspondence purposes.

Benefits of the Present Techniques

Improved feature correlation can, in addition to identifying common features across images, lead to associating the same structure composed from those features in multiple images. In one or more embodiments, a number of correspondences between the images are identified from data representing features based on the techniques discussed above. A fundamental matrix between two images is calculated from at least the data representation correspondences. The fundamental matrix provides the rotation and translation of the cameras between the images, and in turn permits epipolar geometry analysis to generate improved correspondences for geometries in features of the subject other than the data representations, thereby providing enhanced 3D reconstruction inputs by reducing error in feature matching across images. For example, a point feature in a first image may be extended in the direction of the optical axis, which will appear as an epipolar line when viewed in a second image that was taken from a different camera position; that epipolar line in the second image represents all positions in the second image to which the point feature from the first image may correspond.

For example, a first image may depict a main house structure with an attached garage and a second image of that same house and garage is from a new camera position. Epipolar lines between the images will not only lead to correlating the features between the images, but as the features of a first image are related to a substructure (e.g., the main house or the garage) it will similarly inform which substructure those lines fall upon in the second image.

For example, with complex geometry structures there may be many features that appear on or close to an epipolar line. To disambiguate which feature correlates across images, a distance of a candidate feature in an image can be measured to an epipolar line and the point with the smallest distance is correlated. In one or more embodiments, additional heuristics such as highest feature in first image is paired with the highest feature in the second image to reduce the number of ambiguous correlations across images. Correct structure association for features can reduce the error rate for feature matching across images, and avoid the type of errors as depicted in FIG. 5B.

Based on the improved feature correlation across images and fundamental matrix provided by the correspondences of the co-planar feature representations, camera positioning with regard to a depicted structure, and also 3D reconstruction of a depicted structure, are more accurate.

Figure 10A:
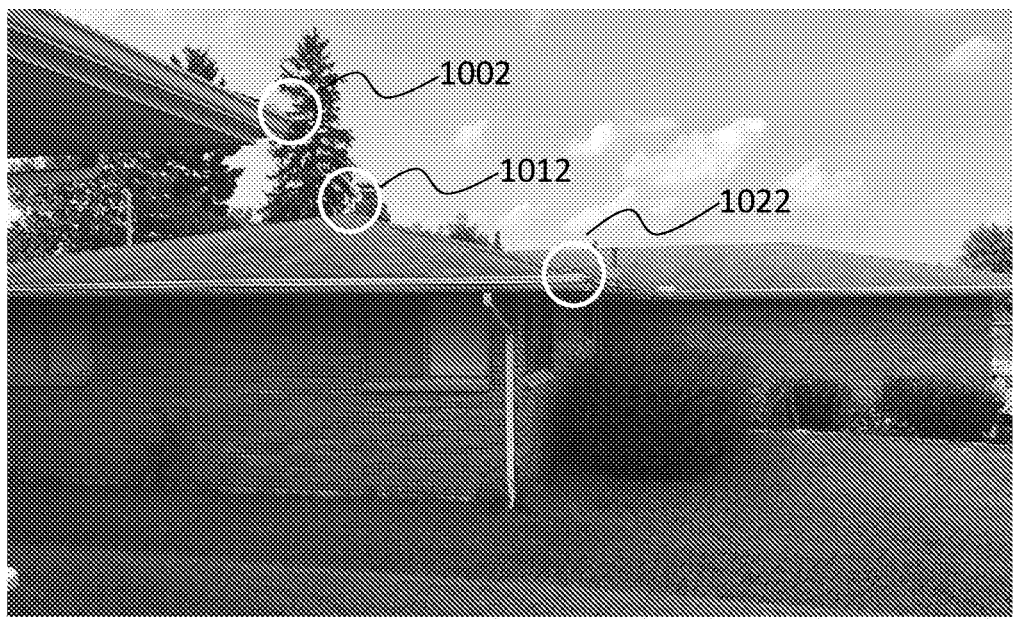
FIGS. 10A-B depict feature identification across multiple images.

FIG. 10A depicts an image of a target structure relative to an image plane that captured the target structure. The image plane shown in FIG. 10A captures geometric features 1002, 1012, and 1022. Human annotation or automatic feature extraction techniques may be used to label these geometric features, but as can be seen in FIG. 10A, feature 1002 is a noisy data point and does not actually relate to the structure that is the subject of the image.

Figure 10B:
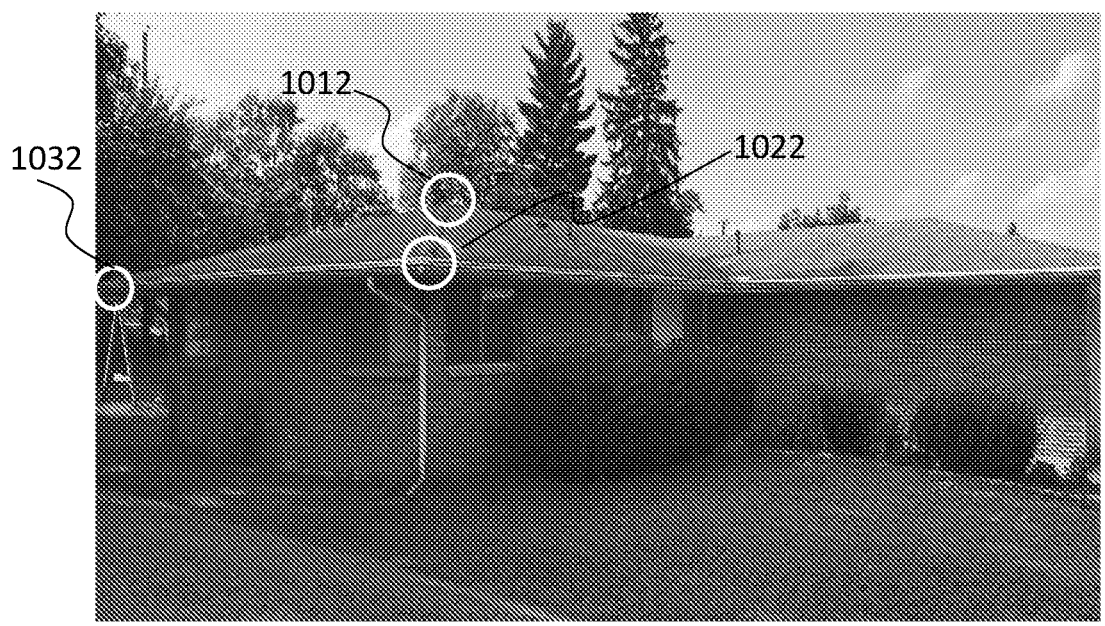

FIG. 10B depicts a second image of the target structure relative to a different image plane. In FIG. 10B, the image plane captures features 1012, 1022 and 1032 of the target structure. As explained above, without understanding the fundamental matrix between the images, it is difficult to understand if or how the features from FIG. 10A correspond to those of FIG. 10B. Incorrect matching of identified features to one another, especially incorrect matching of feature 1002 from FIG. 10A to any structure feature in FIG. 10B, would result in an incorrect reconstruction of the target structure. Similarly, if feature 1032 in FIG. 10B, which is not a co-visible feature from FIG. 10A, were matched to any feature in FIG. 10A, the resultant 3D reconstruction would also be incorrect.

Figure 11A:
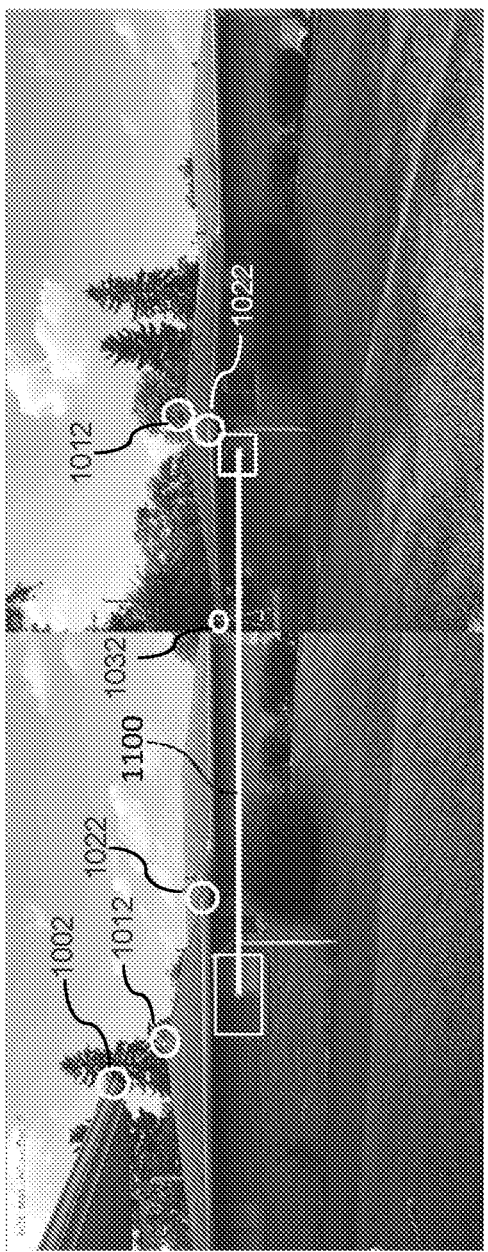
FIGS. 11A-B depict epipolar geometry feature matching.
Figure 11B:
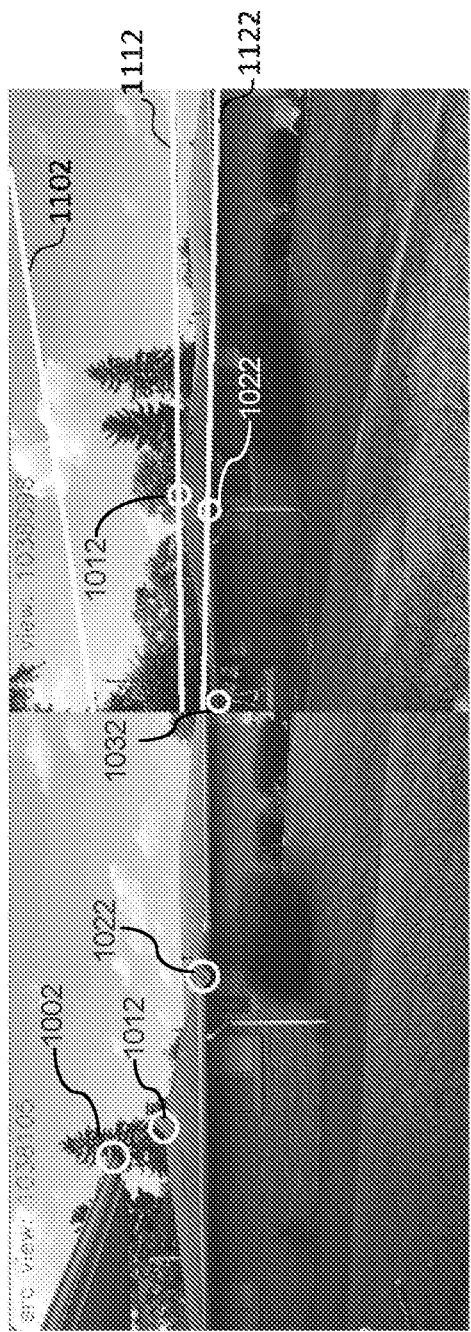

FIG. 11A depicts the representation correspondence 1100 between the images using the techniques described herein. By matching the representations of the window across the two images, the fundamental matrix may be calculated. In turn, FIG. 11B depicts epipolar lines that may be drawn once the camera rotations and translations between the cameras is applied from a fundamental matrix. Epipolar line 1102 is the line generated on the image of FIG. 11B from feature 1002 from FIG. 10A, epipolar line 1112 is the line generated from feature 1012 from FIG. 10A, and epipolar line 1122 is the line generated from feature 1022 from FIG. 10A. As shown in FIG. 11B, epipolar line 1102 originating from point feature 1002 does not intersect any features in the second image, and, as such, point feature 1002 does not have correspondence with any features in the second image. In contrast, epipolar lines 1112 and 1122, originating from point features 1012 and 1022 in the first image, intersect corresponding features 1012 and 1022 in the second image, and indicate the respective correspondences of those features across the two images. Although, for the purpose of illustrating a clear example, FIG. 11B is a simplified example that correlates only a few features, it depicts how feature correlation across images is made much clearer for a human annotator or automated tool to use in later 3D reconstruction steps. The identified features have a clear correlation to one another by virtue of the epipolar line intersection.

Automatic Generation of Architectural Feature Boundary Representations

Techniques are described herein for generating a representation of a boundary of a feature of a structure based on a digital image. In one or more embodiments, the boundary representation for a given feature is a representation that conforms to a target shape for the feature, such as a quadrilateral, octagon, triangle, circle, etc. Examples herein are described in the context of quadrilateral features. However, embodiments are not limited to quadrilateral-shaped features, and are applicable to any shape of feature that is detectable in an image and disposed on a surface of a depicted structure.

As used herein, a "boundary indicator" or "boundary representation" indicates the boundaries of a feature depicted in an image. A feature boundary representation may be a visual depiction of a logical boundary between the feature portion and other portions of the segmentation mask or image, or may be the definition of a division between the feature portion pixels and other pixels in the segmentation mask or image. In one or more embodiments, the boundary representation comprises digital data indicating the geometry of the boundary of a feature, such as the vertices and/or the edges of a polygon-shaped feature, an origin and radius of a circle-shaped feature, etc. Additionally, generating the boundary representation may include displaying a visual indication of the boundary representation in conjunction with the digital image, or generating a second digital image that includes the visual indication of the boundary representation, or adjusting the attribute values of the pixels such that the feature portion is bound by an updated boundary.

For the purpose of explanation, examples shall be given herein where the features whose boundary representation is being determined are windows of buildings. However, the techniques described herein are not limited to any particular type of structure or feature.

In one or more embodiments, generating a representation of a boundary of a particular feature of a structure in a digital image comprises determining a portion of the image that corresponds to the structure, and determining a portion of the image that corresponds to the particular feature. One more vanishing points are associated with the portion of the image corresponding to the particular feature. The one or more vanishing points are used to generate a set of bounding lines for the particular feature.

In one or more embodiments, after determining the portion of the image that corresponds to the particular feature, the portion of the image is refined. Techniques for refining the portion of the image corresponding to the feature include grab cut and spur removal. To illustrate in the case of a quadrilateral representation, refining the feature portion of the image results in a representation of the feature that is shaped more like a quadrilateral with smooth edges compared to the originally identified portion of the image.

Thus, according to an embodiment, computer system 1310 is configured to generate a segmentation mask of an image, e.g., a photographic image. In connection with generating the segmentation mask of an image, approaches for detecting a feature, such as a window, may use pixel-wise segmentation of an image, e.g., analysis of each pixel to determine the likelihood that it is part of a particular feature (structure, window, door, roof, etc.) depicted in the image. However, pixel-wise detection results in a set of pixels that may not accurately represent the shape of the feature. For example, the edges may be jagged or blurred, the shape formed by the set of pixels may include irregularities such as spikes or include pixels that were incorrectly identified as being part of the feature, etc.

A benefit of techniques described herein is that lines associated with a vanishing point are applied to noisy image data to create clean representative lines that are consistent with the feature's true shape. In addition, generating a set of lines rather than identifying a set of pixels allows the representation of the feature to be used when generating or validating a 3D model of the structure. For example, using exact or improved points or coordinates representing a feature (e.g., corners of a feature) provides additional constraints and data sources for associating the feature with, or correlating the feature to, other features within the digital image or within other digital images. As another example, exact or improved boundaries of features, such as windows and/or doors, may be used as feature representation metadata describing features in an associated image. As described above, such feature representation metadata aids in feature correlation analysis.

Boundary Representation Overview

According to an embodiment, computer system 1310 further comprises boundary generation instructions 1314. Boundary generation instructions 1314 comprise one or more program instructions, which, when executed by computer system 1310, cause computer system 1310 to analyze a digital image and generate a corresponding boundary indicator for each feature of a structure depicted in the digital image.

Figure 14:
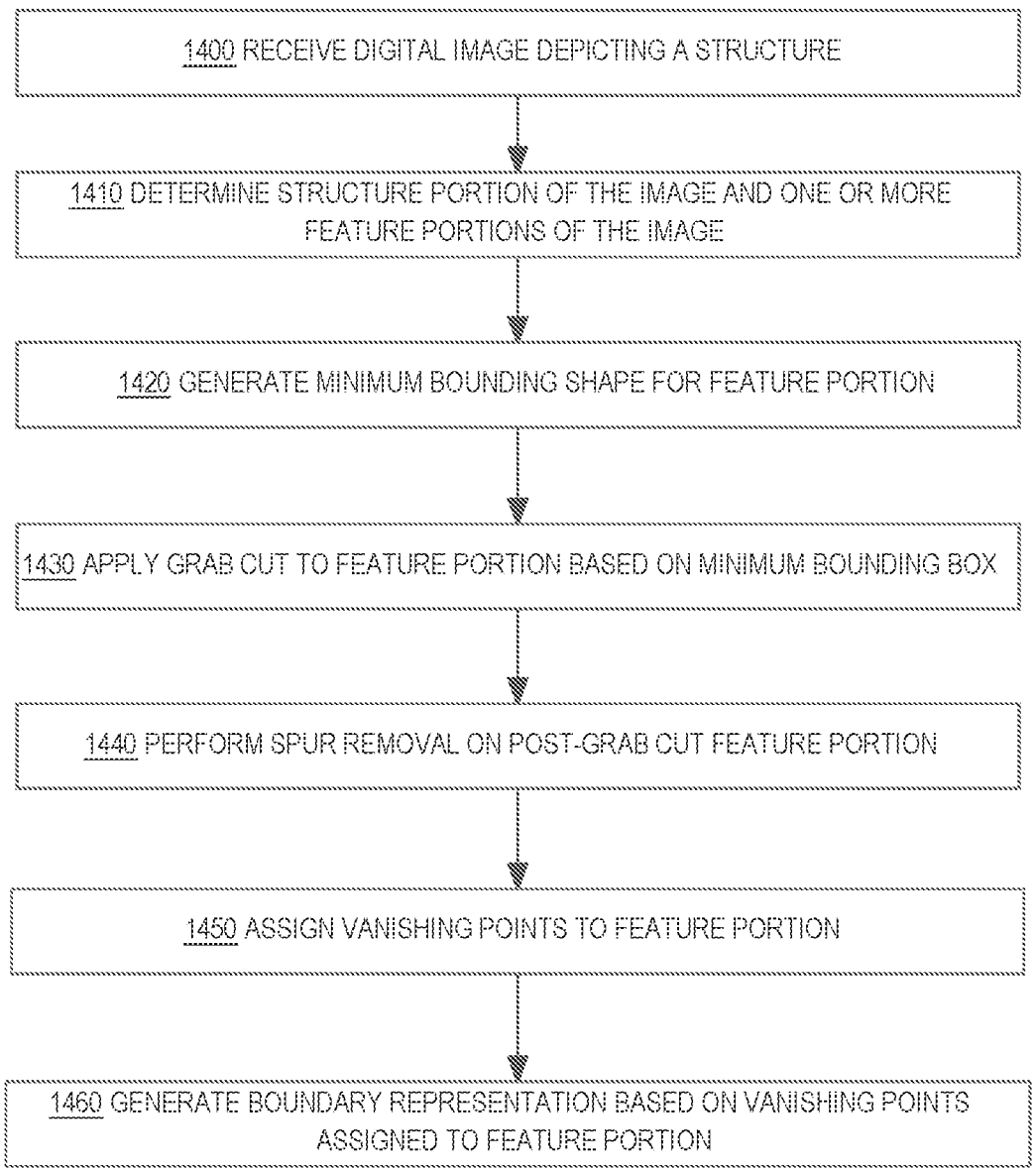
FIG. 14 depicts a flowchart for generating a boundary representation for a feature of a structure.

FIG. 14 depicts an example flowchart for generating a representation of a boundary of a feature of a structure depicted in a digital image. The steps of FIG. 14 are illustrative and may be omitted or differently ordered, according to embodiments. The feature may be a quadrilateral or rectangular shaped feature, and the boundary representation may be a quadrilateral representation. In one or more embodiments, generating the boundary representation comprises generating vector data or geometric data that defines a shape of the boundary (or outline) of the feature as depicted in the digital image. For example, the boundary representation of a feature may comprise data defining a plurality of ordered points and/or lines that, if rendered using a rendering application, depicts the boundary or outline of the feature.

At step 1400, a computer system receives a digital image or photo depicting a structure. The digital image may be received or retrieved from any source, such as data server device 1304, image capture device 1306, or data storage 1320. The digital image may be one of a set of digital images received by computer system 1310. The set of digital images may be received or retrieved from any number of sources. In one or more embodiments, computer system 1310 receives a pre-existing 3D model instead of, or in addition to, one or more digital images to revalidate the model or to add information regarding structural elements or features to the 3D model. For example, a digital image depicts a new garage or an extension of a previously existing 3D model of the structure. As another example, only a 3D model is received. A perspective view or look angle of the 3D model may be transformed into a 2D image for generating boundary representation(s) of features depicted in the view of the 3D model.

The digital image may depict one or more sides of a structure. One or more features of the structure may be visible within the digital image. In one or more embodiments, each feature may be of a particular feature type, and the computer system may be configured to generate a boundary representation for features of a particular feature type. For example, a digital image depicts a building, and a plurality of doors and windows of the building are visible within the digital image. According to an embodiment, computer system 1310 is configured to generate boundary representations for windows depicted in the digital image. According to another embodiment, computer system 1310 is configured to generate a boundary representation for any number of features and any number of feature types that are depicted within the digital image.

FIG. 15A depicts an example digital image that may be received by the computer system. In FIG. 15A, the digital image depicts a building 1500. In the digital image, three windows of building 1500 are visible, windows 1502-1506, and a door 1508 is also visible. Additionally, the digital image depicts a plurality of structure lines 1510 and a plurality of non-structure lines 1512.

As discussed in further detail below, "structure lines" refers to lines within the digital image that are within the portion of the digital image that depict a structure. Structure lines may include one or more lines associated with features of the structure, such as feature lines 1514 of window 1502. "Non-structure lines" refers to lines within the digital image that are outside of the portion of the digital image that depicts the structure, such as lines corresponding to trees, grass, background elements, other structures that are not the target structure whose features are being analyzed, etc.

Semantic Segmentation

At step 1410, the computer system determines a structure portion of the image and one or more feature portions of the image. The structure portion of the image corresponds to the structure. Each feature portion of the one or more feature portions of the image corresponds to one or more features of the structure.

In one or more embodiments, the structure portion comprises a set of pixels of the digital image, and each feature portion comprises a respective set of pixels of the digital image. Pixels that are connected to one another and of the same classification (e.g., feature type) may be considered part of the same feature. Pixels that are not connected to one another but classified as the same feature type may be considered part of separate features. According to an embodiment, de minimis connection or separation does not disqualify identification as a common or separate feature. Specifically, at times, noise pixels break an otherwise single feature into multiple segmentation portions, and vice versa for features that are close together. Thus, a given pixel cluster group may delineate one feature, a partial feature, or many features of a given semantic label.

Referring to the above example, computer system 1310 may determine a structure portion of the image that corresponds to building 1500, and one or more feature portions corresponding to one or more features of building 1500, such as windows 1502-1506 and/or door 1508.

The portions of the digital image may overlap with one another, and one portion may include or encompass another portion. That is, the same pixel may be associated with multiple portions. For example, since windows 1502-1506 are on building 1500, the structure portion corresponding to building 1500 includes the sets of pixels for feature portions corresponding to windows 1502-1506.

In one or more embodiments, determining the structure portion and the one or more feature portions comprises segmenting or categorizing the pixels of the digital image into a plurality of predicted components. Segmenting or categorizing the pixels of the digital image into predicted components may be referred to as "semantic segmentation." A predicted component is any real-world object that the computer system predicts is depicted in the digital image, including structures and structure features. The types of predicted components may vary depending on the type of structure depicted in the digital image. For example, predicted components for a house may include the house, doors, windows, fascia, roof, gables, etc.

As discussed above, each pixel or set of pixels may be categorized into a plurality of predicted feature components. For example, the computer system may determine that a group of pixels correspond to a building. The computer system may also determine that a group of pixels correspond to a window of the building.

Figure 15B:
Figure 15C:
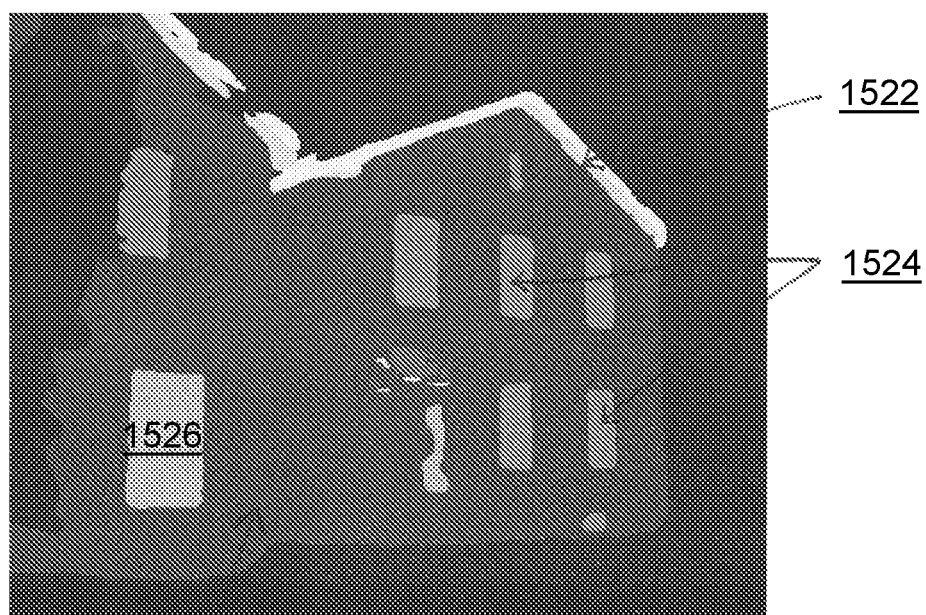
Figure 15D:

FIGS. 15B-15D depict various semantic segmentation states. FIG. 15B depicts an example input image depicting a building, and FIG. 15C depicts that same image of the building segmented into various portions, such as a structure portion 1520, fascia lines 1522, windows 1524, and door 1526, among others. Knowing that the segmented image in FIG. 15C corresponds to a building, one may correctly match the segmented components with elements of a house. However, without the context that the input image in FIG. 15B provides, it may not be readily appreciated that the rough shapes of FIG. 15C are in fact pixel associations of enumerated features.

Figure 15E:
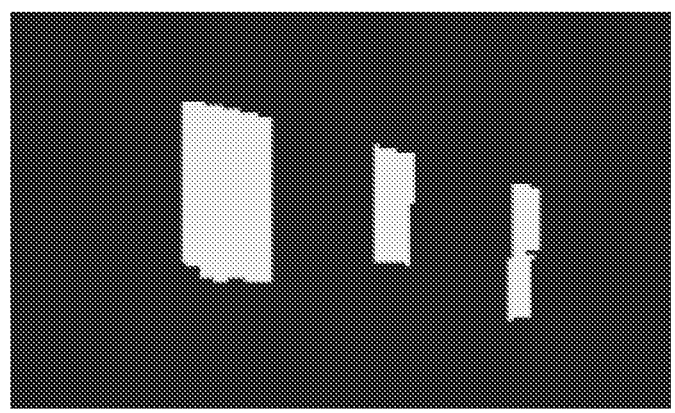

As a further example, FIG. 15D depicts three particular windows within a digital image, and FIG. 15E depicts three predicted pixel portions corresponding to those windows. Although the noisy and irregular shapes of FIG. 15E may be understood to be pixels for windows, they are not a clean representation of the true shape of those windows as depicted in FIG. 15D and, therefore, using such pixels for image analysis and processing beyond mere identification is subject to error as the pixel representation is imperfect.

In one or more embodiments, the structure portion corresponds to the set of pixels categorized as a structure. Each feature portion of the one or more feature portions corresponds to a respective set of pixels categorized as a feature of the structure. The one or more feature portions may be limited to sets of pixels that are categorized as one or more specified features. For example, assume the digital image depicts a building. The computer system may be configured to select only sets of pixels (feature portions) that are categorized as windows. For example, a particular feature portion may be categorized under a certain feature category based on the aspect ratio of the shape represented by the pixels of the feature portion, the relative location of the feature portion with respect to the structure portion, one or more colors of the pixels of the feature portion, etc.

Various algorithms and techniques may be used for segmenting or categorizing pixels within a digital image into a plurality of predicted components. In one or more embodiments, segmenting or categorizing pixels of the digital image into a plurality of predicted components may be performed using a machine learning model. Example machine learning models include artificial neural networks, deep neural networks, convolutional neural networks, deep convolutional neural networks, recursive neural networks, classifiers, and the like. An example machine learning model may be Google's DeepLab v3, described by Liang-Chieh Chen, George Papandreou, Florian Schroff, and Hartwig Adam, the contents of which is hereby incorporated by reference as if fully set forth herein. "Rethinking Atrous Convolution for Semantic Image Segmentation." arXiv: 1706.05587. https://arxiv.org/abs/1706.05587.pdf.

Semantic segmentation results in a high probability that any pixel in a feature portion corresponds to the feature. However, the resulting set of pixels form noisy shapes, so that while the set of pixels provide object recognition value, they have little to low or no geometric value. As discussed in further detail below, a boundary representation may be generated for each feature portion of the one or more feature portions.

Minimum Bounding Box

FIG. 16 depicts an example segmented feature portion 1600. For the purpose of illustrating a clear example, assume feature portion 1600 corresponds to window 1502 of building 1500. In FIG. 16, feature portion 1600 has been categorized as a window, but its edges are not completely smooth and do not completely match the shape of window 1502.

In one or more embodiments, one or more refining steps are performed on each feature portion of the one or more feature portions to clean up the set of pixels. Steps 1420-1440 described below may be performed for each feature portion of the one or more feature portions to refine the feature portion.

At step 1420, a minimum bounding shape is generated for a feature portion, e.g., a minimum bounding box for a quadrilateral-shaped feature, a minimum bounding circle for a circular-shaped feature, etc. According to an embodiment, the shape for a given feature in an image is identified based on metadata associated with the image that indicates a shape for the feature, and/or a predicted type of the feature, e.g., window, door, gable, roof segment, etc. The minimum bounding shape may be an inner bounding shape or an outer bounding shape. An inner bounding shape is the maximum size bounding shape that contains only pixels of the feature portion. An outer bounding shape is the minimum size bounding shape that contains all pixels of the feature portion. The bounding shapes may be calculated and applied using convex hull principles or other suitable computational geometry techniques. Examples described herein are based on quadrilateral shapes and minimum bounding boxes. However, embodiments are not limited thereto.

FIG. 17 depicts example bounding boxes 1702 and 1704. For the purpose of illustrating a clear example, assume bounding boxes 1702 and 1704 are generated for feature portion 1600. Bounding box 1702 is an inner bounding box and bounding box 1704 is an outer bounding box. Bounding box 1702 does not include any pixels that are outside of the feature portion 1600, but does not include some pixels of the feature portion. Bounding box 1704 includes all pixels of the feature portion 1600, but also includes some pixels that were outside of the feature portion.

Grab Cut

At step 1430, a pixel-class assignment step, such as the grab cut technique, is applied to the feature portion based on the minimum bounding box. Pixel-class assignment associates pixels of the feature portion that are within the minimum bounding box with one another. Based on similarity, such as with respect to values of a color attribute, to other pixels in the minimum bounding box generally, or to clusters of pixels in proximity to a given pixel, each pixel is given a class value (e.g., positive value for similarity and negative or zero value for non-similarity). The pixels corresponding to one class value are kept (e.g., the positive pixels), and the pixels corresponding to the other class value (e.g., the negative or zero value pixels) are discarded or removed from the set of pixels of the feature portion.

Pixel-class assignment transforms the feature portion into a shape that more closely represents the underlying feature's true shape (for example, more like a quadrilateral). However, depending on the non-feature pixels within the minimum bounding box, the resulting shape produced by the set of pixels may still be noisy. Referring to the above example, a window depicted in an image may be blocked by trees, shadows, or other visual impairments, or the feature portion may include shutters or frames, etc. This introduces error in the class value assignments, especially at the borders of segmented features where most noise already occurs.

Figure 18A:
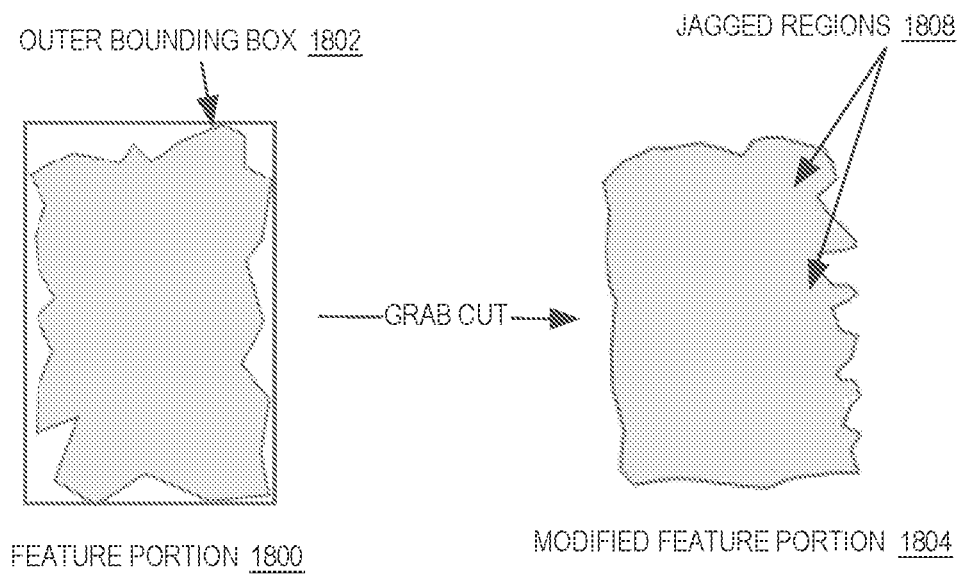
FIGS. 18A-D depict an example feature portion undergoing pixel-class assignment.

FIG. 18A depicts an example feature portion before and after pixel-class assignment. In FIG. 18A, an outer bounding box 1802 is applied to the feature portion 1800. Applying pixel-class assignment to the feature portion 1800 generates a modified feature portion 1804. In the depicted example, modified feature portion 1804 has smoother edges on the top, bottom, and left sides, but the right side includes many jagged regions 1808, indicating the presence of non-alike pixels within the bounding box or the segmentation step incorrectly identified pixels at that coarse level of classification.

Figure 18B:
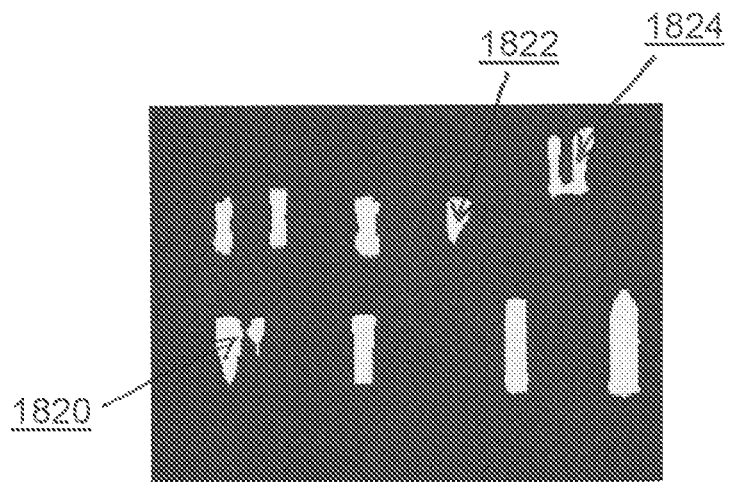
Figure 18C:
Figure 18D:
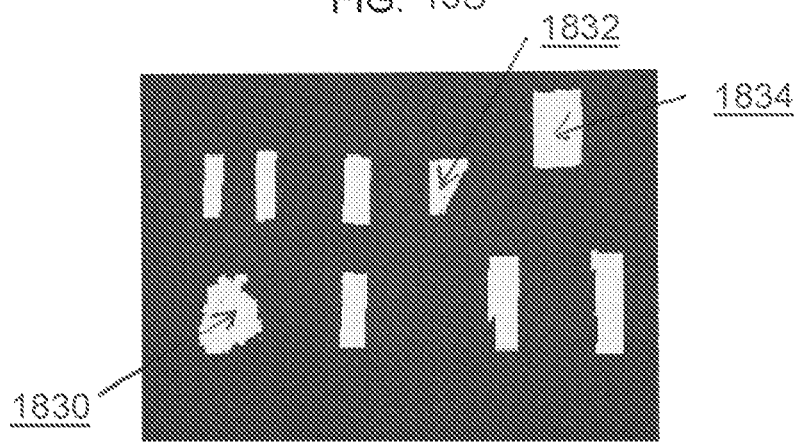

FIGS. 18B-18D depict example results of applying pixel-class assignment to an image. FIG. 18B depicts a sample semantic segmentation of the image as substantially depicted in FIG. 18C, wherein the windows of the house in FIG. 18C (outlined in this FIG. 18C for clarity in spotting the windows) are shown as rough shapes in FIG. 18B. Notably, in FIG. 18B, the lower left-most window shape 1820 and the upper right-most two window shapes 1822 and 1824 are extremely noisy. Visual comparison with those windows in FIG. 18C shows each of those windows are either obscured (e.g., by trees or rooflines) or simply the result of a poor classification. For example, window shape 1824 is nearly two separate window shapes, even though it corresponds to a single window in FIG. 18C. Though minimum bounding boxes are typically applied to segmented images, in one or more embodiments they may be applied to the initial image as in FIG. 18C. For illustrative purposes herein, the minimum bounding boxes are simply shown in in FIG. 18C for their association to the actual windows, but are applied to the classified images of FIG. 18B for pixel-class assignment purposes.

Applying the pixel-class assignment to the window shapes of FIG. 18B results in the new representations depicted in FIG. 18D, such as modified window shapes 1830, 1832, and 1834. The upper-right most window shape 1824 has been corrected to modified window shape 1834, which more clearly represents the actual single-window shape depicted in FIG. 18B. Similarly, the rough triangle of the obscured upper window shape 1822 is corrected to modified window shape 1832, which has the shape of a parallelogram.

Notably, the lower left-most representation, modified window shape 1830, is more clearly a window despite the window being almost completely obscured by a tree. Though segmentation seeks to identify pixel-wise what an object is (e.g., "window"), in that instance it was unable to provide much information as to that window's shape due to the image data having an occlusion. Subjected to pixel-class assignment, however, the dependence on classification is non-exclusive and pixel-similarity may serve as a proxy for pixel classification. In other words, the pixel value within the bounding box as compared to pixel value outside the box predicts the feature shape more accurately than the pixel-wise segmentation, even though the analysis is not based on a semantic category. It will be readily appreciated that deriving such geometric data for features using non-feature pixels is an enormous benefit and improvement in the art.

Spur Removal

At step 1440, spur removal is performed on the feature portion. In one or more embodiments, spur removal is performed on the modified feature portion after pixel-class assignment, though could be applied to post-segmentation as well. Spur removal smooths out the feature portion by removing the remaining spurs, spikes, extrusions, that persist in the feature's depiction.

In one or more embodiments, spur removal is performed using morphological analysis with a parameter a and refinement coefficient k. As an example, the feature portion may use an a parameter of a circle, and the interior of the feature portion is populated with a plurality of circles of a specified diameter as measured in pixels (refinement coefficient k) and a boundary is re-drawn around the circles. The resulting feature portion comprises the pixels within the re-drawn boundary.

Figure 19:
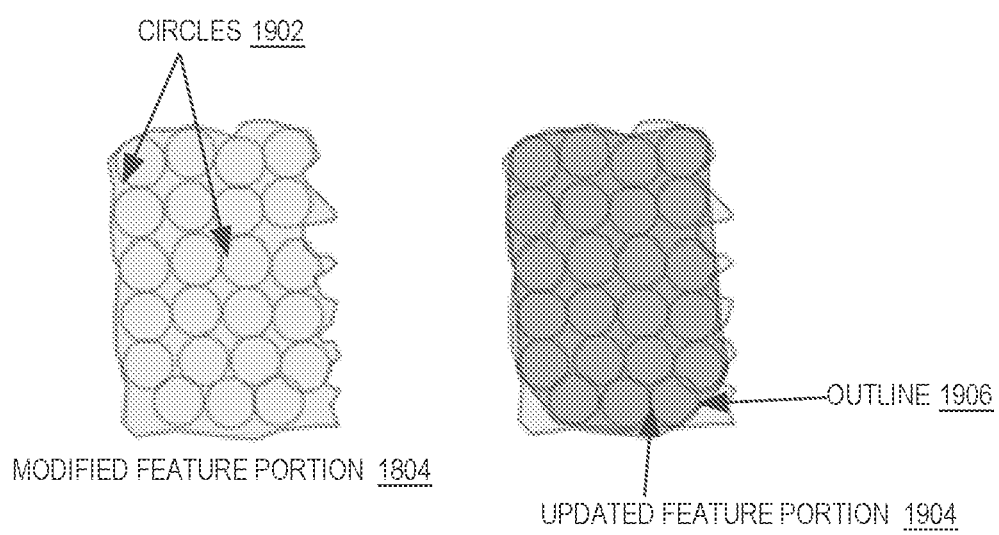
FIG. 19 depicts spur removal for an example feature portion.

Alternative a parameters, such as quadrilaterals, or fractal dimensioned shapes, may be applied or varied within a feature. For example, though FIG. 19 depicts a single a and k, a combination may be employed, such as a larger k along smoother lines and a lower k along jagged portions, or vice versa subject to particular use case. Similarly, varying the a parameter to employ square shapes along smooth lines with circular shapes in proximity to jagged portions may produce faster results or less computationally intensive optimizations.

This produces a feature portion whose outline is smoother compared to both the outline of the feature portion after the minimum bounding box and the outline of the feature portion after pixel-class assignment.

FIG. 19 depicts an example feature portion before and after spur removal. Referring to the above example, assume spur removal is applied to the modified feature portion 1804.

In FIG. 19, feature portion 1804 is filled with a plurality of circles 1902. An updated feature portion 1904 is generated based on the plurality of circles 1902. The outline 1906 is a border indication for the updated feature portion 1904 based on the plurality of circles 1902.

Feature Vanishing Point Pairing

At step 1450, the feature portion is associated with one or more vanishing points of the structure. In one or more embodiments, the one or more vanishing points are assigned to the refined feature portion generated by all of steps 1420-1440 above, or a subset of those steps.

In one or more embodiments, a plurality of vanishing points is identified for the structure portion of the image (as explained in detail below with reference to FIGS. 21A-D), and a feature portion is assigned a vanishing point relationship based online analysis of the feature portion.

In one or more embodiments, to pair or associate a particular feature portion with vanishing points of the structure, a plurality of feature lines is identified (for example, those lines extracted from the original image that would fall within a segmented image for that feature). Any suitable line detection technique(s) may be used for this step. One or more vanishing points associated with the structure are selected for the feature portion based on a determined relationship between the feature lines and the structure lines. In one or more embodiments, the structure portion is assigned a vertical vanishing point, a left vanishing point, and a right vanishing point. The feature portion is initially assigned at least the vertical vanishing point. The computer system selects at least the structure's left vanishing point or the right vanishing point to associate with the feature portion. In one or more embodiments, multiple left or multiple right vanishing points may be identified and assigned to the structure portion and/or the feature portion, such as for bay windows or other multifaceted façades.

In one or more embodiments, lines of the structure portion are associated with an applicable vanishing point, such as a left or a right vanishing point (or a first left or a second left vanishing point in the case of multiple vanishing point possibilities for a given side). Selecting a non-vertical vanishing point for a feature portion comprises identifying lines within the feature portion (e.g., lines extracted from the original image that fall within a segmented portion, of the image, for that particular feature) and associating those feature lines with a set of structure lines associated with the structure portion of the image. In one or more embodiments, a first set of structure lines are associated with a first (e.g., left) vanishing point and a second set of structure lines are associated with a second (e.g., right) vanishing point. Associating structure lines to a vanishing point may involve extending the structure line(s) to infinity and determining which vanishing point the structure line(s) converges to. For example, in FIG. 21A lines 2130 and 2134 converge towards a right vanishing point and lines 2132 and 2136 converge towards the left vanishing point. The average distance between the feature lines and the first set of structure lines is calculated.

According to an embodiment, the average distance between the feature lines and the second set of structure lines is also calculated. The set of structure lines with the shorter average distance may be selected as the set of structure lines to associate the feature lines with, and therefore, the non-vertical vanishing point associated with those structure lines may be paired with the feature portion comprising those feature lines. Specifically, the average distance of feature lines from structure lines that are associated with vanishing points is an indicator of the vanishing point that is applicable to the feature portion. For example, the window features disposed on a façade of a building are close to the structure lines, on the façade, that have the same non-vertical vanishing point as the window.

The average distance between the feature lines and a set of structure lines may be calculated, for example, based on the distance between the midpoints of respective lines, the distance between the right/left endpoints of the respective lines, the distance between the midpoint of lines within the set of structure lines to a midpoint of the entire feature portion, etc. Additionally, the average distance may be weighted to only consider structure lines a certain distance from the feature portion.

Structure Vanishing Point Identification

Figure 20:
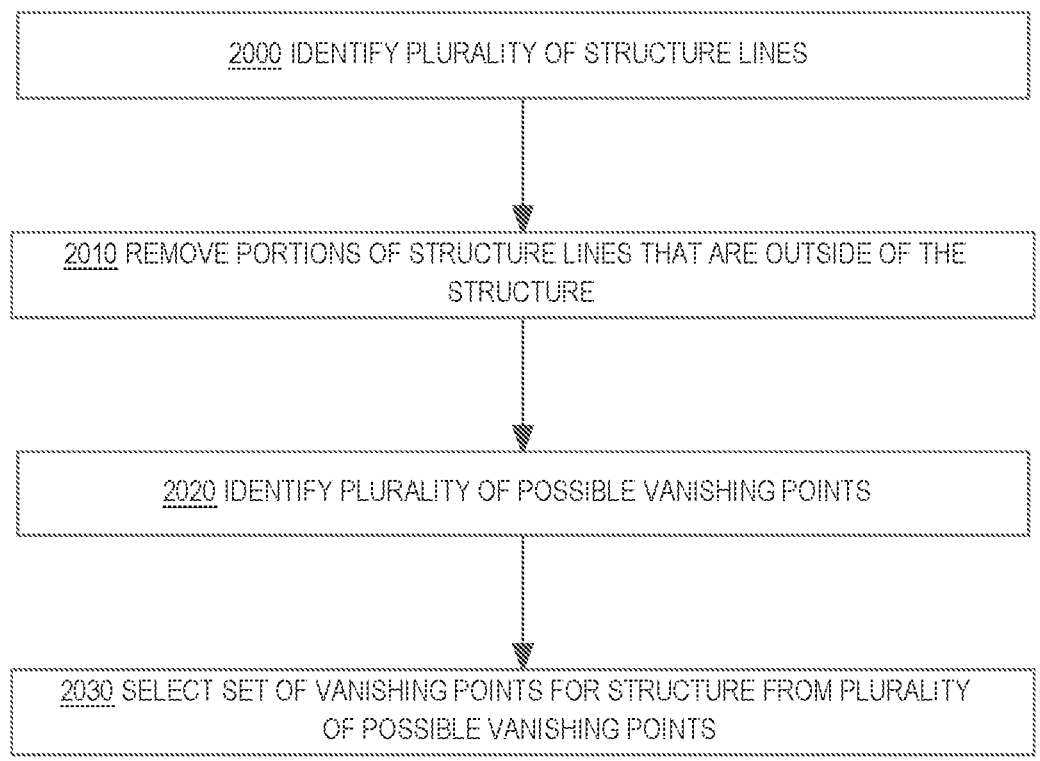
FIG. 20 depicts a flowchart for selecting a set of vanishing points for a structure.

In one or more embodiments, a plurality of vanishing points comprising at least a vertical vanishing point is identified for the structure portion of the image according the steps as depicted in FIG. 20. The steps of FIG. 20 are illustrative and may be omitted or differently ordered, according to embodiments.

At step 2000, a plurality of structure lines depicted in the digital image are identified. For example, referring to FIG. 15A, computer system 1310 may identify structure lines 1510 depicted in the digital image. Additionally, the computer system may also identify non-structure lines depicted in the digital image, such as non-structure lines 1512. Identifying the plurality of structure lines may be performed using any suitable line extraction technique(s). Extracted lines may be derived from architectural elements (such as siding, or brick work) or other linear aspects. FIG. 21A depicts additional examples of images having a plurality of lines extracted and displayed upon it; some lines are outside structure portions, some lines are within structure portions, and some lines are within feature portions.

At step 2010, lines that are outside of the structure (such as non-structure lines 1512) are removed. Additionally, if non-structure lines depicted in the digital image were identified at step 2000, then the non-structure lines are also removed. Determining whether portions of a particular line are outside of the structure may be based on comparing the particular line with the structure portion of the image, or applying a mask of the segmented structure image from step 1410 of FIG. 14 to the image and removing lines outside the mask.

In previously disclosed techniques in the art, extracted lines that are short (shorter than a threshold value) are removed from analysis, to reduce the amount of data subject to analysis. In other words, to de-noise the image for vanishing point analysis.

In one or more embodiments, structure lines that are close together and in-line are instead connected to form single continuous lines. For example, a set of short, colinear lines may be combined and/or connected to form a single, connected line. Connecting colinear line fragments into a longer line causes the resultant longer line to be considered when determining vanishing points. More defined and/or identifiable lines provides the benefit of more robust input data for accurately identifying vanishing points based on lines in the image.

At step 2020, a plurality of possible vanishing points for the structure are identified. In one or more embodiments, the precise number of candidate vanishing points are based on the structure lines, or portions thereof, that remain after removing lines that are outside of the structure and, potentially, de-noising the image for vanishing point analysis. In one or more embodiments, any suitable technique for automatic identification of vanishing points using lines in an image may be used. An example technique may be Automatic Vanishing Points, described by Xiaohu Lu, Jian Yao, Laoang Li, and Yahui Liu, the contents of which is hereby incorporated by reference as if fully set forth herein. "2-Line Exhaustive Searching for Real-Time Vanishing Point Estimation in Manhattan World." 2017 *IEEE Winter Conference on Applications of Computer Vision*, pages 345-353.

At step 2030, a set of vanishing points for the structure are selected from the plurality of possible vanishing points. In one or more embodiments, the set of vanishing points for the structure include a vertical vanishing point, a left vanishing point, and a right vanishing point.

Candidate vanishing point generation provides a plurality of possible orthogonal axis triplets (e.g., up-axis, left-axis, and right-axis). In one or more embodiments, selecting the set of vanishing points comprises selecting a particular triplet from the plurality of possible triplets. The axes of each triplet are compared with the plurality of structure lines to determine whether the axes substantially align with at least a portion of the plurality of structure lines. The triplet that best aligns with the plurality of structure lines is selected. A vanishing point is then associated for each axis of the selected triplet.

In one or more embodiments, comparing the axes of each triplet with the plurality of structure lines comprises calculating the overall variance between the candidate axis system and the plurality of structure lines. A respective axis variation is calculated for each axis of the candidate triplet, e.g., a left-axis variation, a right-axis variation, and an up-axis variation. The overall variance is calculated based on the variations between the axes and the structure lines. The triplet whose axes aligns best with the plurality of structure lines may be the triplet with the lowest overall variance, and is therefore selected for structure vanishing point association.

In one or more embodiments, the overall variance for a triplet is the sum of the axis variations of the axes, as described in Automatic Vanishing Points. For example, if a triplet has a right-axis variation of 0.10 radians, a left-axis variation of 0.10 radians, and an up-axis variation of 0.10 radians, then the overall variance score for the triplet is 0.30 (0.10+0.10+0.10).

In other embodiments, rather than calculating a summation of the axis variations, the axis variations are multiplied with one another. Referring to the above example, the overall variance for the triplet would be 0.001 (0.10*0.10*0.10). This multiplication-based approach provides improved distinction and sensitivity between triplets when determining the triplet with lowest overall variances. For example, assume a second candidate triplet has left-axis variation of 0.10 radians, a right-axis variation of 0.05 radians, and an up-axis variation of 0.15 radians. The overall variance score calculated using summation would still be 0.30, but the overall variance calculated using multiplication would be 0.000750. The second triplet would be considered a better match to the plurality of structure lines compared to the other triplet. In one or more embodiments, the multiplication-based approach may be used as a "tie breaker" between candidate triplets with matching summation scores, or a weighted preference may be given to a particular axis. For example, a triplet with an up-axis aligning closest to the structure's vertical lines is selected to favor greater sensitivity to that axis than of the other structure lines variance with the left or right axes.

Axis triplet selection is depicted in FIG. 21B, depicting a structure portion 2102 and extracted structure lines 2104. Two candidate triplets, triplet 2122 and triplet 2124 are depicted. Linear relationships between the structure lines 2104 (lines within the facades of structure portion 2102, or the edges of the facades in structure portion 2102) produces less variance with automatically generated candidate triplet 2122 as compared with triplet 2124 (where it will be appreciated that the vector for the up axis of triplet 2124 is coming out of the page). In the illustrative example of FIG. 21B, triplet 2122 would be selected over triplet 2124.

In one or more embodiments, the subject structure does not have a substantially perpendicular foundation. The structure may comprise bay windows, or have sloping portions of a facade that are not orthogonal to all other portions; a selected (or "primary" triplet) may align in two axes with lines on such sloping structures, but have substantial variance with the third axis. In one or more embodiments, structure lines that are outside a target variance tolerance with a single axis of the selected triplet, while substantially aligning with the other two, are used to source a secondary triplet using the same techniques as described above (which may be characterized as producing a "primary" triplet). In one or more embodiments, the variance tolerance to source a secondary triplet is greater than 0.20 radians, in one or more embodiments the variance tolerance to source a secondary triplet is greater than 0.30 radians, in one or more embodiments the variance tolerance to source a secondary triplet is greater than 0.40 radians, in one or more embodiments the variance tolerance to source a secondary triplet is greater than 0.50 radians, in one or more embodiments the variance tolerance to source a secondary triplet is greater than 0.60 radians, in one or more embodiments the variance tolerance to source a secondary triplet is greater than 0.70 radians. The structure may then have a primary and secondary vanishing point system, such that a first left and second left and first right and second right vanishing points are applied to the structure. Additional triplets consistent with "tertiary" and third left/right vanishing points and so on will be appreciated as well.

The triplet's axes may be extended to a virtual infinity where the respective vanishing point for each axis falls (such triplet 2140 depicted in FIG. 21C of both virtual and actual applications).

For images that depict a head-on or substantially head-on view of a structure, it may be difficult to recognize left and right vanishing points as one axis may be substantially parallel to the optical axis of the camera that captured the image, such as depicted in FIG. 21D where both triplet 2126, which has a right facing axis, and triplet 2128, which has a left facing axis, can produce similar variance solutions. In one or more embodiments, whether the image depicts a head-on view is determined. In one or more embodiments, determining whether the image depicts a head-on view comprises extracting a surface normal of the structure portion and comparing that vector to the optical axis vector of the camera that captured the image. If the two vectors are within a threshold value, for example, 0.10 radians, then it is assumed the image is a head-one view. In one or more embodiments, surface area of structural planes are compared and if the ratio of planar area suggests a particular façade is dominant (for example 95% of the structural planes viewable in the image is a particular façade) then it is assumed the image was taken from a head-on perspective of that particular façade.

In one or more embodiments, to determine a vanishing point triplet for head-on views of a structure is performed by calculating the dot product. This may be done by aligning a candidate vanishing point triplet to vertical lines in the image, using the optical axis of the camera or surface normal of the structure plane as a proxy line to align a second axis to and then determining the third axis by calculating the dot product relative to those two axis, such as applying a cosine value.

Although examples are described herein wherein a single or plurality of vanishing point triplet coordinate systems is selected for a single structure, in one or more embodiments a structure is divided into a plurality of sub-structures, and a set of vanishing points may be selected for each sub-structure (for example, attached garages at angle to the main structure) using steps 2000-2030 described above.

Boundary Representation Generation

At step 1460, the computer system generates boundary representation lines for the structure feature based on the feature portion and the assigned vanishing points. The feature portion may be a refined feature portion or a segmented feature portion only. In one or more embodiments, generating the boundary representation lines for a given feature comprises extending rays (referred to herein as "bounding lines") from one or more of the vanishing points to align, or in one or more embodiments to tangentially intersect, with the outer-most pixels of the feature, e.g. outline 1906. Such bounding lines for a given feature may include two vertical bounding lines that extend from a vertical vanishing point and two horizontal bounding lines that extend from a non-vertical (i.e., left or right) vanishing point.

In one or more embodiments, generating the two vertical bounding lines for a given feature comprises generating a right vertical bounding line and a left vertical bounding line, where the right vertical bounding line touches the outer-most pixel on a right side of the border of the set of pixels, and where the left vertical bounding line touches the outer-most pixel on a left side of the border of the set of pixels. The left and right vertical bounding lines may point towards or extend from a vertical vanishing point assigned to the feature portion.

Figure 22:
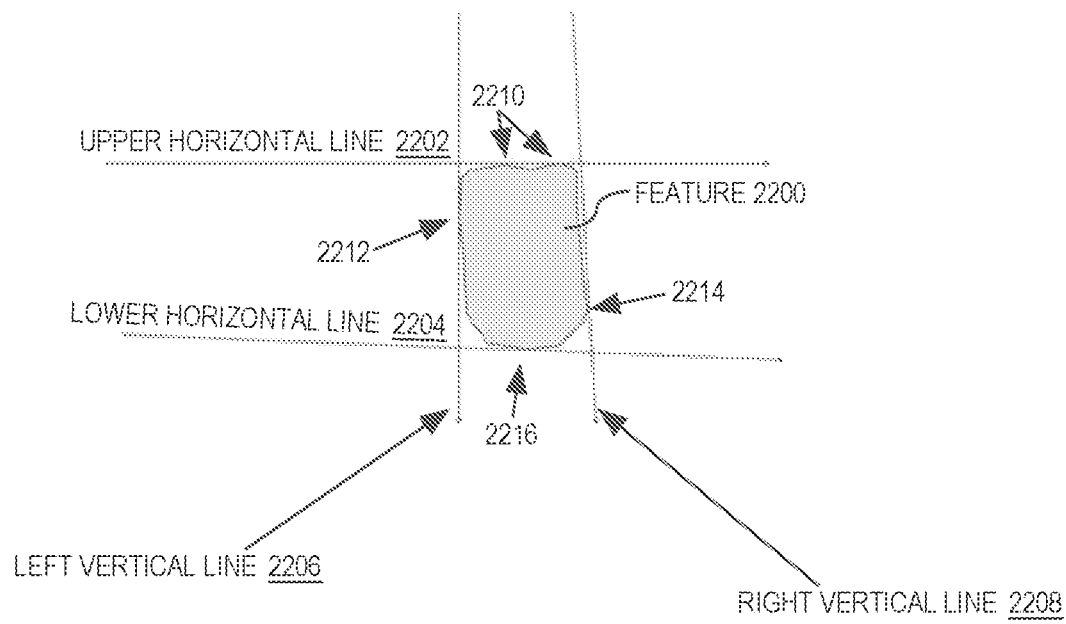
FIG. 22 depicts example lines based on the vanishing points for a feature.

For example, FIG. 22 depicts a set of example bounding lines for a feature 2200 that is associated with metadata that indicates that the feature is a quadrilateral (i.e., associated with the image in which feature 2200 is depicted). For the purpose of illustrating a clear example, feature 2200 has been assigned a left vanishing point and a vertical vanishing point, as described in further detail herein. Left vertical bounding line 2206 is a ray that extends from the direction of the vertical vanishing point to intersect an outer-most pixel 2212 on the boundary (in this case, the refined boundary) of feature 2200. Similarly, right vertical bounding line 2208 is a ray that extends from the direction of the vertical vanishing point to intersect an outer-most pixel 2214 on the boundary of feature 2200.

In one or more embodiments, two horizontal bounding lines are also generated, which comprise an upper horizontal bounding line and a lower horizontal bounding line based on rays extending from a non-vertical vanishing point. The upper horizontal bounding line touches the outer-most pixel on the top of a border of the set of pixels for the feature and points towards or extend from the non-vertical vanishing point assigned to the feature. The lower horizontal bounding line touches the outer-most pixel on the bottom of the border of the set of pixels and also points towards or extends from the non-vertical vanishing point assigned to the feature.

Returning to the example of FIG. 22, upper horizontal bounding line 2202 and lower horizontal bounding line 2204 extend from the direction of the left vanishing point. Upper horizontal bounding line 2202 is a ray that extends from the direction of the left vanishing point assigned to feature 2200 to intersect an outer-most pixel (one or both of pixels labeled 2210) on the boundary of feature 2200. Similarly, lower horizontal bounding line 2204 is a ray that extends from the direction of the left vanishing point to intersect an outer-most pixel 2216 on the boundary of feature 2200.

Accordingly, left vertical bounding line 2206 bounds the left side of the feature portion, while right vertical bounding line 2208 bounds the right side of the feature portion. Upper horizontal bounding line 2202 bounds the top part of the feature portion, and lower horizontal bounding line 2204 bounds the bottom part of the feature portion. According to an embodiment, the shape that is associated with the bounded feature is generated based on the bounding lines identified for the feature.

Figure 23A:
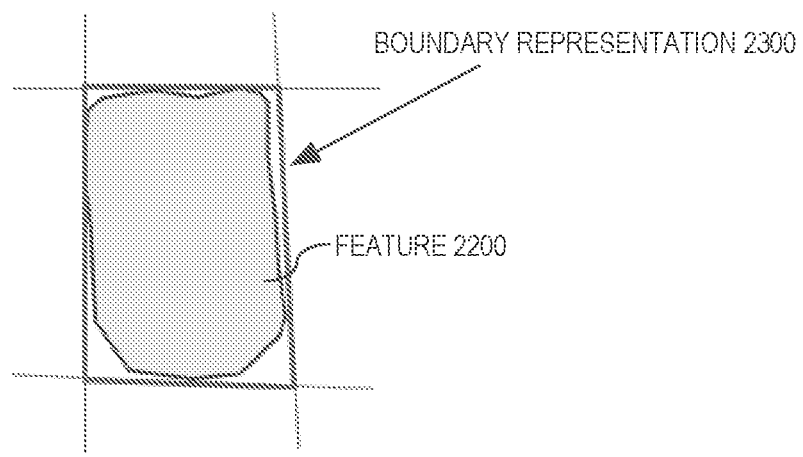

For a quadrilateral shape, the boundary representation is based on the vertices at which the bounding lines intersect, and the edges defined by the portions of the rays found between the intersecting points. FIG. 23A depicts an example quadrilateral boundary representation 2300 generated based on bounding lines comprising upper horizontal bounding line 2202, lower horizontal bounding line 2204, left vertical bounding line 2206, and right vertical bounding line 2208. In one or more embodiments, the image that includes feature 2200 is classified or associated with metadata that identifies the set of pixels representing feature 2200 as a window or having a rectangular shape. Accordingly, the computing system automatically circumscribes a rectangle within the indicated bounding lines according to the vertices at which the bounding lines intersect, and the edges defined by the portions of the rays found between the intersecting points. Because the shape formed by the bounding lines is a quadrilateral, this shape is used as the boundary representation 2300 for feature 2200.

For a non-quadrilateral shape, the boundary representation is based on an associated shape of the feature, aligned within the image based on bounding lines for the feature. For example, FIG. 23C depicts an example circular boundary representation 2310 that is bounded by bounding lines comprising an upper horizontal bounding line, a lower horizontal bounding line, a left vertical bounding line, and a right vertical bounding line determined based on vanishing points as described in detail above. In this example, circle boundary representation 2310 is sized so that it touches all four bounding lines.

FIG. 23C further depicts an example octagonal boundary representation 2320 that is similarly bounded by bounding lines comprising an upper horizontal bounding line, a lower horizontal bounding line, a left vertical bounding line, and a right vertical bounding line determined based on vanishing points. In this example, octagonal boundary representation 2320 is sized such that the top horizontal bounding line of the shape follows the upper horizontal bounding line, the bottom horizontal bounding line follows the lower horizontal bounding line, the right vertical bounding line follows the right vertical bounding line, and the left vertical bounding line follows the left vertical bounding line. The diagonal lines of the boundary representation are calculated according to intermediate lines extending from the selected vertical and left vanishing points, as depicted by the dashed internal lines within boundary representation 2320.

FIG. 23C further depicts an example triangular boundary representation 2330 that is similarly bounded by two opposing bounding lines determined based on vanishing points, comprising either an upper horizontal bounding line and a lower horizontal bounding line, or a left vertical bounding line and a right vertical bounding line. Triangular boundary representation 2330 comprises an "aligning" side 2332 that aligns with one of the bounding lines, e.g., the lower horizontal bounding line. Triangular boundary representation 2330 further comprises an opposing point 2334 that is disposed on the opposite bounding line (e.g., the upper horizontal bounding line). According to an embodiment, the aligning side of a triangular feature is determined based on the widest portion of the pixels that represent the feature. A bounding line is identified to align with the outer-most pixel of the aligning side. The opposite bounding line is identified to align with the outer-most pixel that opposes the aligning side, which outer-most pixel is also determined to be the opposing point of the triangle. The other two sides are drawn to connect the vertices of aligning side 2332 to point 2334.

In one or more embodiments, the boundary representation is stored as metadata in association with the digital image. Additionally, the boundary representation may be displayed in a computer display connected to the computer system. The boundary representation may be displayed as a visual overlay on top of the digital image. Additionally or alternately, a second digital image may be generated that includes the visual overlay of the boundary representation and the contents of the original digital image.

FIG. 23B depicts the net comparison of an input image on the far left with a window prediction from semantic segmentation only and with the boundary representation methods as described in this disclosure.

Direct Conversion of Segmentation Mask to Rendered Image

According to an embodiment, a computer system uses machine learning (ML) to train an ML model to generate (or "render") photo-realistic images based on segmentation masks. The ML model accepts, as input, a segmentation model and predicts a photo-realistic rendering of the input segmentation model as output. A resulting ML-rendered image is photorealistic in that it includes contrast, light, and shadows as would a photographic image. The ML model infers the depicted contrast, light, and shadows based on relationships between the structure, element, and feature portions of the segmentation mask. Thus, with minimal skill and computing resources, a user may use the ML model to generate a photorealistic image, including appropriate texture, light, and shadows (and even with desired foreground and background elements having consistent light and shadows) based on a segmentation mask.

Techniques are described herein for using machine learning-based rendering of photorealistic images, based on segmentation masks, to adjust a photographic image without requiring specialized photograph editing software or creation of a 3D model of the image subject. Specifically, a segmentation mask that represents a photographic image is adjusted, i.e., distinguishing attribute values of pixels in the mask are adjusted, to reflect a desired change to the photographic image. The ML model is then used to predict a photorealistic rendered image, based on the adjusted segmentation mask, which reflects the desired change to the photographic image. For example, a homeowner may wish to have a preview of a planned adjustment to the home, such as addition of a garage, removal of a tree, adjustment to landscaping, a change to home finishes, etc. The homeowner may generate a segmentation mask based on an image of the home, adjust the segmentation mask to reflect the desired change, and then use the ML model to predict a photorealistic image that reflects the change in the adjusted segmentation mask. Virtually any hardware and software configuration, having an image editor (such as Microsoft Word) is able to be used to edit a segmentation mask.

Pixel-wise detection of feature portions in a target image to create a segmentation mask results in feature portions of the segmentation mask that, at times, do not accurately represent the shape of the features being represented. Furthermore, a segmentation mask that has been adjusted (as described in further detail below) may also include some feature portions that do not line up with the rest of the structure, or that are drawn with crooked or uneven lines that are not generally desirable for the added or adjusted image element. Thus, a photorealistic rendering of a segmentation mask that was derived from a photographic image, or of a segmentation mask that has been edited, may include features that are undesirably irregular, blurry, crooked, etc.

As such, according to an embodiment, techniques for automatic generation of boundary indicators are used to refine the boundaries of feature portions in a segmentation mask. Many times, an ML model is able to render, in a resulting rendered image, feature portions with refined feature boundaries more cleanly than would be possible for an originally-rendered segmentation mask, or adjusted segmentation mask, that has not been refined.

Further, according to an embodiment, a graphical user interface (GUI) may be used to aid in editing a segmentation map. According to an embodiment, pre-defined feature portions, in a library of pre-defined feature portions, are available to drag onto a segmentation map. According to another embodiment, the segmentation mask being edited is displayed, to the user, using the rendered image for the segmentation mask (or the original image from which the segmentation mask was derived). In this case, edits made to the segmentation mask appear to be made directly on the displayed image.

Generate a Segmentation Mask from an Image

Techniques are described herein for using machine learning-based rendering of photorealistic images, based on segmentation masks, to adjust a photographic image without requiring specialized photograph editing software or a 3D model of the image subject. Specifically, a segmentation mask that represents a photographic image is adjusted, i.e., distinguishing attribute values of pixels in the mask are adjusted, to reflect a desired change to the photographic image. A trained ML model (described in further detail below) is then used to predict a photorealistic rendered image, based on the adjusted segmentation mask, which reflects the desired change to the photographic image. For example, a homeowner may wish to have a preview of a planned adjustment to the home, such as addition of a garage, removal of a tree, adjustment to landscaping, a change to home finishes, etc. The homeowner may generate a segmentation mask based on an image of the home, adjust the segmentation mask to reflect the desired change, and then use the trained ML model to predict a photorealistic image that reflects the change in the adjusted segmentation mask.

Create a Photo-Realistic Image from a Segmentation Mask

A segmentation mask for an image represents the content of the image by assigning to different sets of pixels, representing different elements of the image, different values of one or more attributes. Any attribute that may be associated with a mask pixel may be used as a "distinguishing" attribute to distinguish between the various elements represented in a segmentation mask, such as: color, identifier, texture code, zone identifier, hash fill type, etc. Examples of segmentation masks are described herein as distinguishing between different elements based on a color attribute as the distinguishing attribute. However, such examples are non-limiting.

Example segmentation mask 2500 represents the elements of a structure in an original photographic image 2510. Each shape in mask 2500 represents a feature portion and/or a structure portion of the structure depicted in image 2510. For example, all of the groups of pixels depicted in segmentation mask 2500 (other than the background-white-pixels) represent the structure portion of image 2510. Example feature portions in mask 2500 include feature portions 2502-2508. Feature portions 2502 represent window features of the structure. Feature portions 2502 include two different pixel colors, representing sub-features of the window features (i.e., panes in light blue and casings/grilles in tan). Feature portions 2504 represent wall corner features in cyan, and feature portions 2506 represent roof lines in light purple. Also feature portion 2508 represents a garage door feature in bright green. In example segmentation mask 2500, the color values of pixels of a given feature portion correspond to textures or finishes to be applied to those pixels.

According to an embodiment, computer system 1310 uses machine learning (ML) to train an ML model 1316 to generate (or "render") photo-realistic images based on segmentation masks. To illustrate, computer system 1310 trains an ML model using a training data set, e.g., stored at data storage 1320 that comprises segmentation masks and corresponding photograph images, or photo-realistic images, that should be generated from the segmentation masks. Example computer system 1310 includes an example trained ML model 1316 that has been trained using such a training data set. According to one or more embodiments, the training data set for the ML model may also include one or more of: an original image used to produce the segmentation mask, and a prior version of the segmentation mask where the segmentation mask that is the basis of the rendering is an adjusted segmentation mask. Adding such data allows the ML model to generate a photo-realistic rendered image that is more similar to the original image and/or more precise with respect to updating the original image regarding the changes between the original segmentation mask and the updated segmentation mask.

ML model 1316 accepts, as input, a segmentation model and predicts a photo-realistic rendering of the input segmentation model as output. For example, computer system 1310 causes ML model 1316 to accept, as input, structure segmentation mask 2500. According to an embodiment, ML model 1316 is also configured to accept, as input, original image 2510. In this case, ML model 1316 bases the resulting rendered image on both the original image and the segmentation mask.

According to an embodiment, ML model 1316 is configured to accept, as a single input, one or both of a background mask (such, as background segmentation mask 2610 of FIG. 26), or a foreground mask (such as foreground segmentation mask 2620 of FIG. 26) with the structure segmentation mask. In this case, ML model 1316 automatically predicts rendered images for each of the input segmentation masks (structure, foreground, and background) combined as a single input. According to an embodiment, ML model 1316 utilizes relative positions and shapes of the objects' semantic identifier to render the full scene in a multi-step optimizing inference of the masks layers' relative positions. Relative positions may include depth information or two-dimensional coordinate position. The multi-step optimizations may include progressive refinements of predictions for one or more parameters. In one or more embodiments, ML model 1316 is configured to accept a single mask input, the mask having m+n objects defined during training, with m representing the number of objects classified as foreground objects and n representing the number of objects classified as background objects.

Figure 27:
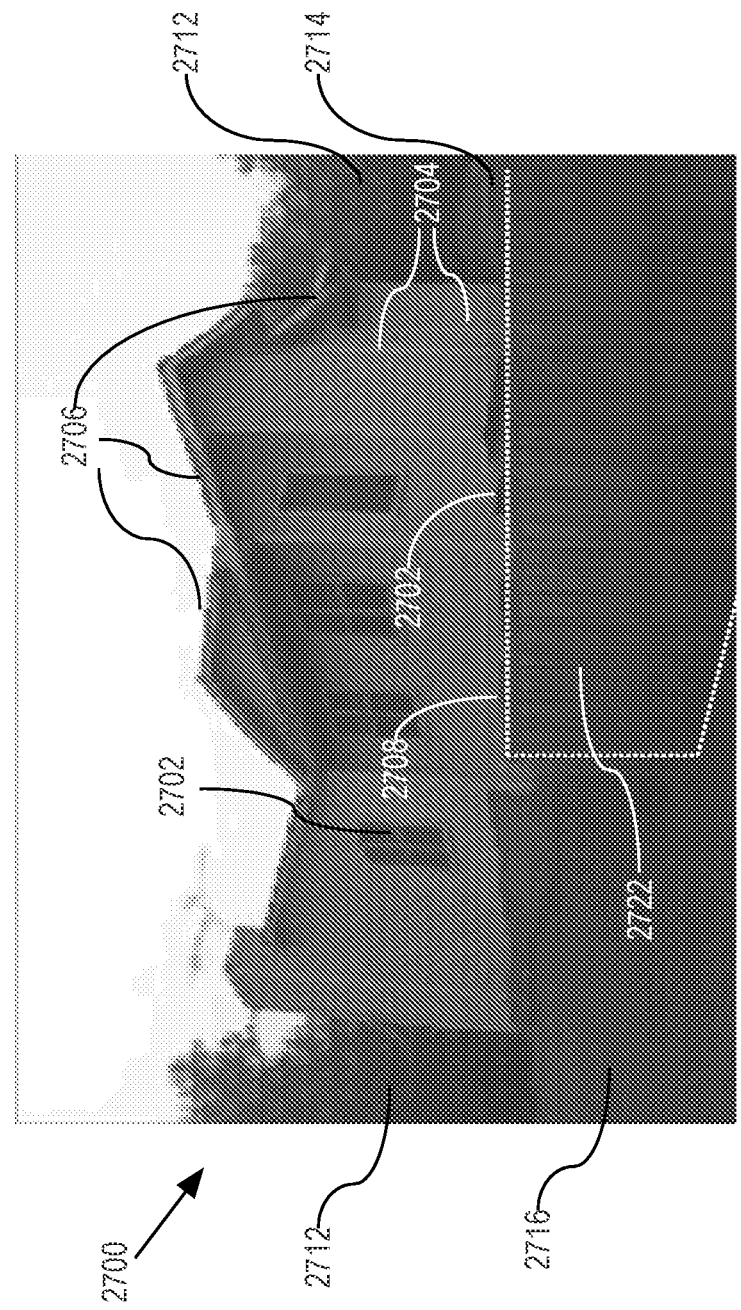
FIG. 27 depicts a photo-realistic image generated based on segmentation masks.

FIG. 27 depicts an example ML-rendered image 2700 produced using ML model 1316 based on masks 2500, 2610, and 2620 as input. Specifically, ML-rendered image 2700 includes background element representations (trees) 2712 corresponding to feature portions 2612 of background segmentation mask 2610, a background element representation 2714 (rock) corresponding to feature portion 2614 of background segmentation mask 2610, and also a background element representation 2716 (hill) corresponding to feature portion 2616 of background segmentation mask 2610. ML-rendered image 2700 further comprises the structure portion represented in segmentation mask 2500 superimposed over the background element representations. The rendered structure includes feature representations 2702 (windows) corresponding to feature portions 2502 of segmentation mask 2500, feature representations 2704 (wall corners) corresponding to feature portions 2504, feature representations 2706 (roof lines) corresponding to feature portions 2506, and feature representation 2708 (garage door) corresponding to feature portion 2508.

ML-rendered image 2700 further includes a foreground element representation 2722 (fence) that corresponds to feature portion 2622 of foreground segmentation mask 2620, which partially or totally obscures portions of the background element representations and the structure representation. Specifically, foreground element representation 2722 partially obscures feature representation 2708 and partially/fully obscures one or more of window feature representations 2702.

ML-rendered image 2700 is photorealistic in that it includes contrast, light, and shadows as would a photographic image. ML model 1316 infers the depicted contrast, light, and shadows based on relationships between the structure, element, and feature portions of the segmentation mask. Thus, with minimal skill and computing resources, a user may use ML model 1316 to generate a photorealistic image, including appropriate texture, light, and shadows (and even with desired foreground and background elements having consistent light and shadows) based on a segmentation mask.

Refine a Segmentation Mask

Pixel-wise detection of feature portions in a target image to create a segmentation mask results in feature portions of the segmentation mask that, at times, do not accurately represent the shape of the features being represented. For example, in a segmentation mask generated from a photographic image, the edges of the structure portions and/or feature portions may be jagged or blurred, and the shape formed by an identified set of pixels may include irregularities such as spikes or include pixels that were incorrectly identified as being part of the feature, etc. Furthermore, a segmentation mask that has been adjusted (as described in further detail below) may also include some feature portions that do not line up with the rest of the structure, or that are drawn with crooked or uneven lines that are not generally desirable for the added or adjusted image element. Thus, a photorealistic rendering of a segmentation mask that was derived from a photographic image, or of a segmentation mask that has been edited, may include features that are undesirably irregular, blurry, crooked, etc.

Figure 28:
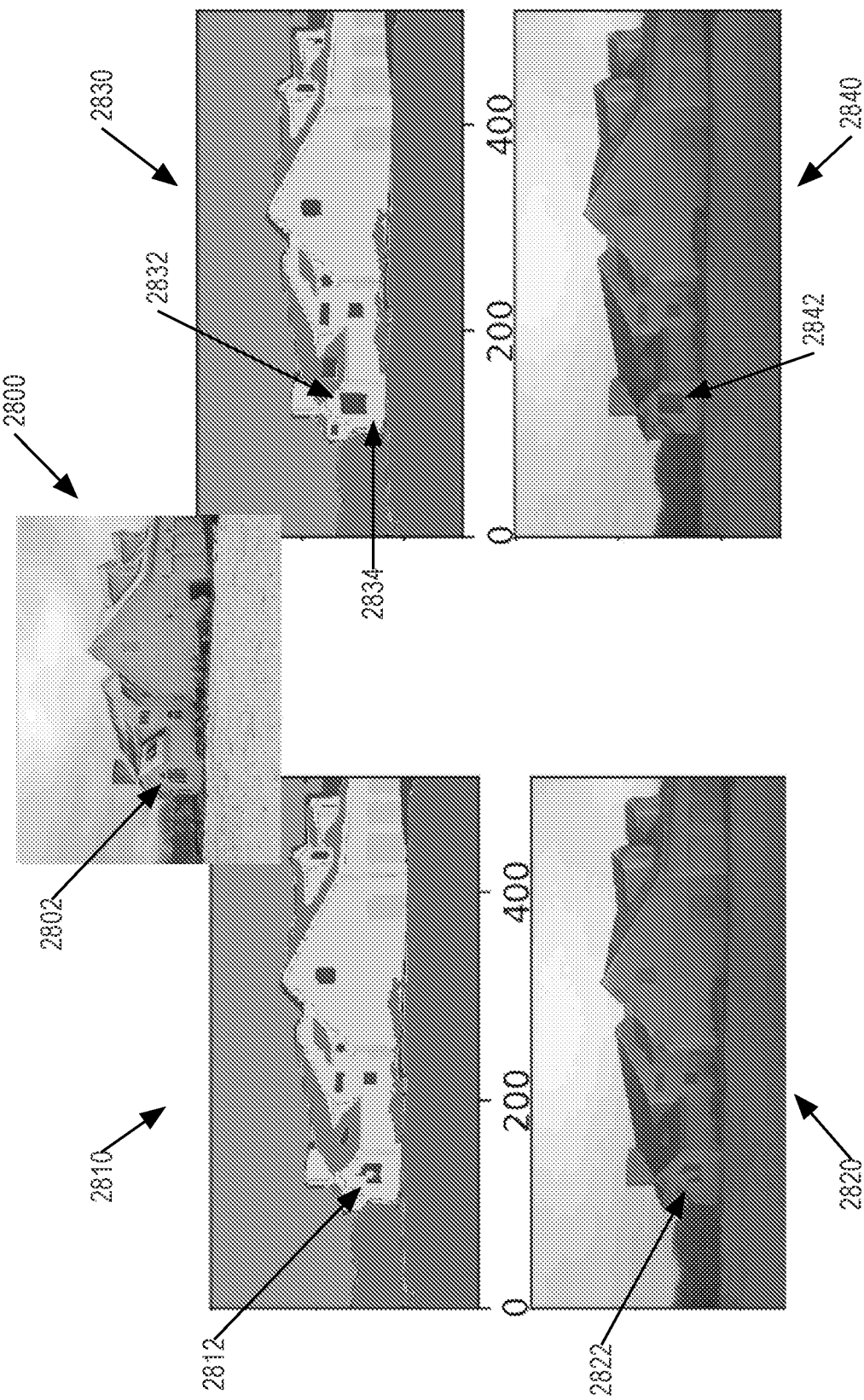
FIG. 28 depicts an original photographic image, an original segmentation mask generated from the original image, and a refined segmentation mask for the image, as well as rendered images generated based on the segmentation masks.

For example, FIG. 28 depicts an original image 2800 that represents a structure with a window 2802. Computer system 1310 generates a segmentation mask 2810 from image 2800. In segmentation mask 2810, feature portion 2812, the set of pixels that represent window 2802 in segmentation mask 2810, does not accurately represent either the relatively intricate shape of window 2802 or even a more general quadrilateral window shape. Specifically, the segmentation boundaries for feature portion 2812 is irregular in a manner that is inconsistent with the general shape of a window (quadrilateral). Image 2820 is an example photorealistic rendering produced using techniques described herein. The irregular segmentation of feature portion 2812 carries through into an irregular photorealistic feature representation 2822, appearing in image 2820 as a "broken" window, which distracts from the rendering of the structure.

According to an embodiment, techniques for automatic generation of boundary indicators, as described in detail herein, are used to refine the boundaries of feature portions in a segmentation mask. Many times, ML model 1316 is able to render, in a resulting rendered image, feature portions with refined feature boundaries more cleanly than would be possible for an originally-rendered segmentation mask, or adjusted segmentation mask, that has not been refined. Techniques for automatic generation of boundary indicators to refine feature borders in a segmentation mask may be applied at any stage of segmentation mask-based image adjustment, including after a segmentation mask has been generated based on an original image, or after a user has adjusted a segmentation mask with the desired changes to be reflected in the photorealistic rendered image.

Returning to the example of FIG. 28, techniques for boundary modification are applied to one or more features in segmentation mask 2810 to produce a refined segmentation mask 2830. Such boundary modifications can be used to rectify feature portions, in the segmentation mask, that do not line up with structure portion lines, or that have irregular boundaries. To illustrate application of techniques for boundary modification, feature portion 2812 is associated with feature representation metadata that indicates that it is associated with a quadrilateral shape, or that it has been classified as a certain type of feature (e.g., window-like feature). Computer system 1310 uses this information to apply techniques for boundary modification to adjust the boundary of feature portion 2812, as shown by feature portion 2832, to reflect a quadrilateral shape that lines up with the structure lines in the original image.

To illustrate, in connection with identifying an adjusted boundary for feature portion 2812, a minimum bounding box is identified for feature portion 2812. The minimum bounding box may be an inner bounding box or an outer bounding box. An inner bounding box is the maximum size bounding box that contains only pixels of the feature portion. An outer bounding box is the minimum size bounding box that contains all pixels of the feature portion. The bounding boxes may be calculated and applied using convex hull principles or other suitable computational geometry techniques. According to an embodiment, computer system 1310 uses one or more boundary refinement techniques, such as a pixel-class assignment-based refinement (e.g., a grab cut technique) and/or spur removal techniques to refine to the feature portion based on the minimum bounding box.

Computer system 1310 associates the feature portion with one or more vanishing points of the structure, as described in detail above. The vanishing points may be determined based on an original image or based on the segmentation mask. Computer system 1310 generates boundary representation lines for the structure feature based on the feature portion and the assigned vanishing points. The feature portion may be a refined feature portion or a segmented feature portion only. In one or more embodiments, generating the boundary representation lines for a given feature comprises extending rays (referred to herein as "bounding lines") from one or more of the vanishing points to align, or in one or more embodiments to tangentially intersect, with the outer-most pixels of the feature, e.g. outline 1906 of FIG. 19. Such bounding lines for a given feature may include two vertical bounding lines that extend from a vertical vanishing point and two horizontal bounding lines that extend from a non-vertical (i.e., left or right) vanishing point. The updated boundary for the feature portion is determined based on the bounding lines, as described in detail above.

According to an embodiment, a second feature set of pixels is created based on the updated boundary identified based on the bounding lines. Returning to the example of FIG. 28, computer system 1310 generates a refined feature set of pixels (feature portion) 2832 for feature portion 2812. Feature portion 2832 has a more regular shape than feature portion 2812, and is a quadrilateral, unlike feature portion 2812. Also, the lines of feature portion 2832 are oriented according to vanishing points determined for image 2800, which allows the feature to appear to be disposed on associated surface 2834 of the depicted structure.

According to an embodiment, the second feature set of pixels (feature portion 2832) is superimposed over the original feature set of pixels (feature portion 2812) in the original segmentation mask 2810 to produce refined segmentation mask 2830. In this embodiment, the original feature set of pixels is not removed from segmentation mask 2830 in order to retain the original shape of the feature portion. Preservation of the original feature shape is useful when the original shape is more desirable to the user than the refined shape, such as in the case of very small features that may be removed completely in the refinement process, or in the case of irregularly-shaped features that are distorted by the refinement process.

The adjusted segmentation mask with the refined feature boundary may be used in place of the segmentation mask without the refined feature boundary. For example, based on refined segmentation mask 2830, ML model 1316 predicts a photorealistic image 2840 in which feature representation 2842 has window-like quadrilateral proportions, in contrast to feature representation 2822 in image 2820 (generated based on the original segmentation mask 2810).

Edit a Segmentation Mask

Figure 31:
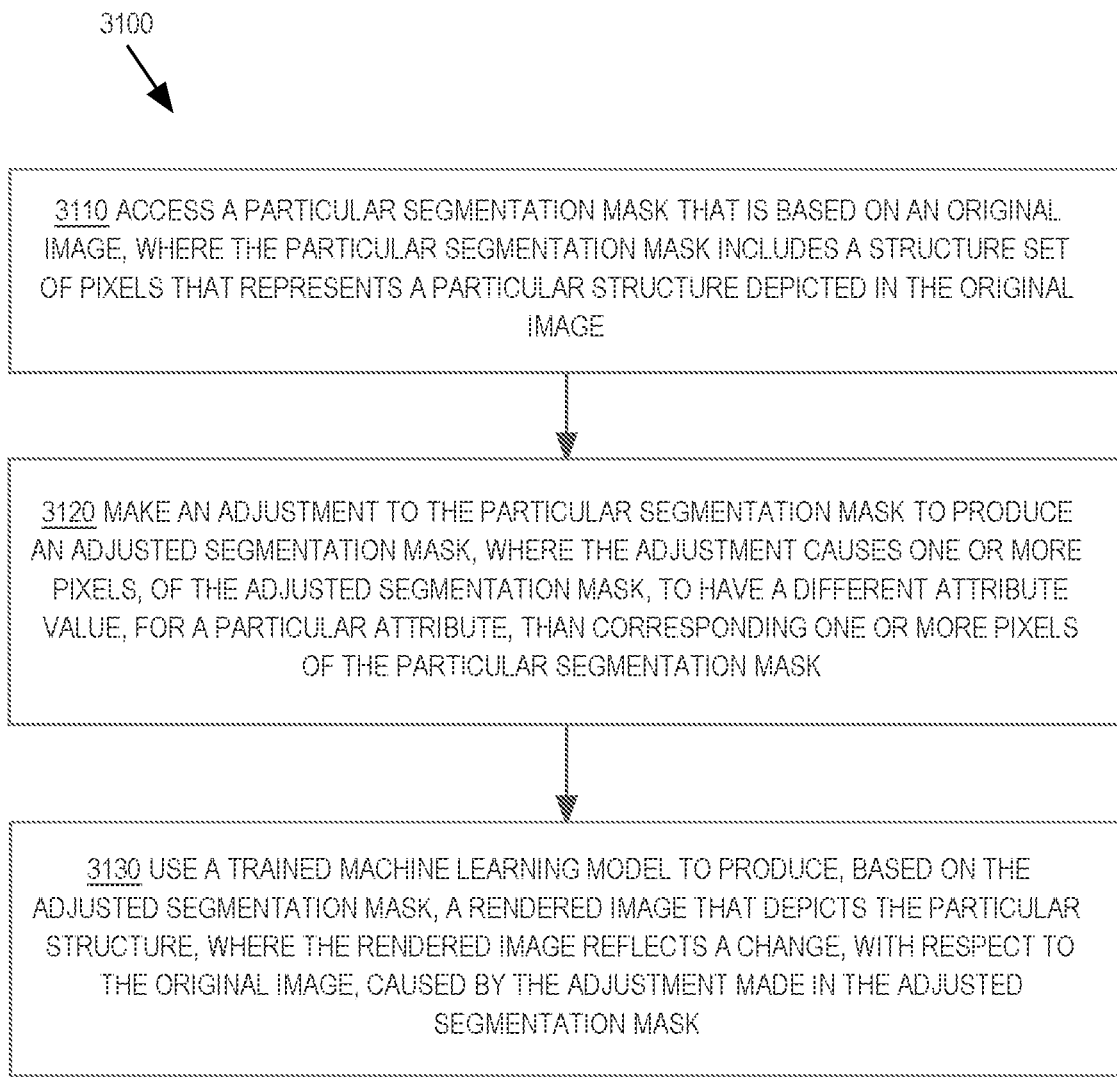
FIG. 31 depicts a flowchart for using machine learning to produce an adjusted photorealistic image based on making changes to a segmentation mask.

FIG. 31 depicts a flowchart 3100 for using machine learning to produce an adjusted photorealistic image based on making changes to a segmentation mask, according to an embodiment. Because generating a photorealistic image is performed based on a segmentation mask, a user may affect adjustments to an original image by generating a segmentation mask for the original image, and making adjustments to the segmentation mask using any hardware/software combination that includes a basic image editor. The edits do not require artistic talent, as would be required to directly edit the image itself. Also, there is no need to generate a 3D model of the subject of the image.

Specifically, at step 3110 of flowchart 3100, a particular segmentation mask that is based on an original image is accessed, where the particular segmentation mask includes a structure set of pixels that represents a particular structure depicted in the original image. For example, FIG. 29 depicts an example segmentation mask 2910 that was generated from an original image, such as image 2912, and stored in data storage 1320. The portions of mask 2910 that are not black are the structure set of pixels that represent house structure 2914 of image 2912. Computer system 1310 accesses segmentation mask 2910 in data storage 1320.

At step 3120 of flowchart 3100, an adjustment to the particular segmentation mask is made to produce an adjusted segmentation mask, where the adjustment causes one or more pixels, of the adjusted segmentation mask, to have a different attribute value, for a particular attribute, than corresponding one or more pixels of the particular segmentation mask. According to an embodiment, a color attribute of the pixels of the segmentation mask is the distinguishing attribute for elements of the segmentation mask, and the differently colored pixels in the segmentation mask represent different feature portions and also different rendering finishes or textures. For example, computer system 1310 maintains mapping data that associates particular color attribute values, such as RGB codes, with particular textures for rendering. As shown in FIG. 29, the red color value in segmentation mask 2910 is mapped to a dark brown aluminum siding texture, as shown on the wall portions of structure 2914 in image 2912.

In response to a user command, computer system 1310 changes the red color in segmentation mask 2910 to a violet color, as shown in adjusted segmentation mask 2920. In this example, the violet color value is mapped to a gray aluminum siding texture. An example user command to change the color of the feature portion in segmentation mask 2910 is the "fill" command in Microsoft Paint, which causes all contiguous pixels of an indicated color to be automatically changed to a target color.

At step 3130 of flowchart 3100, a trained machine learning model is used to produce, based on the adjusted segmentation mask, a rendered image that depicts the particular structure, where the rendered image reflects a change, with respect to the original image, caused by the adjustment made in the adjusted segmentation mask. For example, computer system 1310 uses ML model 1316 to predict rendered image 2922 based on adjusted segmentation mask 2920, where the texture of the violet feature portion of the segmentation mask is rendered as gray aluminum siding in the ML-rendered image (rather than dark brown aluminum siding in the original image).

Thus, using a segmentation mask, the finishes/textures of the subject of an image may be easily changed without specialized skill or tools. The segmentation mask may be adjusted using a simple image editor with draw and fill functions, such as Microsoft Paint. The numerical code of the color (i.e., the hex RGB code that is used to define particular colors) may be input to such a program to control the colors of the elements of the segmentation mask. With a known mapping between color codes and textures, a user may easily adjust the segmentation map to control, with precision, the rendered image generated based on the segmentation map.

Figure 30:
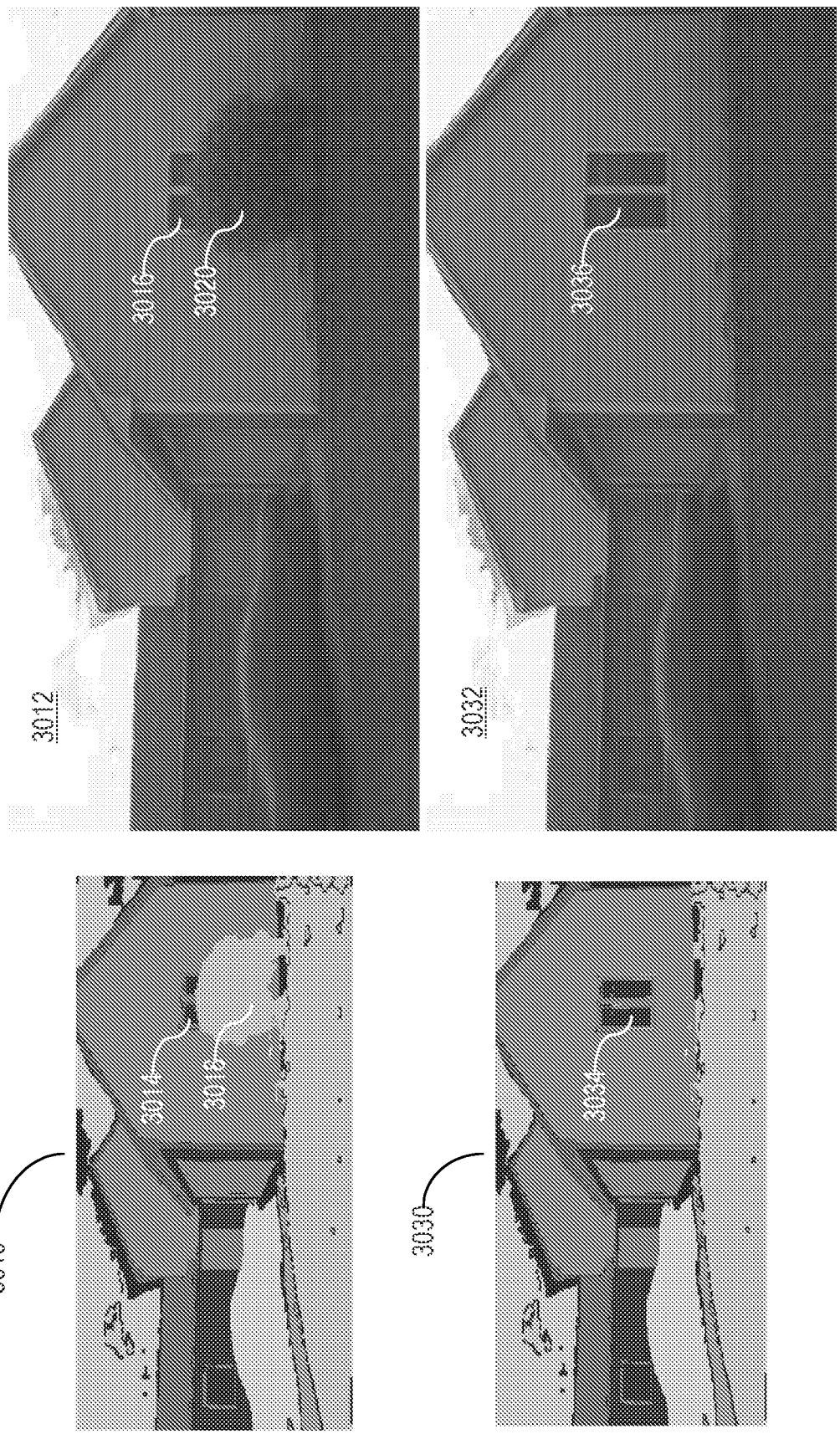

At times, an image includes an undesirable occlusion, or object obscuring a target subject of an image, which can be removed using techniques described herein. FIG. 30 depicts a segmentation mask 3010 that includes both background and foreground feature portions, as well as a structure portion for a target subject structure of the image. Feature portion 3018 of segmentation mask 3010 obscures part of the structure portion of the segmentation mask, as well as part of feature portion 3014 (window feature). Rendered image 3012 is an example rendering based on segmentation mask 3010, where the window feature representation 3016 (corresponding to feature portion 3014 in mask 3010) is partially obscured by foreground element representation 3020 (bush).

Segmentation mask 3010 may be edited, as described in detail above, to remove the feature portion that corresponds to the occlusion. As shown in adjusted segmentation mask 3030, feature portion 3018 has been replaced with a completed feature portion 3034 for the window feature, and the corresponding wall pixels that surround feature portion 3034. Rendered image 3032, generated by ML model 1316 based on segmentation mask 3030, shows window feature representation 3036 without the occlusion.

Because the updated rendered image 3032 is generated using ML model 1316, the shadowing and light for the image is preserved where the occlusion was removed with no more human effort than replacing the flat pixels in the segmentation mask with a continuation of what is known to be (or appears to be) under the occlusion. Furthermore, generating the updated segmentation mask and the updated rendered image is no more computationally expensive than the simple image editing operation and application the trained ML model, which is significantly more cost-effective than 3D rendering or direct photographic editing.

There are many applications of photorealistic image generation based on adjusted segmentation masks. FIGS. 32-38 depict examples of editing a segmentation mask to achieve various results in rendered photorealistic images. In all resulting ML-rendered images, the adjusted portions are photorealistic, having contrast, light, and shadows that are consistent with the rest of the rendered image.

FIG. 32 depicts before and after segmentation masks and associated ML-rendered images that show another example of removal of occlusion from a subject structure. FIG. 33 depicts deletion of two windows from the subject structure using manipulation of the segmentation mask. Specifically, a user deletes two of the feature portions in the segmentation mask that represent windows, and fills the resulting white rectangles with the same color red as the surrounding wall. Also, the user moves one of the remaining window feature portions, in the segmentation mask, to the near side of the wall on which the feature is disposed. In the after ML-rendered image, ML model 1316 predicts an image that includes continuous texture of aluminum siding between the two remaining windows, with appropriate light and shadows to match the rest of the rendered image.

FIG. 34 depicts addition of a sub-structure (a garage) to the depicted structure. Specifically, a user has duplicated the existing garage shapes on one side of the house structure to the other side of the structure. In the photorealistic image produced from the adjusted segmentation mask, the house includes a second garage. Further, FIG. 35 depicts addition of a tree in front of the depicted structure. The tree is drawn on the segmentation mask using a simple tree-like shape in a color that is mapped to a tree texture, and ML model 1316 interprets the shape as a tree in the resulting photorealistic image.

FIG. 36 depicts removal of a dormer from the roof of a subject structure. Specifically, the shape of the dormer is removed from above the roofline by filling it in with ambient (nonce) color, and the remainder of the dormer is removed by filling it in with the roof-indicator color. In the resulting photorealistic image, the house is shown without the dormer. The roof is intact, and light and shadow on the adjusted portion is consistent with the rest of the rendered roof.

FIGS. 37 and 38 depict changes to the surroundings of a structure. Specifically, FIG. 37 depicts addition of a road or path in the landscape surrounding the depicted structure. The path has consistent light and shadow with respect to the rest of the landscape, and as such, appears to be part of the scene. FIG. 38 depicts addition of a car to the landscape of the house.

As indicated above, adjusted portions of an adjusted segmentation mask, which have been adjusted according to user commands, may not line up with the rest of the structure, or may not be drawn with straight or even lines as would be desirable for the added feature. According to an embodiment, an adjusted segmentation map is refined based on automatic boundary indicator techniques. Specifically, using vanishing points established for the original segmentation mask or for an original image, lines of the new features/structures in an adjusted segmentation mask are automatically aligned with the established vanishing points.

Editing Tool

A graphical user interface (GUI) may be used to aid in editing a segmentation map. According to an embodiment, pre-defined feature portions, in a library of pre-defined feature portions, are available to drag onto a segmentation map. In this embodiment, the segmentation map may be adjusted by receiving a user instruction to add a pre-defined feature portion to a particular location of the segmentation map, and, in response, adding the indicated feature portion to the location of the segmentation map. The pre-defined feature portion may replace pixels in the segmentation map, or may be added as a layer on top of the segmentation map (thereby allowing for undo operations). According to an embodiment, the pre-defined feature portions are pre-configured with distinguishing attribute values to cause appropriate textures to be rendered for the feature portion, e.g., glass in windowpanes, a solid smooth door, etc.

According to another embodiment, the segmentation mask being edited is displayed, to the user, using the rendered image for the segmentation mask (or the original image from which the segmentation mask was derived). In this case, edits made to the segmentation mask appear to be made directly on the displayed image. For example, a GUI displays an ML-rendered image for a particular segmentation mask being edited. A user drags a selection box over part of the displayed image, where the selected part of the image includes one or more feature portions. The GUI shows the selection on the ML-rendered image, and computes the selection on the corresponding pixels of the segmentation mask. The user then hits a delete button. In response, the computing device deletes the selected portion of the segmentation mask, fills in the deleted pixels with pixels having the distinguishing attribute value (e.g., color) of the surrounding pixels, and then causes ML model 1316 to predict anew ML-rendered image for the adjusted segmentation mask. The GUI then displays the updated ML-rendered image, which shows the user the effect of the deletion on the rendered image. Such a GUI allows a user to directly edit a segmentation mask while appearing to directly edit an image.

A pre-defined feature portion that a user adds to a segmentation mask may not be oriented according to the depicted structure. For example, a user drags a pre-defined window feature portion onto a particular surface of a depicted structure, and drops the feature portion on the surface as an instruction to dispose the feature portion on the surface of the structure. However, unless the surface is oriented in parallel with the image plane, the window feature portion will not be oriented correctly on the surface. Thus, according to an embodiment, techniques for automatic generation of feature boundary indicators are used to adjust the boundary of the pre-defined feature to fit the perspective of the surface on which it is disposed.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for ML model 1316 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. A supervised or unsupervised ANN model may be elevated as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., a ToR switch ML model, according to an embodiment. A best trained Random Forest ToR switch ML model is selected, from a set of models resulting from the training phase, to be the basis for instances of a trained ToR switch ML model deployed to respective ToR switches in a datacenter. Computer system 1310 produces a training data set for ML model 1316, as described in detail above. In one or more embodiments, computer system 1310 preprocesses the historical utilization data gathered from the non-OS sources prior to labeling the training data that will be used to train the Random Forest ToR switch ML model. The preprocessing may include cleaning the readings for null value s, normalizing the data, downsampling the features, etc.

In an embodiment, computer system 1310 receives hyperparameter specifications for the Random Forest ToR switch ML model to be trained. Without limitation, these hyperparameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

Computer system 1310 trains the Random Forest ToR switch ML model using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and computer system 1310 trains another Random Forest ToR switch ML model having the new set of hypermeters specified. All Random Forest ToR switch ML models trained during this training phase are the set of models from which the best trained ToR switch ML model is chosen.

Computer System Overview

Figure 13:
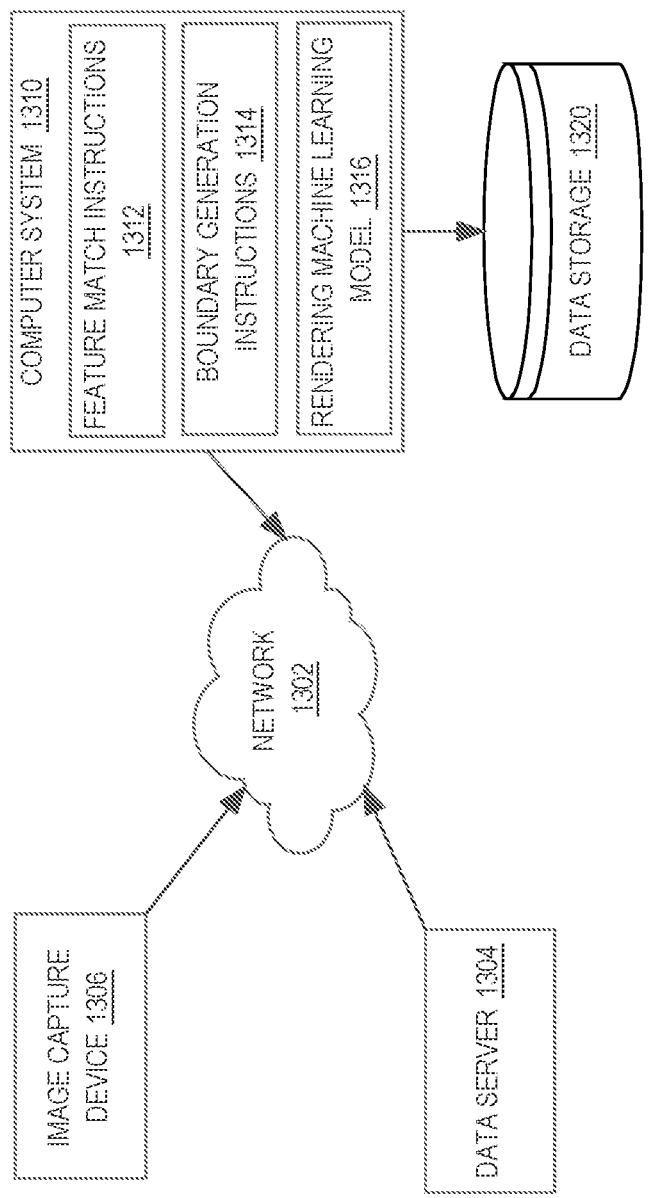
FIG. 13 depicts an example computer system configured to perform techniques described herein.

FIG. 13 depicts an example computer system 1310 that is configured to perform the techniques described herein. In the depicted embodiment, computer system 1310 is communicatively coupled via a network 1302 to a data server device 1304 and an image capture device 1306. Example computer system 1310 may include, or communicate with, other devices including computing devices, image capture devices, databases and other data storage devices, and display devices, according to embodiments. For example, a plurality of image capture devices and data servers may be communicatively coupled to computer system 1310. As another example, one or more of the services attributed to computer system 1310, or functions attributed to computer system 1310 herein may be run on or accomplished by one or more other computer systems that are communicatively coupled to network 1302.

Computer system 1310 may be implemented by any type of computing device that is communicatively coupled to network 1302. Example implementations of computer system 1310 include, but are not limited to, workstations, personal computers, laptops, multi-processor systems, mobile devices, and the like. Although FIG. 13 shows a single element, computer system 1310 may comprise one or more computers, such as a server cluster, and the computer system 1310 may be located in one or more physical locations.

In the depicted embodiment, computer system 1310 is communicatively coupled to a data storage 1320, which stores images received at computer system 1310. Data storage 1320 may also store metadata associated with each image. In one embodiment, data storage 1320 is a data storage subsystem consisting of programs and data that is stored on any suitable storage device such as one or more hard disk drives, memories, or any other electronic digital data recording device configured to store data. Although data storage 1320 is depicted as a single device in FIG. 13, data storage 1320 may span multiple devices located in one or more physical locations. Data storage 1320 may be internal or external to computer system 1310.

In one or more embodiments, computer system 1310 may download, obtain, or receive digital images from various sources, such as data server device 1304 or image capture device 1306. Example sources include image capture devices and remote computing devices, such as mobile phones or server computers.

Data server device 1304 may be any computing device, including but not limited to: servers, racks, workstations, personal computers, laptops, Internet appliances, wireless devices, wired devices, multi-processor systems, and the like. Although FIG. 13 shows a single element, the data server device 1304 broadly represents one or more multiple server computers, such as a server cluster, and data server device 1304 may be located in one or more physical locations. Data server device 1304 may also represent one or more virtual computing instances that execute using one or more computers in a datacenter such as a virtual server farm. Data server device 1304 may receive or obtain digital images from an image capture device 1306, users, other data servers, or other sources. Data server device 1304 may also transmit digital images to computer system 1310.

Image capture device 1307 may be any device that can capture or record images and videos. For example, image capture device 1306 may be any computing device with a built-in camera or a communicatively coupled digital camera. Example image capture devices include digital cameras, mobile phones, tablets, computing devices with a webcam, a drone, or a specialized camera-equipped vehicle.

In the depicted embodiment, image capture device 1306 is connected to data server device 1304 and computer system 1310 via network 1302. Image capture device 1306 may be configured to transmit images directly to a data server device 1304 or to computer system 1310.

According to an embodiment, computer system 1310 further comprises feature match instructions 1312. Feature match instructions 1312 comprise one or more program instructions which, when executed by computer system 1310, cause computer system 1310 to receive a pair of digital images depicting a structure and feature representation data corresponding to each digital image, select pairs of feature representations for each digital image, generate homographies correlating the selected pairs of feature representations, identify inliers and adjust the homographies based on inliers, and select a homography from one or more generated homographies that correlates the feature representations between the pair of digital images.

In one or more embodiments, each structure feature depicted in a digital image may be a respective feature type, and the computer system 1310 may be configured to correlate features of a particular feature type. For example, the pair of digital images may depict a building, and a plurality of doors and windows of the building may be identified within each digital image. Computer system 1310 may be configured to select and correlate windows depicted in the digital images. In one or more embodiments, computer system 1310 may be configured to correlate features with a particular shape, e.g., quadrilateral or rectangular features, features with a minimum number of points, etc.

It will be further appreciated from the foregoing that some features are more relevant than others to "lock" or solve for a camera location and associate features across images, especially in wide baseline image captures that do not have camera transformation information between images provided as an input.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 24:
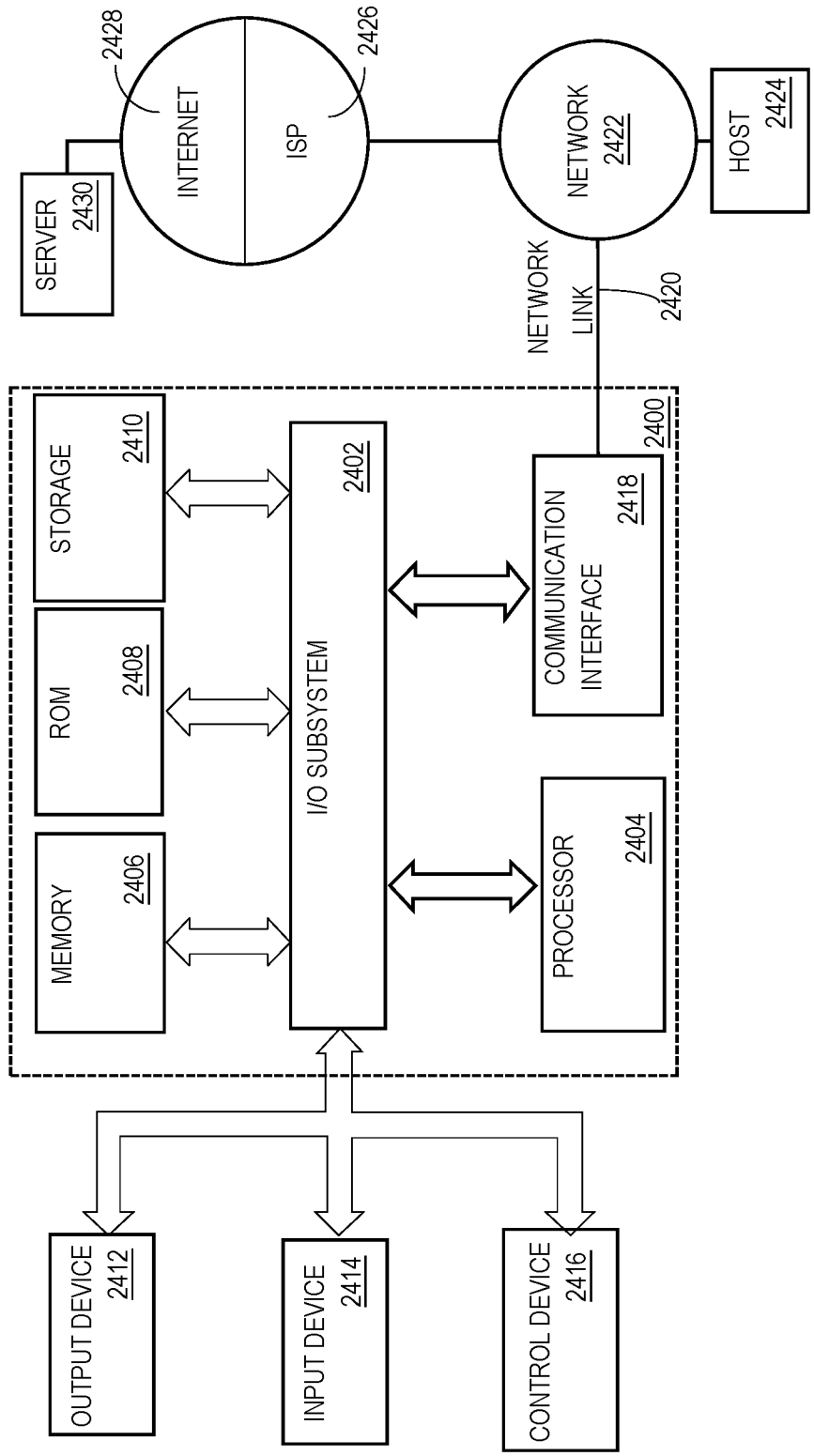
FIG. 24 is a block diagram depicting an example computer system.
Figure 25:
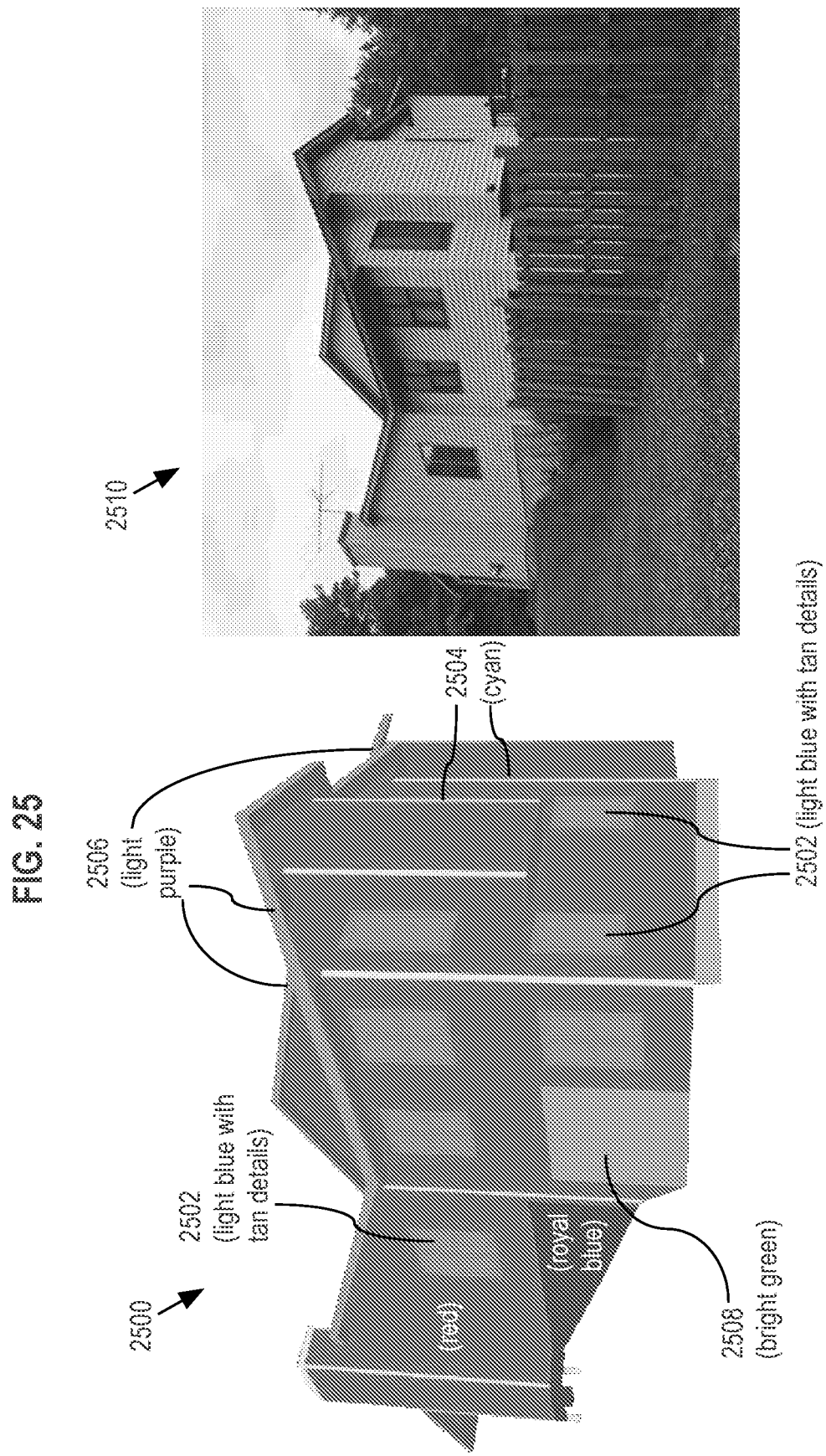
FIG. 25 depicts an example segmentation mask and associated photographic image.

FIG. 24 is a block diagram that depicts an example computer system with which one or more embodiments may be implemented. In the example of FIG. 24, a computer system 2400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 2400 includes an input/output (I/O) subsystem 2402 which may include a bus and/or other communication mechanism(s) for communicating information and/or instructions between the components of the computer system 2400 over electronic signal paths. The I/O subsystem 2402 may include an I/O controller, a memory controller and at least one I/O port. The electronic signal paths are represented schematically in the drawings, for example as lines, unidirectional arrows, or bidirectional arrows.

At least one hardware processor 2404 is coupled to I/O subsystem 2402 for processing information and instructions. Hardware processor 2404 may include, for example, a general-purpose microprocessor or microcontroller and/or a special-purpose microprocessor such as an embedded system or a graphics processing unit (GPU) or a digital signal processor or ARM processor. Processor 2404 may comprise an integrated arithmetic logic unit (ALU) or may be coupled to a separate ALU.

Computer system 2400 includes one or more units of memory 2406, such as a main memory, which is coupled to I/O subsystem 2402 for electronically digitally storing data and instructions to be executed by processor 2404. Memory 2406 may include volatile memory such as various forms of random-access memory (RAM) or other dynamic storage device. Memory 2406 also may be used for storing temporary variables or other intermediate information during execution of instructions to be executed by processor 2404. Such instructions, when stored in non-transitory computer-readable storage media accessible to processor 2404, can render computer system 2400 into a special-purpose machine that is customized to perform the operations specified in the instructions.

Computer system 2400 further includes non-volatile memory such as read only memory (ROM) 2408 or other static storage device coupled to I/O subsystem 2402 for storing information and instructions for processor 2404. The ROM 2408 may include various forms of programmable ROM (PROM) such as erasable PROM (EPROM) or electrically erasable PROM (EEPROM). A unit of persistent storage 2410 may include various forms of non-volatile RAM (NVRAM), such as FLASH memory, or solid-state storage, magnetic disk, or optical disk such as CD-ROM or DVD-ROM, and may be coupled to I/O subsystem 2402 for storing information and instructions. Storage 2410 is an example of a non-transitory computer-readable medium that may be used to store instructions and data which when executed by the processor 2404 cause performing computer-implemented methods to execute the techniques herein.

The instructions in memory 2406, ROM 2408 or storage 2410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 2400 may be coupled via I/O subsystem 2402 to at least one output device 2412. In one embodiment, output device 2412 is a digital computer display. Examples of a display that may be used in various embodiments include a touch screen display or a light-emitting diode (LED) display or a liquid crystal display (LCD) or an e-paper display. Computer system 2400 may include other type(s) of output devices 2412, alternatively or in addition to a display device. Examples of other output devices 2412 include printers, ticket printers, plotters, projectors, sound cards or video cards, speakers, buzzers or piezoelectric devices or other audible devices, lamps or LED or LCD indicators, haptic devices, actuators, or servos.

At least one input device 2414 is coupled to I/O subsystem 2402 for communicating signals, data, command selections or gestures to processor 2404. Examples of input devices 2414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 2416, which may perform cursor control or other automated control functions such as navigation in a graphical interface on a display screen, alternatively or in addition to input functions. Control device 2416 may be a touchpad, a mouse, a trackball, or cursor direction keys for communicating direction information and command selections to processor 2404 and for controlling cursor movement on output device 2412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 2414 may include a combination of multiple different input devices, such as a video camera and a depth sensor.

In another embodiment, computer system 2400 may comprise an internet of things (IoT) device in which one or more of the output device 2412, input device 2414, and control device 2416 are omitted. Or, in such an embodiment, the input device 2414 may comprise one or more cameras, motion detectors, thermometers, microphones, seismic detectors, other sensors or detectors, measurement devices or encoders and the output device 2412 may comprise a special-purpose display such as a single-line LED or LCD display, one or more indicators, a display panel, a meter, a valve, a solenoid, an actuator or a servo.

When computer system 2400 is a mobile computing device, input device 2414 may comprise a global positioning system (GPS) receiver coupled to a GPS module that is capable of triangulating to a plurality of GPS satellites, determining and generating geolocation or position data such as latitude-longitude values for a geophysical location of the computer system 2400. Output device 2412 may include hardware, software, firmware and interfaces for generating position reporting packets, notifications, pulse or heartbeat signals, or other recurring data transmissions that specify a position of the computer system 2400, alone or in combination with other application-specific data, directed toward host computer 2424 or server device 2430.

Computer system 2400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 2400 in response to processor 2404 executing at least one sequence of at least one instruction contained in main memory 2406. Such instructions may be read into main memory 2406 from another storage medium, such as storage 2410. Execution of the sequences of instructions contained in main memory 2406 causes processor 2404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 2410. Volatile media includes dynamic memory, such as memory 2406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 2402. Transmission media can also take the form of acoustic or light waves, such as those generated during radio-wave and infrared data communications.

Various forms of media may be involved in carrying at least one sequence of at least one instruction to processor 2404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 2400 can receive the data on the communication link and convert the data to a format that can be read by computer system 2400. For instance, a receiver such as a radio frequency antenna or an infrared detector can receive the data carried in a wireless or optical signal and appropriate circuitry can provide the data to I/O subsystem 2402 such as place the data on a bus. I/O subsystem 2402 carries the data to memory 2406, from which processor 2404 retrieves and executes the instructions. The instructions received by memory 2406 may optionally be stored on storage 2410 either before or after execution by processor 2404.

Computer system 2400 also includes a communication interface 2418 coupled to I/O subsystem 2402. Communication interface 2418 provides a two-way data communication coupling to network link(s) 2420 that are directly or indirectly connected to at least one communication networks, such as a network 2422 or a public or private cloud on the Internet. For example, communication interface 2418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 2422 broadly represents a local area network (LAN), wide-area network (WAN), campus network, internetwork, or any combination thereof. Communication interface 2418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 2418 sends and receives electrical, electromagnetic, or optical signals over signal paths that carry digital data streams representing various types of information.

Network link 2420 typically provides electrical, electromagnetic, or optical data communication directly or through at least one network to other data devices, using, for example, satellite, cellular, Wi-Fi, or BLUETOOTH technology. For example, network link 2420 may provide a connection through a network 2422 to a host computer 2424.

Furthermore, network link 2420 may provide a connection through network 2422 or to other computing devices via internetworking devices and/or computers that are operated by an Internet Service Provider (ISP) 2426. ISP 2426 provides data communication services through a world-wide packet data communication network represented as internet 2428. A server computer 2430 may be coupled to internet 2428. Server device 2430 broadly represents any computer, data center, virtual machine, or virtual computing instance with or without a hypervisor, or computer executing a containerized program system such as DOCKER or KUBERNETES. Server device 2430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 2400 and server device 2430 may form elements of a distributed computing system that includes other computers, a processing cluster, server farm or other organization of computers that cooperate to perform tasks or execute applications or services. Server device 2430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server device 2430 may comprise a web application server that hosts a presentation layer, application layer and data storage layer such as a relational database system using structured query language (SQL) or no SQL, an object store, a graph database, a flat file system or other data storage.

Computer system 2400 can send messages and receive data and instructions, including program code, through the network(s), network link 2420 and communication interface 2418. In the Internet example, a server device 2430 might transmit a requested code for an application program through Internet 2428, ISP 2426, local network 2422 and communication interface 2418. The received code may be executed by processor 2404 as it is received, and/or stored in storage 2410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 2404. While each processor 2404 or core of the processor executes a single task at a time, computer system 2400 may be programmed to implement multitasking to allow each processor to switch between tasks that are being executed without having to wait for each task to finish. In one or more embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In one or more embodiments, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a first image comprising data for a set of representations of co-planar rectangular features on a surface having a first orientation;
   receiving a second image comprising data for the set of representations of co-planar rectangular features on the surface having a second orientation;
   selecting, from the set of representations on the surface having the first orientation, a first representation, wherein the set of representations includes one or more first additional representations on the surface having the first orientation in addition to the first representation;
   selecting, from the set of representations on the surface having the second orientation, a second representation, wherein the set of representations includes one or more second additional representations on the surface having the second orientation in addition to the second representation;
   generating a homography aligning the first representation to the second representation;
   estimating locations of the first additional representations on the surface having the second orientation based on the homography;
   selecting an inlier pair formed from a first inlier and a second inlier based on the estimated locations, the inlier pair selected from the first additional representations and the second additional representations and the inlier pair being determined to match; and
   generating an adjusted homography collectively aligning the first representation and the first inlier to the second representation and the second inlier.

2. The method of claim 1, further comprising generating a fundamental matrix between the first and second images based on the homography.

3. The method of claim 2, further comprising:
   drawing an epipolar line in the second image based on the fundamental matrix with the first image; and
   correlating at least one feature in the first image in the second image.

4. The method of claim 3, further comprising estimating at least one camera position based on the correlated features.

5. The method of claim 4, further comprising reconstructing a three dimensional model of the correlated features based on the estimated camera position.

6. The method of claim 1, further comprising validating the homography based on a comparison between the estimated locations of one or more of the first additional representations relative to the second additional representations, wherein the first additional representations and the second additional representations are associated with same co-planar rectangular features.

7. The method of claim 6, wherein validating further comprises detecting non-alignment for all estimated locations of the first additional representations and at least one of the second additional representations.

8. The method of claim 6, wherein validating further comprises detecting an error below a threshold for a position of the estimated locations of at least one of the first additional representations and at least one of the second additional representations.

9. The method of claim 1, further comprising generating a fundamental matrix between the first and second images based on the adjusted homography.

10. The method of claim 6, wherein validating further comprises detecting that a particular feature representation, of the first additional representations, is an inlier based on determining that the estimated location of the particular feature representation is within a threshold number of pixels from locations of at least one of the second additional representations.

11. The method of claim 10, further comprising:
    determining that one or more other feature representations, other than the particular feature representation of the first additional representations, are mis-aligned; and
    in response to determining that the one or more other feature representations of the first additional representations, are mis-aligned, adjusting the homography based on an estimated position of at least one of the one or more other feature representations.

12. The method of claim 11, further comprising generating a fundamental matrix between the first and second images based on the adjusted homography.

13. A computer-readable storage medium comprising instructions which, when executed by a computer system, cause the computer system to:
    receive a first image comprising data for a set of representations of co-planar rectangular features on a surface having a first orientation;
    receive a second image comprising data for representations of the set of co-planar rectangular features on the surface having a second orientation;
    select, from the set of representations on the surface having the first orientation, a first representation, wherein the set of representations includes one or more first additional representations on the surface having the first orientation in addition to the first representation;
    select, from the set of representations on the surface having the second orientation, a second representation, wherein the set of representations includes one or more second additional representations on the surface having the second orientation in addition to the second representation;
    generate a homography aligning the first representation to the second representation;
    estimate locations of the first additional representations on the surface in the second orientation based on the homography;
    select an inlier pair formed from a first inlier and a second inlier based on the estimated locations, the inlier pair selected from the first additional representations and the second additional representations and the inlier pair being determined to match; and
    generate an adjusted homography collectively aligning the first representation and the first inlier to the second representation and the second inlier.

14. The computer-readable storage medium of claim 13, further comprising instructions that, when executed by the computer system, cause the computer system to generate a fundamental matrix between the first and second images based on the homography.

15. The computer-readable storage medium of claim 14, further comprising instructions that, when executed by the computer system, cause the computer system to:

draw an epipolar line in the second image based on the fundamental matrix with the first image; and correlate at least one feature in the first image in the second image.

16. The computer-readable storage medium of claim 15, further comprising instructions that, when executed by the computer system, cause the computer system to estimate at least one camera position based on the correlated features.

17. The computer-readable storage medium of claim 16, further comprising instructions that, when executed by the computer system, cause the computer system to reconstruct a three dimensional model of the correlated features based on the estimated camera position.

18. The computer-readable storage medium of claim 13, further comprising instructions that, when executed by a computer system, cause the computer system to validate the homography based on a comparison between the estimated locations of one or more of the first additional representations relative to the second additional representations, wherein the first additional representations and the second additional representations are associated with same co-planar rectangular features.

19. The computer-readable storage medium of claim 18, wherein the instructions, when executed by the computer system, cause the computer system to validate the homography by detecting non-alignment for all estimated locations of the first additional representations and at least one of the second additional representations.

20. The computer-readable storage medium of claim 18, wherein the instructions, when executed by the computer system, cause the computer system to validate the homography by detecting an error below a threshold for a position of the estimated locations of at least one of the first additional representations and at least one of the second additional representations.

21. The computer-readable storage medium of claim 13, further comprising instructions that, when executed by the computer system, cause the computer system to generate a fundamental matrix between the first and second images based on the adjusted homography.

22. The computer-readable storage medium of claim 18, wherein the instructions, when executed by the computer system, cause the computer system to validate the homography by detecting that a particular feature representation, of the first additional representations, is an inlier based on determining that the estimated location of the particular feature representation is within a threshold number of pixels from locations of at least one of the second additional representations.

23. The computer-readable storage medium of claim 22, further comprising instructions that, when executed by the computer system, cause the computer system to:

determine that one or more other feature representations, other than the particular feature representation of the first additional representations, are mis-aligned; and in response to determining that the one or more other feature representations of the first additional representations, are mis-aligned, adjust the homography based on an estimated position of at least one of the one or more other feature representations.

24. The computer-readable storage medium of claim 23, further comprising instructions that, when executed by the computer system, cause the computer system to generate a fundamental matrix between the first and second images based on the adjusted homography.

25. The method of claim 1, wherein the inlier pair was determined to match with less than a threshold error, wherein a remaining of the first additional representations was determined to match, based on the homography, with greater than the threshold error, and wherein the method further comprises:

estimating a location of the remaining of the first additional representations on the surface having the second orientation based on the adjusted homography; and selecting a second inlier pair that includes the remaining of the first additional representations, wherein the remaining of the first additional representations was determined to match a remaining of the second additional representations with less than the threshold error, and wherein the adjusted homography is further adjusted based on the second inlier pair.

26. The computer-readable storage medium of claim 13, wherein the inlier pair was determined to match with less than a threshold error, wherein a remaining of the first additional representations was determined to match, based on the homography, with greater than the threshold error, and wherein the computer-readable storage medium further comprises instructions that, when executed by the computer system, cause the computer system to:

estimate a location of the remaining of the first additional representations on the surface having the second orientation based on the adjusted homography; and select a second inlier pair that includes the remaining of the first additional representations, wherein the remaining of the first additional representations was determined to match a remaining of the second additional representations with less than the threshold error, and wherein the adjusted homography is further adjusted based on the second inlier pair.

* * * * *